United States Patent
Iwasaki et al.

(10) Patent No.: US 6,272,292 B1
(45) Date of Patent: Aug. 7, 2001

(54) ELECTRONIC FLASH CONTROL APPARATUS

(75) Inventors: Hiroyuki Iwasaki, Yokohama; Keiji Osawa, Chuo-ku, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/469,272

(22) Filed: Dec. 22, 1999

(30) Foreign Application Priority Data

Dec. 22, 1998 (JP) .................................................. 10-363732
Jun. 1, 1999 (JP) .................................................. 11-153253
Aug. 3, 1999 (JP) .................................................. 11-220264

(51) Int. Cl.$^7$ .................................................. G03B 15/03
(52) U.S. Cl. .................................................. 396/157
(58) Field of Search .................................................. 396/157, 158

(56) References Cited

U.S. PATENT DOCUMENTS 5,717,963 * 2/1998 Tsukahara et al. .................. 396/158
5,987,261 * 11/1999 Sugahara et al. ................ 396/157 X

FOREIGN PATENT DOCUMENTS 3-68928   3/1991   (JP) .
4-88762   3/1992   (JP) .
6-35030   2/1994   (JP) .

* cited by examiner

*Primary Examiner*—W. B. Parkey
(74) *Attorney, Agent, or Firm*—Oliff & Berridge, PLC

(57) ABSTRACT

An electronic flash unit is caused to perform a pre-flash immediately before a photographing operation, and the quantity of light reflected by the subject during the pre-flash is measured by a flash metering unit. Based upon the output from the flash metering unit, a decision is made as to whether or not another pre-flash is to be implemented. Based upon the results of the decision-making, another pre-flash is performed if necessary. Thus, if the quantity of light measured by the flash metering unit during the pre-flash is too small or too large and a sufficient degree of accuracy is not achieved in the measurement, another pre-flash is performed to assure a high degree of accuracy in metering.

10 Claims, 36 Drawing Sheets

ELECTRONIC FLASH CONTROL APPARATUS

INCORPORATION BY REFERENCE

The disclosures of the following priority applications are herein incorporated by reference:

Japanese Patent Application No. 10-363732 filed Dec. 22, 1998

Japanese Patent Application No. 11-153253 filed Jun. 1, 1999

Japanese Patent Application No. 11-220264 filed Aug. 3, 1999

1. Field of the Invention

The present invention relates to an electronic flash control apparatus that achieves optimal control of the electronic flash output.

2. Description of the Related Art

Electronic flash control apparatuses that implement automatic flash control on flash light emitters (hereafter referred to as SBs) mainly employed in single lens reflex cameras adopt the TTL auto flash control method. In this method, real-time metering is performed through the taking lens on a light flux emitted by the SB and reflected from the subject, and the SB light emission is stopped when the flash output reaches the correct level. The method is particularly advantageous in that since metering is performed on light flux having passed through the taking lens, there is no misalignment (parallax) between the area being photographed and the area over which metering is performed and in that the photographer can freely set the aperture value.

In addition, there are electronic flash control apparatuses that employ the "flashmatic" method, a flash-priority system mainly adopted in compact cameras and the like. In this method, by using the relationship expressed in numerical expression (1) below achieved among the subject distance X, the aperture value F and the SB light guide number GN, the aperture value F is calculated for a photographing operation based upon the subject distance X during the photographing operation and the SB guide number GN provided at the camera.

$$GN = X \cdot F \tag{1}$$

However, the TTL auto flash control method described earlier has a problem in that since control is implemented to ensure that the correct quantity of SB light reflected from the subject is achieved, an exposure error may occur depending upon the reflectivity of the subject. The flashmatic method, on the other hand, which does not allow the photographer to freely select the aperture value, cannot be adopted in an advanced-function camera such as single lens reflex cameras.

Accordingly, Japanese Laid Open Patent Publication No. H3-68928 submitted by the applicant of the present invention discloses a technology whereby the correct exposure is achieved regardless of the reflectivity of the subject through the TTL auto flash control method by performing a pre-flash (#2) prior to the main exposure immediately before a photographing operation (#1), performing metering on light reflected at the divided regions of the shutter curtain (#3), determining the reflectivity of the subject through a weighted arithmetic operation using the quantity of received light (#4) and adjusting the SB flash output level during the main exposure (#5) in correspondence to the reflectivity thus determined (#6~#8) as indicated in the algorithm in FIG. 42.

However, in the apparatus described above, a sufficient degree of reliability with regard to the metering value may not always be achieved due to a low or high metering output caused by an insufficient flash output (or an excessively large flash output) during the pre-flash or due to an incorrect gain setting at the metering unit. In particular, when the so-called guide number control method, in which the photographic flash output is determined in advance based upon the metering output obtained during the pre-flash is incorporated, the metering accuracy achieved during the pre-flash is directly fed back to the photographic flash output, which may result in an insufficient degree of accuracy.

SUMMARY OF THE INVENTION

An object of the present invention is to provide an electronic flash control apparatus that is capable of achieving a higher degree of flash control accuracy by improving the accuracy in the flash metering operation performed during the pre-flash.

In order to achieved the object described above, the electronic flash control apparatus according to the present invention comprises a flash metering unit that measures the quantity of the light reflected by the subject during a pre-flash implemented immediately before a photographing operation, a decision-making unit that makes a decision as to whether or not a pre-flash is to be performed again based upon a signal output by the flash metering unit, a flash control unit that causes a pre-flash to be performed again in correspondence to the results of the decision made by the decision-making unit and a flash output calculation unit that calculates the electronic flash output for the photographing operation based upon the signal output by the flash metering unit.

The present invention may further comprise an electronic flash unit that emits light at a flash output corresponding to the results of the calculation performed by the flash output calculation unit.

In addition, according to the present invention, the flash metering unit having a photo-current storage portion that stores the photo-current generated by receiving light, engages in a new storage operation after discharging the electrical charge that has been stored during the initial pre-flash when another pre-flash is to be performed.

Alternatively, according to the present invention, the flash metering unit having a photo-current storage portion that stores the photo-current generated by receiving light, may engage in a new storage operation while retaining the electrical charge that has been stored during the initial pre-flash when another pre-flash is to be performed.

Furthermore, according to the present invention, when another pre-flash is to be performed, the gains used to amplify the photo-current generated at the flash metering unit by receiving light may be varied.

According to the present invention, regardless of the number of pre-flashes that have been performed, the flash metering unit performs a single metering operation on ambient light after the pre-flashes are completed.

According to the present invention, an upper limit may be imposed by the flash control unit with respect to the total light quantity of the flash light emitted by the electronic flash unit during a pre-flash operation by the electronic flash unit.

In addition, according to the present invention, the flash metering unit is capable of performing metering on individual areas in the photographic field achieved by dividing the photographic field into a plurality of areas, and the flash output calculation unit selects a set of signals that will achieve the highest possible metering accuracy among a plurality of sets of signals each obtained in the output from the flash metering unit resulting from one of a plurality of pre-flashes and calculates the electronic flash output for a photographing operation based upon the selected signals.

In addition, the present invention may comprise a flash metering unit that measures the quantity of reflected light from the subject during a pre-flash performed immediately before a photographing operation, a gain setting unit that sets gains used to amplify signals obtained through the measurement of the light quantity of the reflected light by the flash metering unit, a flash control unit that outputs a plurality of pre-flash commands to the electronic flash unit immediately before a photographing operation, a gain resetting unit that changes the gains set by the gain setting unit when a plurality of pre-flashes are performed in response to the output of the plurality of pre-flash commands from the flash control unit and a flash output calculation unit that calculates an electronic flash output for the photographing operation based upon the signal output by the flash metering unit.

Moreover, the present invention may be further includes an electronic flash unit that performs light emission at a flash output corresponding to the output from the flash output calculation unit.

DESCRIPTION OF THE PREFERRED EMBODIMENTS

First Embodiment

Figure 1:
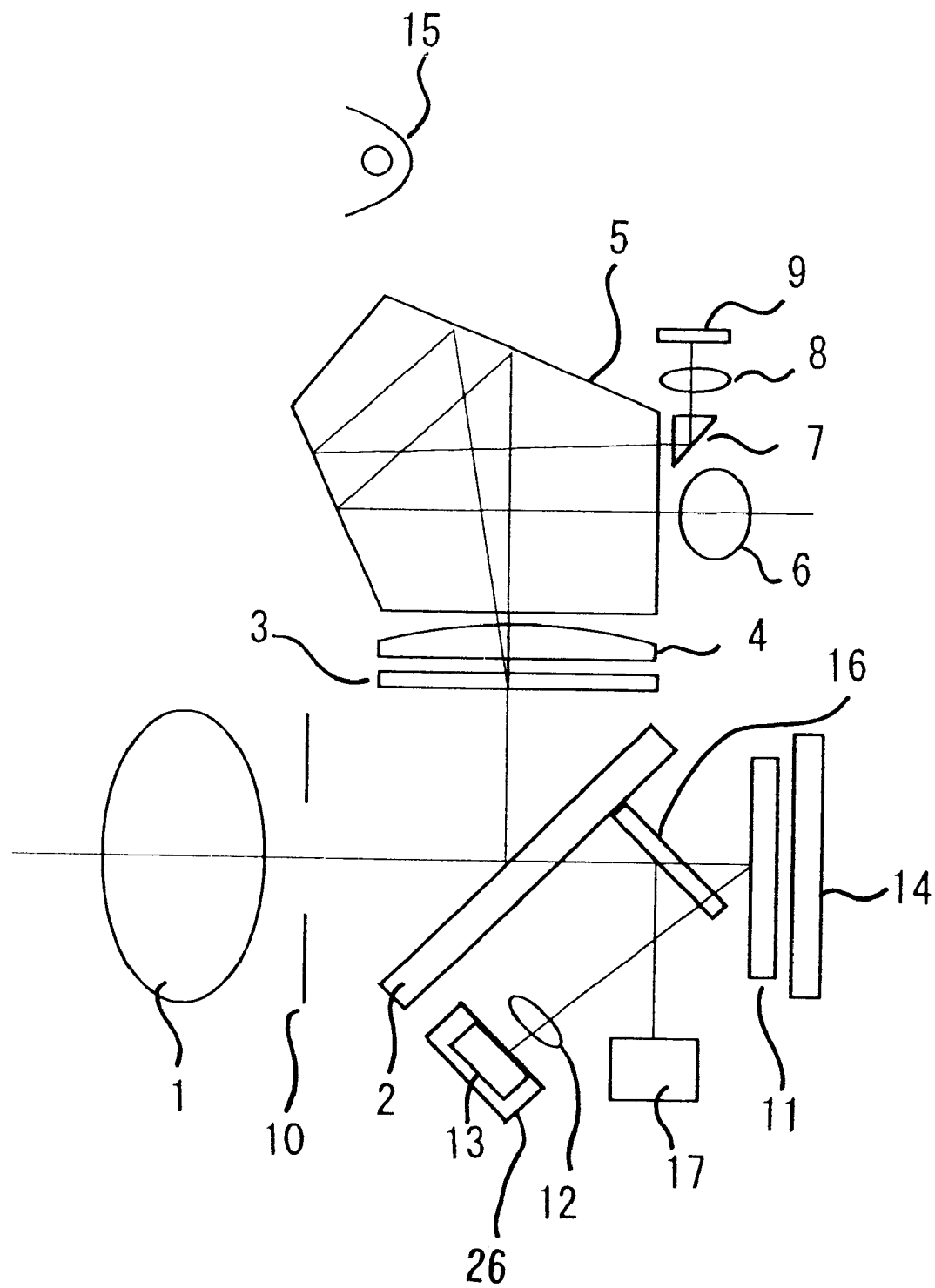
FIG. 1 illustrates the optical system in a first embodiment of the present invention.

FIG. 1 illustrates the optical system employed in the first embodiment of the electronic flash control apparatus in a camera according to the present invention. The light flux having passed through a taking lens 1 is reflected by a quick-return mirror 2 and an image is formed on a focusing screen 3. Then, it passes through a condenser lens 4, a pentagonal prism 5 and an eyepiece lens 6 before reaching the eye of the photographer. A portion of the light flux that is diffused by the focusing screen 3 travels through the condenser lens 4, the pentagonal prism 5, a metering prism 7 and a metering lens 8, and the image is formed again on a metering element 9 that meters ambient light.

Figure 3:
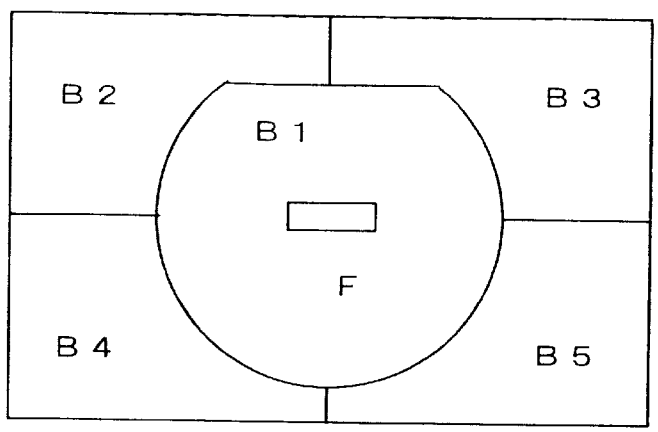
FIG. 3 illustrates the pattern at the ambient light metering unit achieved through division in the first embodiment.

The metering element 9 is constituted of a light-receiving element such as an SPD (silicon photodiode) and, as illustrated in FIG. 3, it assumes a structure that enables it to perform a metering operation by dividing the photographic field into five areas B1~B5 and output the individual metering values.

During a photographing operation, first, an aperture 10 is constricted down to a specific value and, at the same time, the quick-return mirror 2 is caused to swing upward. Then, during a pre-flash operation by an SB 15, a portion of the light flux that has formed the image on the blade of a shutter 11 and has been reflected, travels through a condenser lens 12 to form an image on a flash metering unit 26. During a main flash operation by the SB 15, the shutter 11 is opened and an image is formed at the lightreceiving surface of an imaging device 14 such as a CCD (charge-coupled device).

Figure 4:
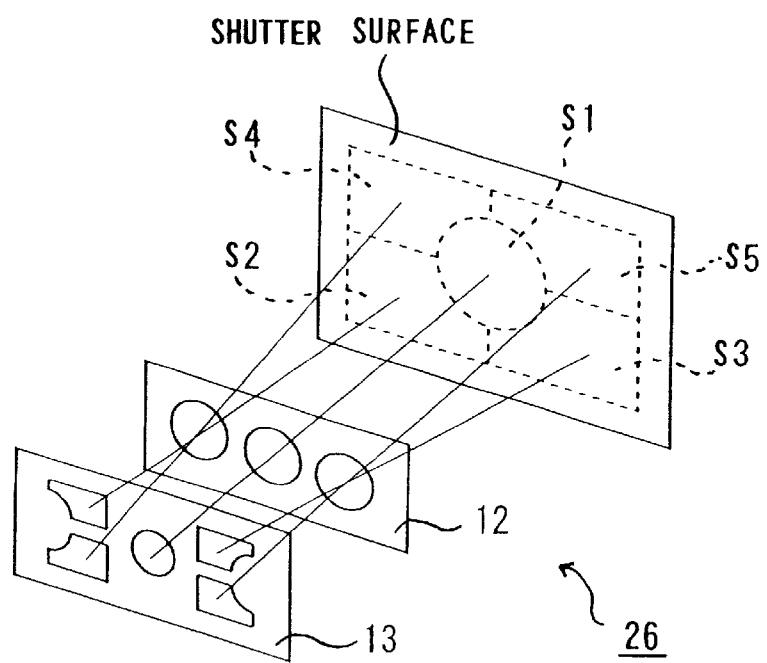
FIG. 4 illustrates the optical system provided in the flash metering unit and the pattern at the ambient light metering unit achieved through division in the first embodiment.

The flash metering unit 26 comprises an SPD 13, a condenser that stores a photo-current from the SPD 13, an amplifier and the like. As illustrated in FIG. 4, the pattern on the metering areas at the flash metering unit 26 is roughly the same as the pattern achieved at the ambient light metering element 9, with areas S1~S5 corresponding to areas B1~B5 in FIG. 3 respectively. In addition, the quick-return mirror 2 is a half mirror that allows a portion of the light to be transmitted and the light flux that has been transmitted through the half mirror is directed downward by a sub-mirror 16 to be guided to a focal point detection unit 17. The focal point detection unit 17 detects a focusing state in the central area F in the photographic field shown in FIG. 3, and focal adjustment is implemented by driving the taking lens 1.

Figure 2:
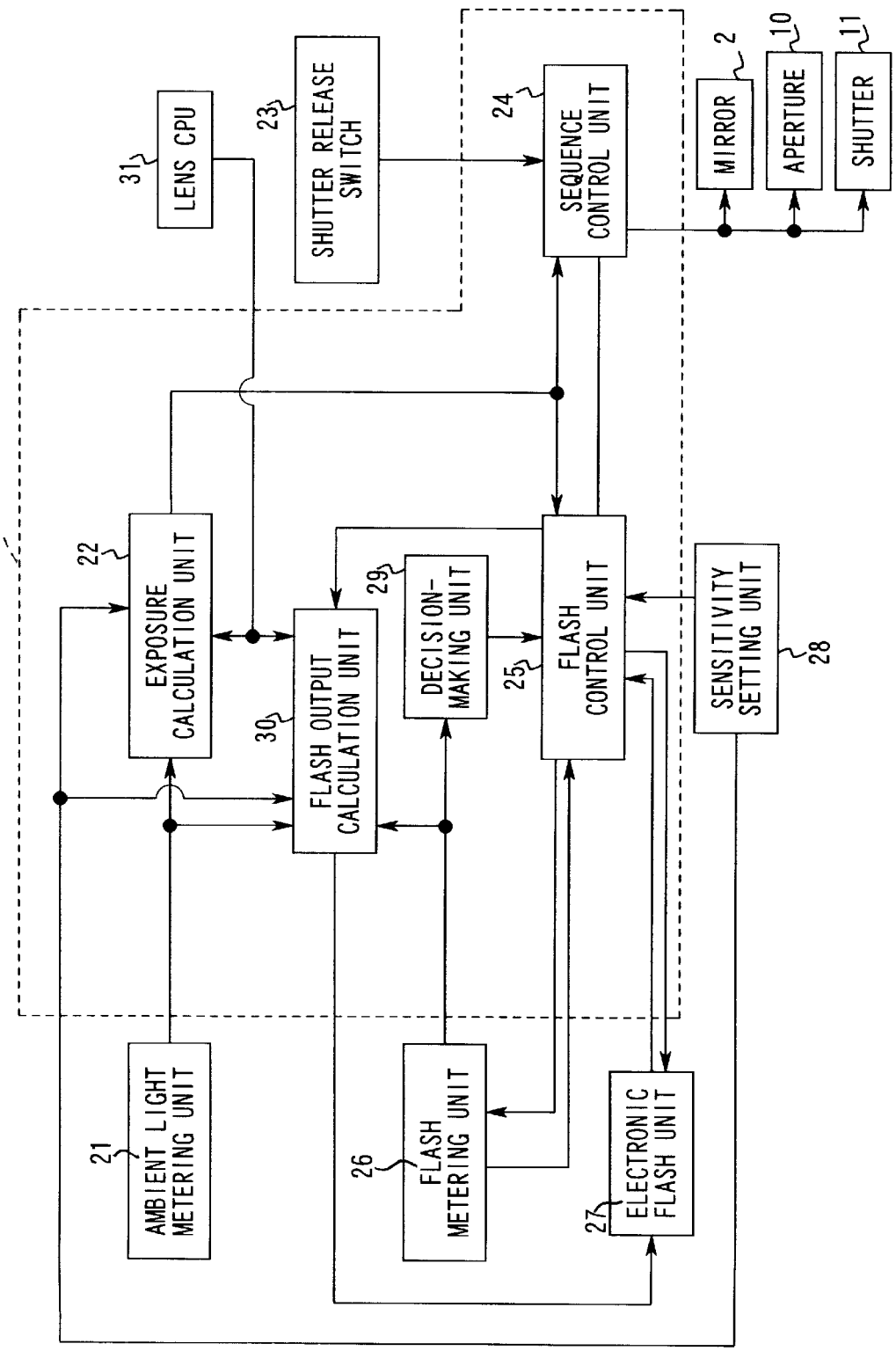
FIG. 2 is a block diagram illustrating the structure of the first embodiment of the present invention.

FIG. 2 is a block diagram schematically illustrating the structure of the electronic flash control apparatus in the first embodiment. An ambient light metering unit 21 is a circuit that performs metering in 5 individual areas achieved by dividing the photographic field into five areas, as illustrated in FIG. 3, and its metering output is input to an exposure calculation unit 22.

The exposure calculation unit 22 is a circuit that calculates a correct exposure value that corresponds to the ambient light based upon the output from the ambient light metering unit 21, lens information such as the open aperture value, the focal length and the exit pupil position of the taking lens stored in a lens CPU 31 constituted of a microprocessor and provided at the taking lens 1 and sensitivity information with respect to the sensitivity of the imaging device 14 output by a sensitivity setting unit 28, determines the aperture value and the shutter speed based upon the correct exposure value and outputs them to a sequence control unit 24 and the like.

The sequence control unit 24 is a circuit that implements control on a sequence of operations by swinging the quick-return mirror 2 shown in FIG. 1 upward when a release signal is input through a release switch 23, issuing an instruction for a pre-flash to a flash control unit 25 after the aperture 10 is set to a predetermined value, then implementing control to cause the shutter 11 to operate at a specific shutter speed and, at the same time, issuing an instruction for a main flash to the flash control unit 25.

The flash control unit 25 is a circuit that implements control on the flash metering unit 26, an electronic flash unit 27 and the like based upon signals output by the exposure calculation unit 22, the sequence control unit 24, a decision-making unit 29 and the sensitivity setting unit 28. The decision-making unit 29, which is a circuit that makes a decision as to whether or not a second pre-flash is required based upon the pre-flash integrated value output by the flash metering unit 26, is connected with the flash control unit 25 through its output port.

In other words, when an instruction for a pre-flash is input from the sequence control unit 24, the flash control unit 25 calculates the amplification gains for the flash metering unit 26 based upon the aperture value information input from the exposure calculation unit 22, sets the gains at the flash metering unit 26 and then causes the electronic flash unit (SB 15 in FIG. 1) to perform chopped flash at a light quantity corresponding to a specific guide number. The chopped flash by the electronic flash unit 26 is sustained until a stop signal indicating that the accumulated value of the quantity of received light has reached a specific value is generated by the flash metering unit 26 or the number of shots in the chopped flash reaches a specific value. The process explained above is the first pre-flash.

When the first pre-flash is completed, the decision-making unit 29 makes a decision as to whether or not a second pre-flash is required based upon the pre-flash integrated value (the accumulated value indicating the quantity of received light) input from the flash metering unit 26 and outputs the results of the decision to the flash control unit 25. The flash control unit 25, upon receiving the results of the decision that the second pre-flash is required input from the decision-making unit 29, resets the gains at the flash metering unit 26, and performs a second pre-flash through chopped flash similar to that performed during the first pre-flash. The first and second pre-flash integrated values are also output to a flash output calculation unit 30.

The flash output calculation unit 30 is a circuit that calculates a main flash output based upon the pre-flash integrated values output by the flash metering unit 26, the metering value output by the ambient light metering unit 21, the photographing distance value output by the lens CPU 31, the aperture value output by the exposure calculation unit 22, the sensitivity value output by the sensitivity setting unit 28 and the like and outputs the calculated value to the electronic flash unit 27. When the pre-flash operation is completed, the shutter 11 becomes fully open and an instruction for a main flash is output to the electronic flash unit 27 by the flash control unit 25, the electronic flash unit 27 performs a main flash at the main flash output calculated by the flash output calculation unit 30, and thus, exposure at the imaging device 14 is achieved.

The operations by the exposure calculation unit 22, the flash output calculation unit 30, the decision-making unit 29, the flash control unit 25 and the sequence control unit 24 achieved during this process are realized through internal calculation performed by a single-chip microprocessor 40 (hereafter referred to as an MPU).

FIG. 3 illustrates how the metering unit 9 divides the photographic field to perform metering. The metering element 9 is capable of performing a metering operation by dividing almost the entire plane of the photographic field into five areas and outputting the individual metering values B1~B5 corresponding to the five areas.

FIG. 4 illustrates the optical system provided at the flash metering unit 26 and the pattern of the metering areas achieved through the division. The optical system at the flash metering unit 26 assumes a structure in which a subject image that has been formed at the shutter plane is re-formed on a photo-sensor 13 via the triple condenser lens 12 and electrical charges obtained through a photoelectric conversion performed at sensors corresponding to five areas S1~S5 are stored. The relationship between the individual areas S~S5 and the numbers assigned to them corresponds to the relationship between the individual metering areas B1~B5 in FIG. 3 and the numbers assigned to them.

Figure 5A:
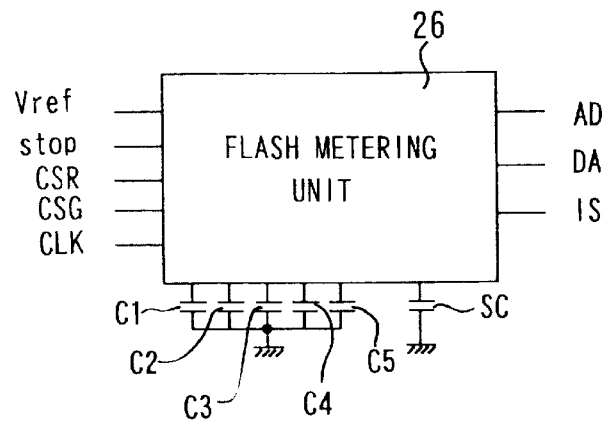
FIG. 5A illustrates the ports at the flash metering unit in the first embodiment.

FIG. 5A illustrates the ports provided at the flash metering unit 26 and their respective roles. C1~C5 indicate externally mounted capacitors that store the photo-currents output by the individual sensors that perform metering in the areas S1~S5, SC indicates an externally mounted capacitor that stores the sum of the photo-currents output by the individual sensors that perform metering in the areas S1~S5, Vref indicates a temperature-proportionate voltage output port, "stop" indicates a stop signal output port and CSR, CSG and CLK indicate ports used to switch the amplification gain setting and the multiplexer read channel setting. The actual setting methods adopted are to be explained later in reference to FIG. 5B and FIG. 5C. IS indicates a port through which commands for storage start/end are input, DA indicates a port through which the amplification gains to be used to amplify the photo-currents output by the individual sensors that performed metering in the individual areas are input and AD is a port through which the integrated value achieved by integrating the photo-currents output by the individual sensors that perform metering in the different areas is output.

Figure 5B:
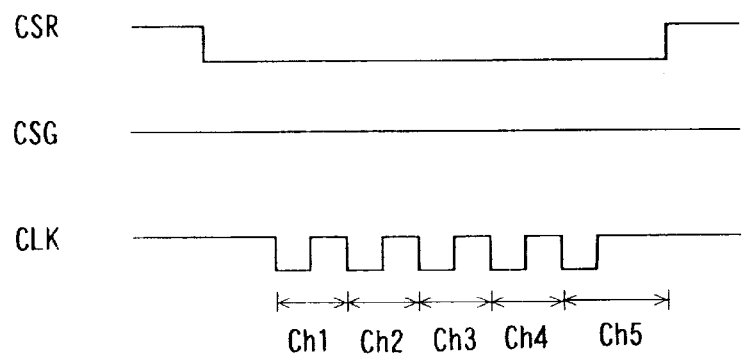
FIG. 5B illustrates the operation performed by the flash metering unit in the first embodiment.

FIG. 5B illustrates the method for setting the amplification gains at the flash metering unit 26. By lowering the level at the CSR port to L while sustaining the level at the CSG port at H and then inputting a clock signal to the CLK port, the read channel is switched in synchronization with the shift to the L level. The gains at the individual channels are set by applying a voltage corresponding to a desired gain to the DA port while the CLK port is at L level. Ch1~Ch5 respectively correspond to the areas S1~S5.

Figure 5C:
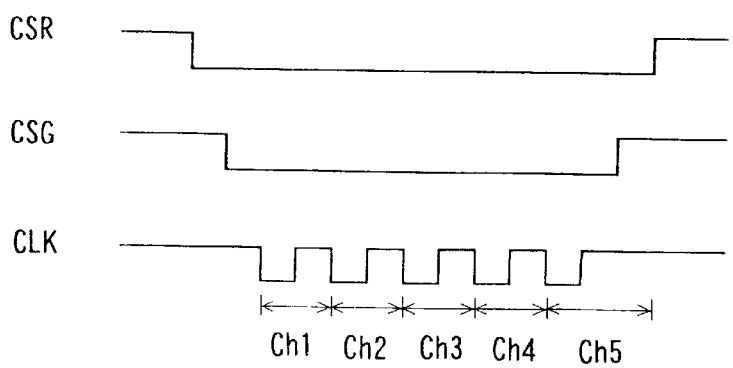
FIG. 5C is another diagram illustrating the operation performed by the flash metering unit in the first embodiment.

FIG. 5C illustrates the method for reading the accumulated values (integrated metering values) each calculated by integrating the photo-currents corresponding to one of the individual areas output by the photo-sensor 13. The read channel is switched in synchronization with the shift to the L level by inputting a clock signal to the CLK port after the levels at the CSR and the CSG ports are set to L level, and a signal at a voltage level corresponding to the integrated metering value achieved by integrating the values in the individual areas is output to the AD port.

Figure 6:
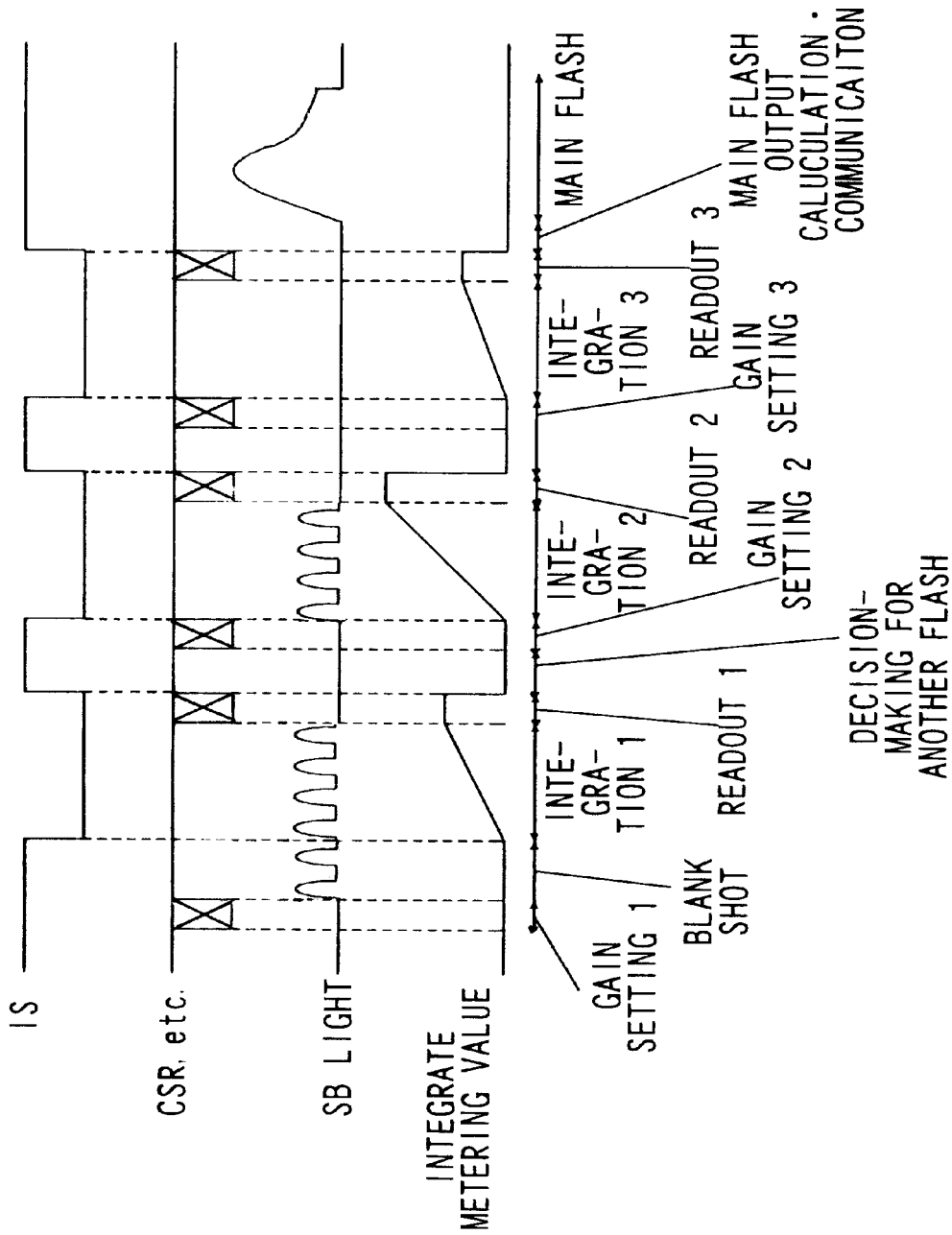
FIG. 6 schematically illustrates the pre-flash operation achieved in the first embodiment.

FIG. 6 illustrates the pre-flash operation. When a release signal is input and aperture setting is completed, the flash control unit 25 sets the gains for a first pre-flash (gain setting 1), and after performing two blank shots through chopped flash to warm up the electronic flash unit 27 and the flash metering unit 26, the flash control unit 25 starts an integrating operation by inputting a negative edge signal to the IS port and, at the same time, performs a first pre-flash.

The first pre-flash ends when the integrated metering value reaches a correct level or when the number of chopped flashes reaches a specific value. Then the MPU 40 inputs a positive edge signal to the IS port after reading out (readout 1) the integrated value (integration 1) and resets the integrated value. The MPU 40 makes a decision as to whether or not another pre-flash is required based upon the first integrated value, and if it is necessary to perform another pre-flash, it sets the gains (gain setting 2) for a second pre-flash. At this time, the MPU 40 starts an integrating operation by inputting a negative edge signal to the IS port without any blank shot for warm up and, at the same time, performs a second pre-flash. The method for making a decision as to whether or not a second pre-flash is to be performed is to be explained later.

The second pre-flash ends when the integrated metering value reaches a correct level or when the number of chopped flashes reaches a specific value. The MPU 40 inputs a positive edge signal to the IS port after reading out (readout 2) the integrated value (integration 2) and resets the integrated value. Since the ambient light component is contained as well as the reflected portion of the SB light in an integrated value resulting from the pre-flash operation, the MPU 40 performs an integrating operation only on the ambient light after the pre-flash operation is completed, and it performs an arithmetic operation to subtract the ambient light component from the integrated pre-flash value through arithmetic processing. During the gain setting 3, the gains for an ambient light integration are set, and then the ambient light integrating operation (integration 3) is performed by inputting a negative edge signal to the IS port as in the pre-flash operation. The gain setting and the length of time of the integrating operation in the ambient light integration are to be explained later.

When the ambient light integration is completed, the MPU 40 inputs a positive edge signal to the IS port and resets the integrated values after reading out (readout 3) the integrated values. Then, the MPU 40 uses an algorithm which is to be detailed later to calculate the main flash output, sets the calculated value at the electronic flash unit 27 and implements main flash control concurrently with a photographing operation to complete the photographing process.

Figure 7:
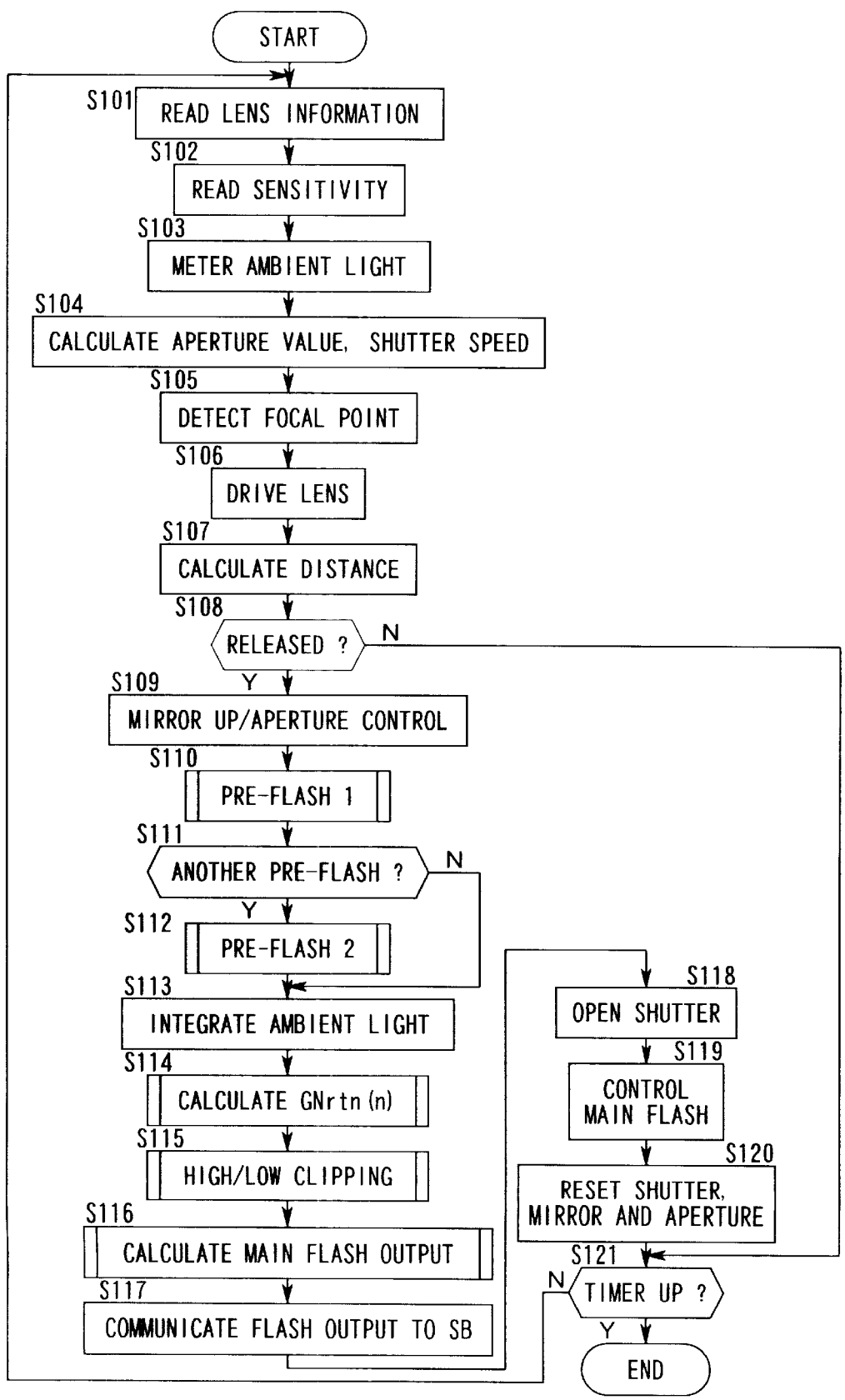
FIG. 7 is a flowchart of an algorithm used in the first embodiment.

FIG. 7 is a flowchart of the program executed by the MPU 40. Power is turned on at the camera by pressing a release switch 23 of the camera halfway down and this program is executed. First, in step S101, the MPU 40 engages in communication with the lens CPU 31 provided inside the taking lens to read information such as the open aperture value, the focal length and the exit pupil position of the taking lens. Then, in step S102, the MPU 40 reads the sensitivity value set either manually or automatically from the sensitivity setting unit 28. In step S103, the MPU 40 performs ambient light metering by receiving a signal output by the metering element 9, makes a correction based upon the lens information read in step S101 to obtain the brightness information corresponding to the areas B1~B5, and performs an ambient light exposure calculation to determine a correct exposure value BVans through a method of the known art using these values. In step S104, the MPU 40 calculates the aperture value setting and the shutter speed for a photographing operation in correspondence to the correct exposure value BVans and the sensitivity value.

In step S105, the MPU 40 receives the results of focal point detection performed by the focal point detection unit 17, and the MPU 40 drives the taking lens 1 until the defocus quantity becomes 0 in step S106. In step S107, distance information output by the lens CPU 31 of the taking lens 1 is input. Then, in step S108, the MPU 40 makes a decision as to whether or not the shutter release switch 23 has been pressed all the way down, and if it is decided that the shutter release switch 23 has been pressed all the way down, the operation proceeds to step S109. Otherwise, the operation jumps to step S121. In step S109, the MPU 40 causes the quick-return mirror 2 to swing upward and sets the aperture 10 to the value obtained in step S104.

In step S110, the MPU 40 performs a first pre-flash, and reads out the integrated metering values IG1(1)~IG1(5) corresponding to the areas S1~S5. The specific method adopted to achieve this first pre-flash is to be explained in detail later. In step S111, a decision is made as to whether or not a second pre-flash is required based upon the values of IG1(1)~IG1(5). While any of several different criteria may be used for the decision-making, the decision-making in this example is based upon whether or not the mathematical expression (2) below is satisfied.

$$IG1(n)<IGth, n=1\ldots 5 \qquad (2)$$

IGth in the expression above represents the minimum value achieving the degree of accuracy that allows the integrated value IG1(n) to be used in subsequent arithmetic calculations, and its value when A/D conversion is performed on an output from the AD port at an 8-bit resolution (0–255) is known to be approximately 20 through testing. It is also known through testing that the value of IGth remains almost constant regardless of the gain setting and the length of an integrating operation at the flash metering unit 26 or regardless of the luminance at the light-receiving surface of the photo-sensor 13. If the individual values of IG1(n) are all equal to or greater than IGth, the MPU 40 concludes that a second pre-flash is not necessary, and the operation skips step S112, whereas the operation proceeds to step S112 otherwise to perform a second pre-flash and read out integrated values IG2(1)~IG2(5) from the flash metering unit 26. The method for the second pre-flash, too, is to be explained later.

When the pre-flash operation is completed, the MPU 40 performs ambient light integrating operation and reads out integrated values Ipst(1) Ipst(5) in step S113. If no second pre-flash has been performed, the gain setting and the length of the integrating operation for the ambient light integrating operation are determined at the same values as those in the first pre-flash, whereas if a second pre-flash has been performed, these settings are selected at the same values as those in the second pre-flash. In other words, in the former case, tpre3=tpre1, whereas in the latter case tpre3=tpre2, in FIG. 6.

In step S114, GNrtn(n) in each of the flash control areas S1~S5 is calculated in correspondence to the integrated values obtained through the pre-flash operation and the like. GNrtn represents the SB guide number required to achieve a standard exposure quantity at a sensitivity level equivalent to ISO 100 when it is assumed that a subject present in each area has a standard reflectivity. The specific method for calculating GNrtn is to be detailed later. In step S115, the MPU 40 performs a Hi/Lo clipping calculation to detect any area of abnormal reflectivity that would adversely affect the calculation of the main flash output. The method for this calculation, too, is to be explained later. In step S116, the MPU 40 calculates the main flash output for a photographing operation through a method which is to be detailed later based upon the GNrtn, the results of the decision-making with respect to Hi/Lo clipping and the like, and in step S117, it transmits the value thus calculated to the electronic flash unit 27 through communication or the like.

Then, in step S118, the MPU 40 opens the shutter, and in step S119, it implements main flash control on the SB 15. When the main flash is completed, the MPU 40 restores the shutter, the aperture and the mirror to their respective initial positions in step S120. In step S121, the MPU 40 makes a decision as to whether or not a specific length of time has elapsed since the halfway-down position timer startup, and if the specific length of time has not elapsed, the operation returns to step S101 to repeat the processing, whereas if the time is up on the timer, the processing ends.

Figure 8:
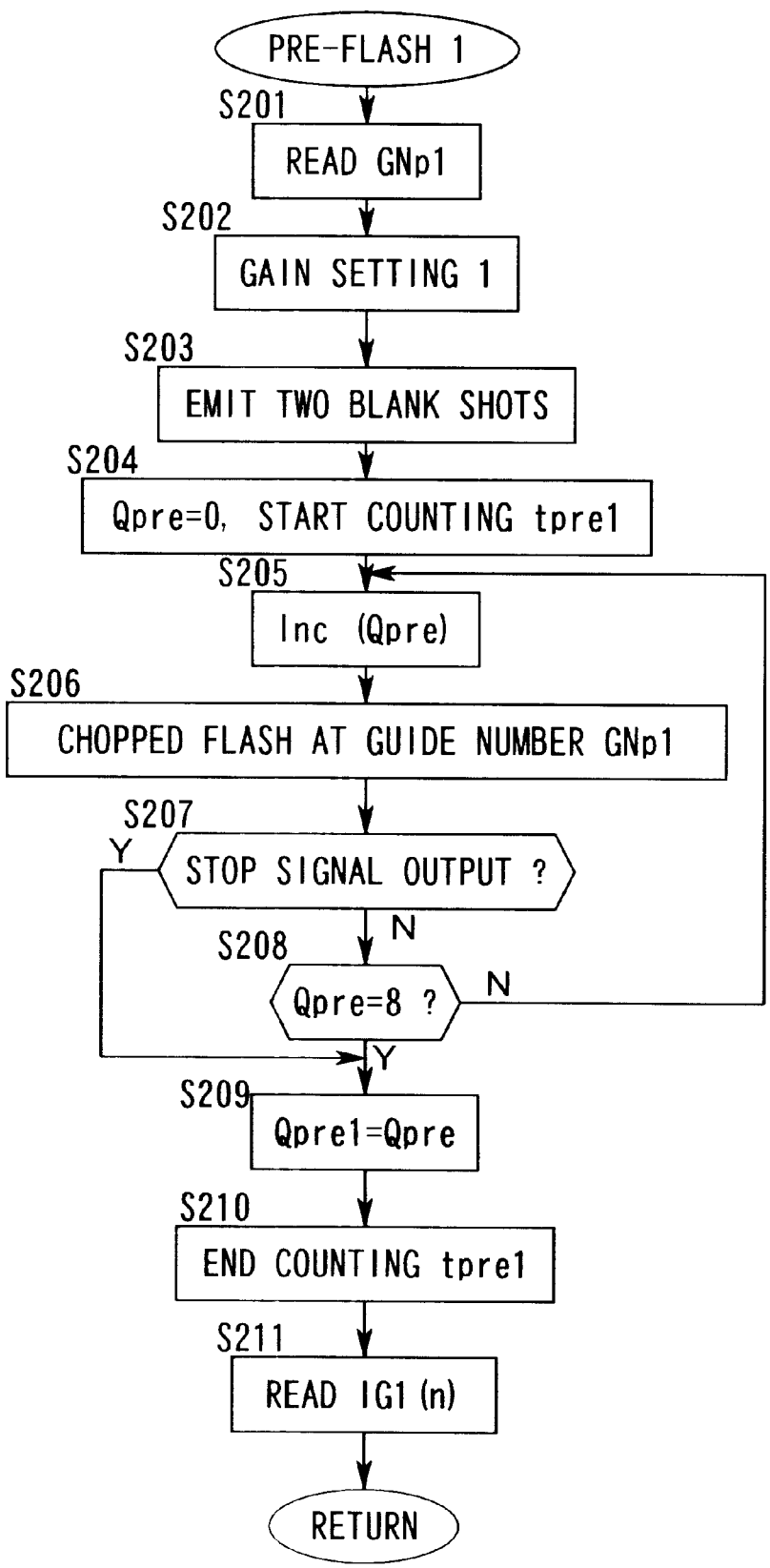
FIG. 8 is a flowchart of an algorithm (the control method adopted for a first pre-flash) used in the first embodiment.

FIG. 8 is a sub-routine flowchart of the control method implemented during the first pre-flash. This sub-routine is called up for execution by executing step S110 in FIG. 7. First, in step S201, the MPU 40 reads the guide number GNpl corresponding to a single light emission from the electronic flash unit 27. It is assumed that this guide number indicates a value corresponding to a sensitivity setting equivalent to ISO 100. Next, in step S202, the MPU 40 sets the amplification gains Gpre(n) for a pre-flash calculated through mathematical formula (3) below.

$$Gpre1(n)=Lev-\gamma\{AV+3+\log2(1/5)-S\alpha(n)\} \qquad (3)$$

While "n" in Gpre1(n) is any value within the range of 1~5 and the individual numbers correspond to the areas S1~S5 in FIG. 4, a single amplification gain for a pre-flash is set for all the areas. In addition, AV represents an APEX value (unit: EV) of the aperture value setting, Sα(n) represents a correction value used to achieve consistency in the gain for the individual areas and Lev and γ are coefficients used to ensure that a stop signal is output when the correct integrated metering value is achieved. In addition, the term log2 (1/5) is a correctional term used to ensure that the sum total of the integrated values determined in correspondence to the individual areas achieves a correct quantity of received light. Since the amplification gain Gpre becomes higher as the value decreases, a higher gain is set as the AV value increases, i.e., as the aperture becomes further constricted. The reason for this is that since the luminance at the shutter blades becomes reduced as the aperture is further constricted, the reduction in the luminance must be compensated.

Next, in step S203, the MPU 40 performs two blank shots to warm up the flash tube at the SB 15. In step S204, the MPU 40 sets the variable Qpre that indicates the number of pre-flashes to 0, starts to measure the length of pre-flash time tpre1 and also starts an integrating operation by setting the level of the IS port at the flash metering unit 26 to L.

In step S205, the MPU 40 adds 1 to Qpre. In step S206, the MPU 40 ensures that a pre-flash is performed at the light quantity corresponding to the guide number GNp1, and then in step S207 it makes a decision as to whether or not a stop signal has been output. If it is decided that a stop signal has been output, the operation skips the next step S208 to directly proceed to step S209, whereas the operation proceeds to step S208 otherwise to make a decision as to whether or not the number of pre-flashes Qpre has reached the maximum, i.e., 8 light emissions. If it is decided that the number of pre-flashes has reached 8, the MPU 40 ends the pre-flash operation and the operation proceeds to step S209, whereas the operation returns to step S205 otherwise to perform another light emission. Since an upper limit is provided with respect to the sum total of the pre-flash output, it is possible to assure a sufficient flash output for the main flash operation.

When the pre-flash operation is completed, the MPU 40 substitutes the variable Qpre1 indicating the number of first pre-flashes with Qpre in step S209. Then, in step S210, the count of the length of pre-flash time tpre1 ends. In step S211, the MPU 40 reads out the integrated metering values IG1(1)~IG1(5) corresponding to the individual flash control areas S1~S5 before ending the processing.

Figure 9:
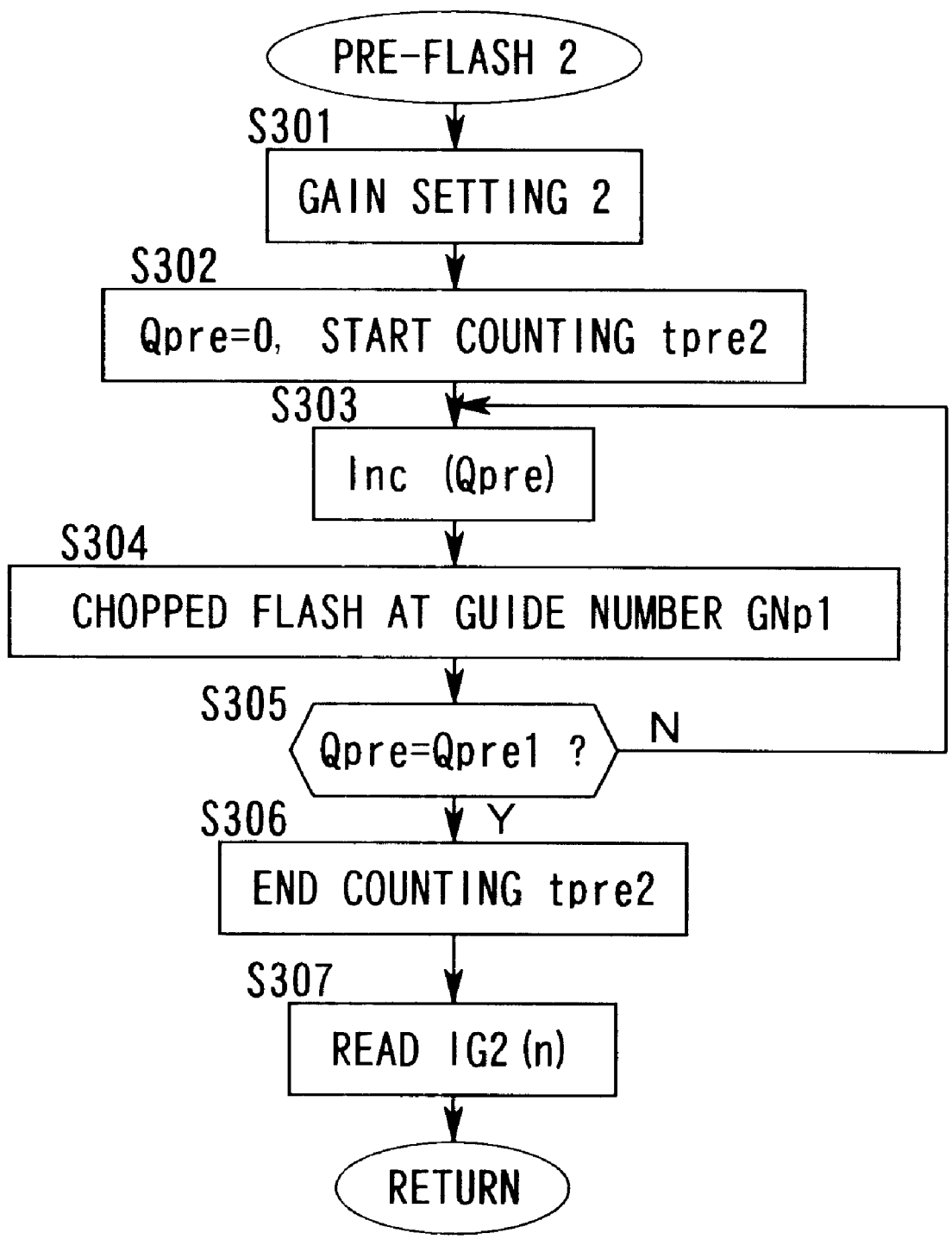
FIG. 9 is a flowchart of an algorithm (the control method adopted for a second pre-flash) used in the first embodiment.

FIG. 9 is a sub-routine flowchart of the control implemented during a second pre-flash. This sub-routine is called up for execution by executing step S112 in FIG. 7. In step S301, the MPU 40 calculates the amplification gain Gpre2(n) for a pre-flash through mathematical formula (4) below and sets the gains thus calculated.

$$\text{Gpre2}(n) = Lev - \gamma\{AV + 3 + \log_2(1/5) - S\alpha(n) + \text{Goffset}\} \quad (4)$$

The variables in this formula are the same as those used in the first pre-flash except for Goffset. Goffset is a variable that specifies the degree to which the gain setting for the second pre-flash is to be changed relative to that used in the first pre-flash. While Goffset=3(EV) and the gains for the second pre-flash are uniformly set higher than that in the first pre-flash by 3EV (the sensitivity multiplied by 8) in this example, the degree to which the second pre-flash gain setting is changed may be varied in correspondence to the results of the first pre-flash using Goffset as a variable.

In step S302, the MPU 40 sets the variable Qpre that indicates the number of pre-flashes to 0, starts counting the pre-flash time tpre2 and also starts an integrating operation by setting the level at the IS port of the flash metering unit 26 to L. Next, in step S303, the MPU 40 adds 1 to Qpre and in step S304, it performs the pre-flash at the light quantity corresponding to the guide number GNp1. In step S305, the MPU 40 makes a decision as to whether or not the number of pre-flashes Qpre has reached Qpre1, i.e., the number of first pre-flashes. If it is decided that the number of pre-flashes has reached Qpre1, the MPU 40 ends the pre-flash operation and the operation proceeds to step S306, whereas the operation returns to step S303 to perform another pre-flash otherwise.

When the pre-flash operation is completed, the MPU 40 ends the counting of the pre-flash time tpre2 in step S306. In step S307, the MPU 40 reads the integrated metering values IG2(1)~IG2(5) before ending the processing.

Figure 10:
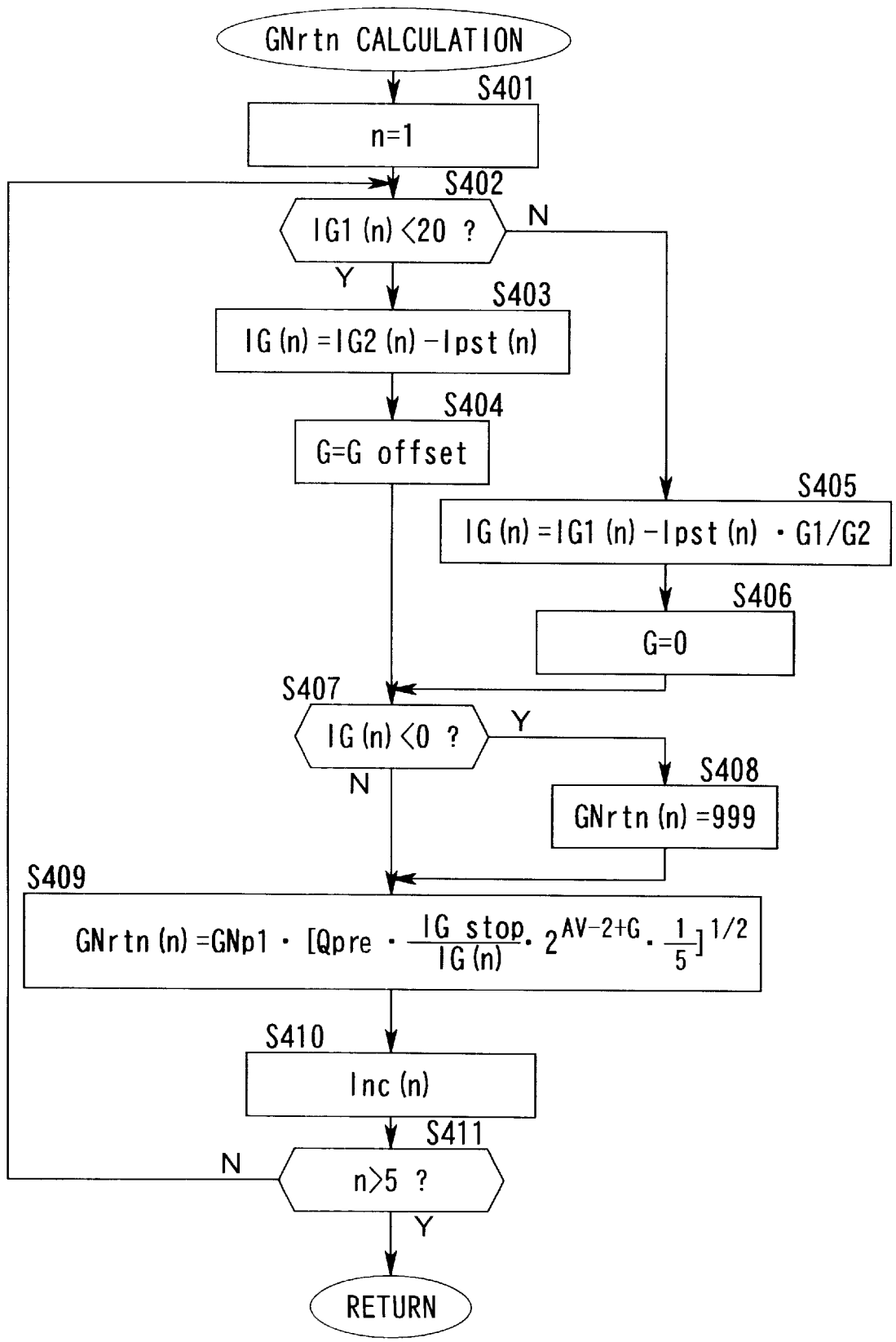
FIG. 10 is a flowchart of an algorithm (the method adopted for calculating GNrtn) used in the first embodiment.

FIG. 10 is a sub-routine flowchart of the method for calculating GNrtn. This sub-routine is called up for execution by executing step S114 in FIG. 7. In step S401, the MPU 40 sets 1 for the counter n, and then in the following step S402, it makes a decision as to whether or not first pre-flash integrated value IG1(n)<20. If an affirmative decision is made, it calculates an integrated value IG(n) achieved by eliminating the influence of the ambient light component through mathematical formula (5), using the second pre-flash integrated value IG2(n) and the integrated value Ipst(n) of the ambient light alone determined in step S113 in FIG. 7. In other words, the integrated metering value obtained either through the first pre-flash operation or the second pre-flash operation that is better than the other is used.

$$IG(n) = IG2(n) - \text{Ipst}(n) \quad (5)$$

In step S404, the MPU 40 substitutes the correction coefficient G to be used in the subsequent step S409 with the value of Goffset. If it is decided that IG1(n)≧20 in step S402, the MPU 40 calculates IG(n) through mathematical formula (6) using the first pre-flash integrated value IG1(n), Ipst(n) and the gain settings for the first and second pre-flash operations G1(n) and G2(n) in step S405.

$$IG(n) = IG1(n) - \text{Ipst}(n) \cdot G1(n)/G2(n) \quad (6)$$

In step S406, the MPU 40 substitutes the correction coefficient G to be used in the subsequent step S409 with 0. In step S407, the MPU 40 makes a decision as to whether or not IG(n) thus determined is smaller than 0. If it is decided in step S407 that IG(n) is smaller than 0, the MPU 40 substitutes the guide number GNrtn(n) corresponding to the area with a sufficiently large value in step S408. In this example, the value used in the substitution is 999. If it is decided in step S407 that IG(n) is equal to or greater than 0, the MPU 40 calculates GNrtn(n) for each area using mathematical formula (7) in step S409.

$$\text{GNrtn}(n) = \text{GNp1} \cdot \{Qpre \cdot IGstop/IG(n) \cdot 2^{\wedge}(AV-2+G)/5\}^{\wedge}(1/2) \quad (7)$$

In the formula above, the symbol ^ indicates an exponential power. In step S410, the MPU 40 adds 1 to n, and in step S411 it makes a decision as to whether or not the counter n has exceeded 5. If a negative decision is made in step S411, the operation returns to step S402, whereas if it is decided that the counter n has exceeded 5, the sub-routine ends.

Figure 11:
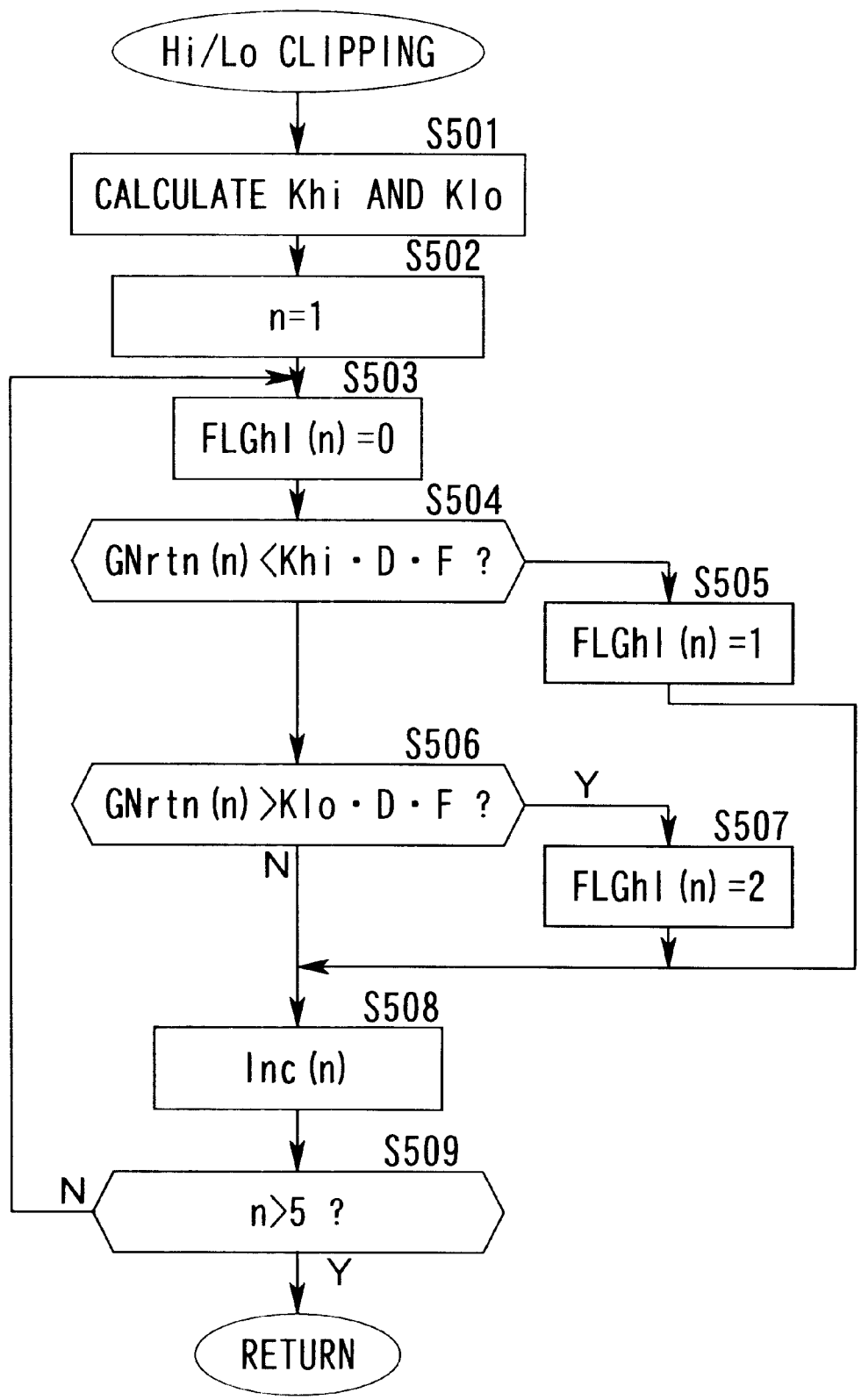
FIG. 11 is a flowchart of an algorithm (the method adopted for Hi/Lo clipping) used in the first embodiment.

FIG. 11 is a sub-routine flowchart of the Hi/Lo clipping method. This sub-routine is started up by executing step S115 in FIG. 7. First, in step S501, the MPU 40 calculates coefficients Khi and Klo, which may be considered as margin values to be used until Hi clipping and Lo clipping are implemented. Since the specific method for calculating Khi and Klo is described in detail in Japanese Laid-Open Patent Publication No. H6-35030 and the like, submitted by the applicant of the present invention, its explanation is omitted.

Next, in step S502, the MPU 40 sets 1 for the counter n. In step S503, the MPU 40 sets a flag FLGhl(n) that indicates whether or not Hi clipping and Lo clipping have been implemented to 0. In step S504, the MPU 40 makes a decision indicated in mathematical expression (8), and if an affirmative decision is made, the operation proceeds to step S505 to substitute FLGhl(n) with value 1 which indicates that Hi clipping has been implemented, whereas the operation proceeds to implement the next processing if a negative decision is made.

$$\text{GNrtn}(n) < Khi \cdot D \cdot F \quad (8)$$

D and F in the expression above respectively indicate the photographing distance (unit: m) and the aperture value setting. In step S506, the MPU 40 makes a decision as indicated in mathematical expression (9), and if an affirmative decision is made the operation proceeds to step S505 to substitute the flag FLGhl(n) with a value 2 which indicates that Lo clipping has been implemented, whereas the operation proceeds to perform the next processing if a negative decision is made.

$$\text{GNrtn}(n) > Klo \cdot D \cdot F \quad (9)$$

In step S508, the MPU 40 adds 1 to the counter n, and in step S509 it makes a decision as to whether or not n has exceeded 5. If n has not exceeded 5, the operation returns to step S503 to repeat the processing, whereas if n has exceeded 5, the processing ends. By making a decision with respect to the reflectivity of the subject in each area based upon the results of a pre-flash in this manner to eliminate the information corresponding to an area where the reflectivity greatly deviates from the standard reflectivity from the range of the processing, an advantage of accurate calculation of the flash output for the main flash operation can be expected.

Figure 12:
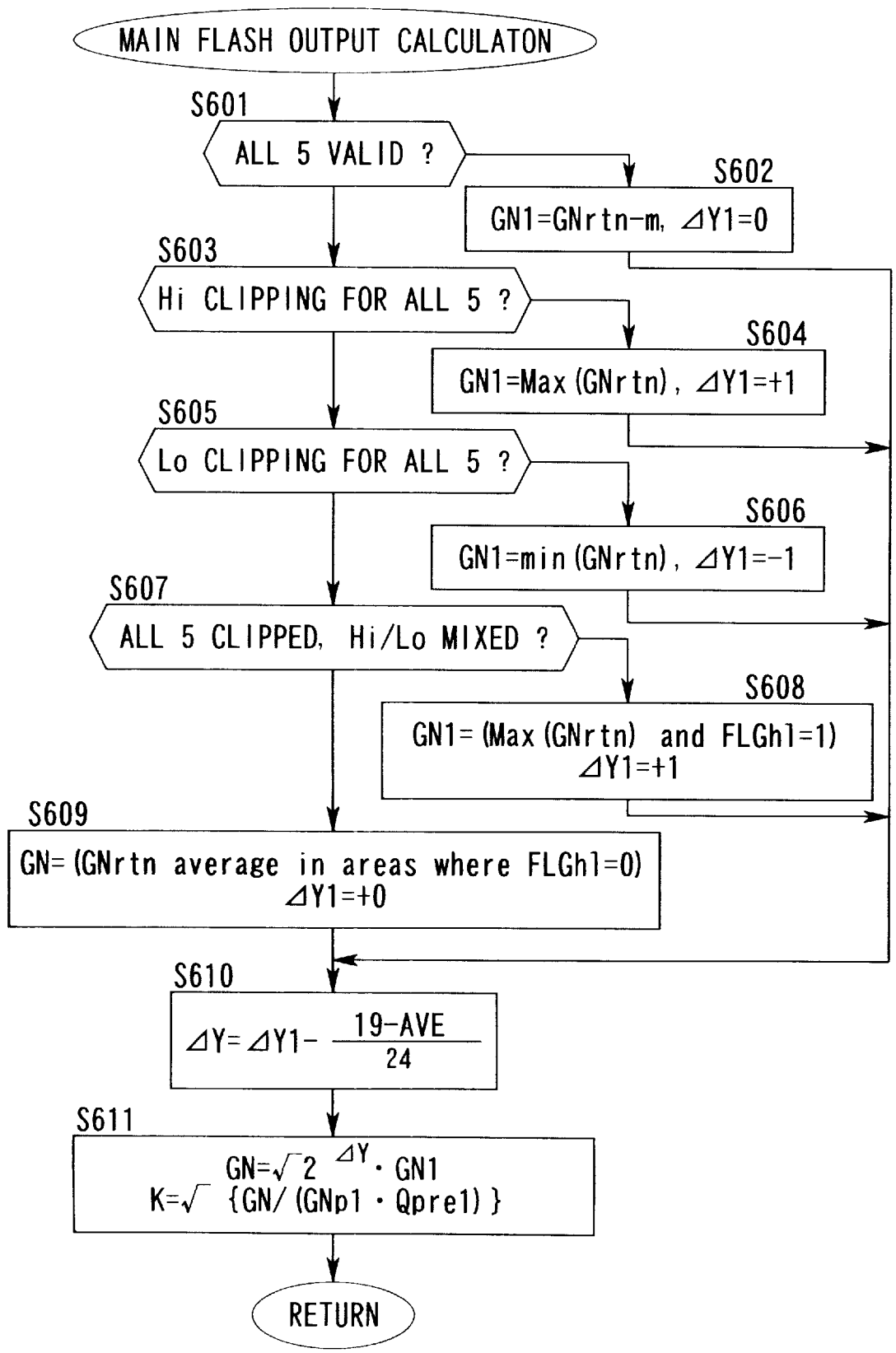
FIG. 12 is a flowchart of an algorithm (calculation method adopted for main flash) used in the first embodiment.

FIG. 12 is a sub-routine flowchart of the method for calculating the main flash output. This sub-routine is started up by executing step S116 in FIG. 7. First, in step S601, the MPU 40 makes a decision as to whether or not all the information corresponding to the five flash control areas is valid. In this decision-making, an area n is determined to be a valid area if FLGhl(n) explained in reference to FIG. 11 satisfies FLGhl(n)=0. If it is decided that the five areas are all valid, the operation proceeds to step S602 to substitute GN1 with GNrtn_m, which is the average value of the individual values corresponding to the five areas and the correction quantity ΔY1 with 0 as the main flash output operational values.

If the number of valid areas is not 5, the MPU 40 makes a decision as to whether or not Hi clipping has been implemented for all five areas, i.e., whether or not FLGhl=1 is true in all the areas, in step S603. If an affirmative decision is made, it substitutes GN1 with the maximum value of GNrtn(n) obtained in FIG. 10 and ΔY1 with+1 in step S604.

Next, in step S605, the MPU 40 makes a decision as to whether or not all five areas have undergone Lo clipping, i.e., whether or not FLGhl=2 is true in all the areas, and if an affirmative decision is made, it substitutes GN1 with the minimum value of the GNrtn(n) obtained in FIG. 10 and ΔY1 with −1 in step S606.

Next, in step S607, the MPU 40 makes a decision as to whether or not each of the five areas has undergone Hi or Lo clipping, i.e., whether or not FLGhl≠0 is true in all the areas, and if an affirmative decision is made, the operation proceeds to step S608 to substitute GN1 with GNrtn corresponding to the area where FLGhl=1 and the GNrtn(n) is the largest and ΔY1 with +1.

If a negative decision is made in step S607, the MPU 40 substitutes GN1 with the average value of the values corresponding to the areas where FLGhl=0 and ΔY1 with 0 in step S609. In step S610, the MPU 40 calculates ΔY, i.e., the final correction quantity through mathematical formula (10) using the correction quantity ΔY1 and the ambient light metering values determined in step S103 in FIG. 7.

$$\Delta Y = \Delta Y1 - (19 - AVE)/24 \quad (10)$$

AVE in the formula above represents the average value of the brightness values corresponding to the five areas B1~B5. In step S611, the final main flash output GN (unit: guide number obtained through ISO 100 conversion) through mathematical formula (11) below.

$$GN = Sqrt(2^{\Delta Y}) \cdot GN1 \quad (11)$$

Sqrt(X) is a function for determining the square root of X and ^ is a function for determining the exponent. In addition, the main flash output may be specified with a multiplication factor of the pre-flash output instead of the guide number. In such a case, K is calculated through the following mathematical formula (12) and an instruction is issued to the electronic flash unit 27 to perform light emission at a light quantity achieved by multiplying the first pre-flash output by K.

$$K = Sqrt\{GN/(GNp1 \cdot Qpre1)\} \quad (12)$$

Variation of First Embodiment

While the MPU 40 makes a decision as to whether or not a second pre-flash is to be executed by deciding on the suitability of the pre-flash in the first embodiment, pre-flash is always performed forcibly a plurality of times (e.g., twice) without performing this decision-making in a variation. Using the results of the pre-flash which is optimal for calculating the main flash output among the results of the plurality of pre-flashes, the main flash output is calculated. In more specific terms, a first pre-flash is performed using the gain values set in step S202 in FIG. 8 and then a second pre-flash is performed by using the gain values set in step S301 in FIG. 9. Then, the MPU 40 makes a decision with respect to the results of the two pre-flashes, i.e., the integrated metering values at the photo-sensor 13, and adopts the results of the pre-flash that are optimal for calculating the main flash output. In this example, the main flash output is calculated based upon the results of the pre-flash achieving a greater integrated metering value. However, if an overflow has occurred in the larger integrated metering value, the smaller integrated metering value is selected. When the integrated metering value is an A/D converted value achieving an 8-bit resolution, for instance, a decision may be made as to whether or not the larger integrated value is equal to or less than 254 to determine whether or not an overflow has occurred.

Second Embodiment

Figure 13:
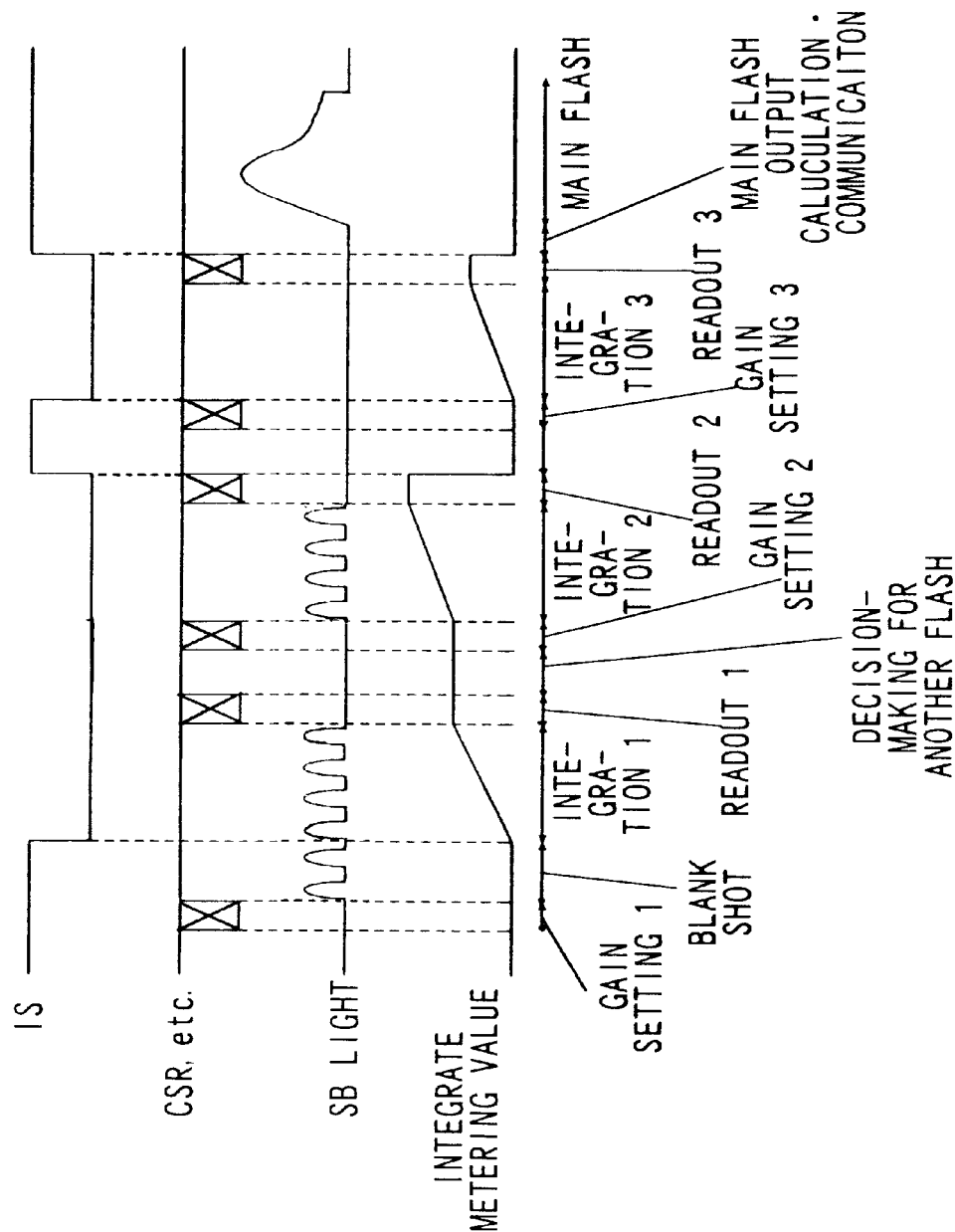
FIG. 13 illustrates the pre-flash operation achieved in a second embodiment.

FIG. 13, which illustrates the second embodiment of the present invention corresponds to FIG. 6 illustrating the first embodiment. It differs from the first embodiment in that even when an integrated value readout 1 is completed after the first pre-flash ends, no positive signal is input to the IS port and thus, the integrated value is not reset. As a result, at the start of the second pre-flash, an integrating operation is performed by adding up to the integrated value of the first pre-flash that has been retained. Since the first integrated value is not wasted, this method is effective when the gains cannot be set at a large value for the second pre-flash.

It is to be noted that since the gain setting circuit in the flash metering unit 26 is designed to be automatically set to 0 when the integrated value is read out even with the IS port level remaining unchanged at L after the first pre-flash is completed, the integrated value remains unaffected by the ambient light and the like during the period of time elapsing after the first pre-flash to the second pre-flash start.

In addition, while G1(n)=G2(n)=G3(n) in the second embodiment since the gain settings for the first and second pre-flashes are equal to each other, the number of pre-flashes Qpre does not necessarily need to achieve Qpre1=Qpre2. However, the ambient light integration time tpre3 should be: tpre3=tpre1+tpre2. In correspondence to this, the mathematical formula (6) used in step S405 in FIG. 10 is replaced by mathematical formula (13) below.

$$IG(n) = IG1(n) - Ipst(n) \cdot tpre1/tpre3 \quad (13)$$

Third Embodiment

Figure 14:
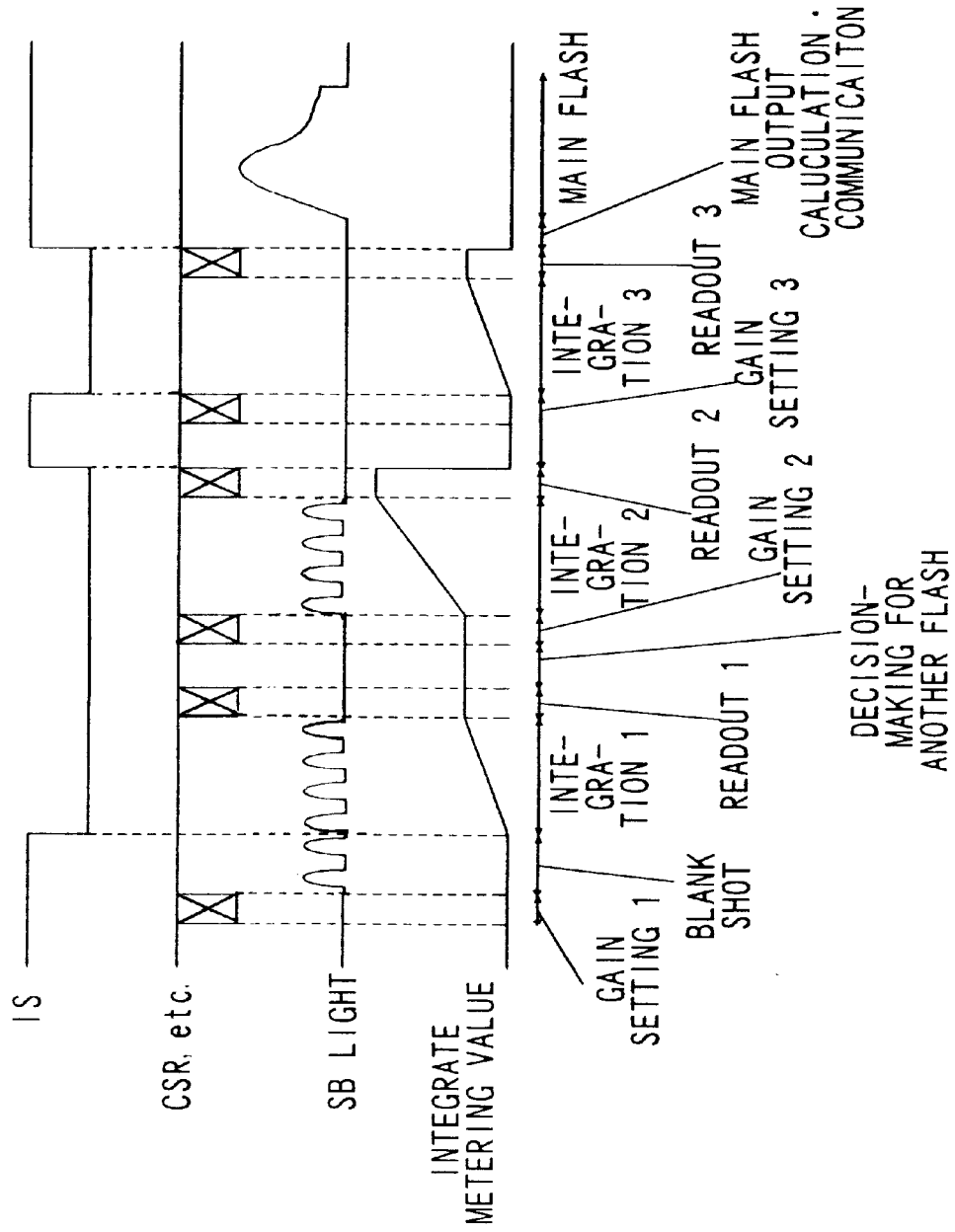
FIG. 14 illustrates the pre-flash operation achieved in a third embodiment.

FIG. 14, which illustrates the third embodiment of the present invention corresponds to FIG. 6, illustrating the first embodiment. It differs from the first embodiment in that even when the integrated value readout 1 is completed after the first pre-flash ends, no positive signal is input to the IS port and thus, the integrated value is not reset, as in the second embodiment. As a result, at the start of the second pre-flash, an integrating operation is performed by adding up to the integrated value of the first pre-flash that has been retained and the first integrated value is not wasted.

In addition, it differs from the second embodiment in that the gain setting for the second pre-flash is changed from the gain setting for the first pre-flash. The gain G3(n) and the length of integration time tpre3 for the ambient light integration are set at the same value as that used in the second pre-flash to facilitate subsequent arithmetic operations in this example. Namely, G3(n)=G2(n) and tpre3=tpre2. In the third embodiment, mathematical formula (5) in step S403 and mathematical formula (6) used in step S405 in FIG. 10 are respectively replaced with the following mathematical formulae (14) and (15).

$$IG(n)=IG2(n)-Ipst(n)\cdot(1+(tpre1/tpre3)\cdot(G1(n)/G3(n))) \quad (14)$$

$$IG(n)=IG1(n)-Ipst(n)\cdot(tpre1/tpre3)\cdot(G1(n)/G3(n)) \quad (15)$$

Fourth Embodiment

Figure 15:
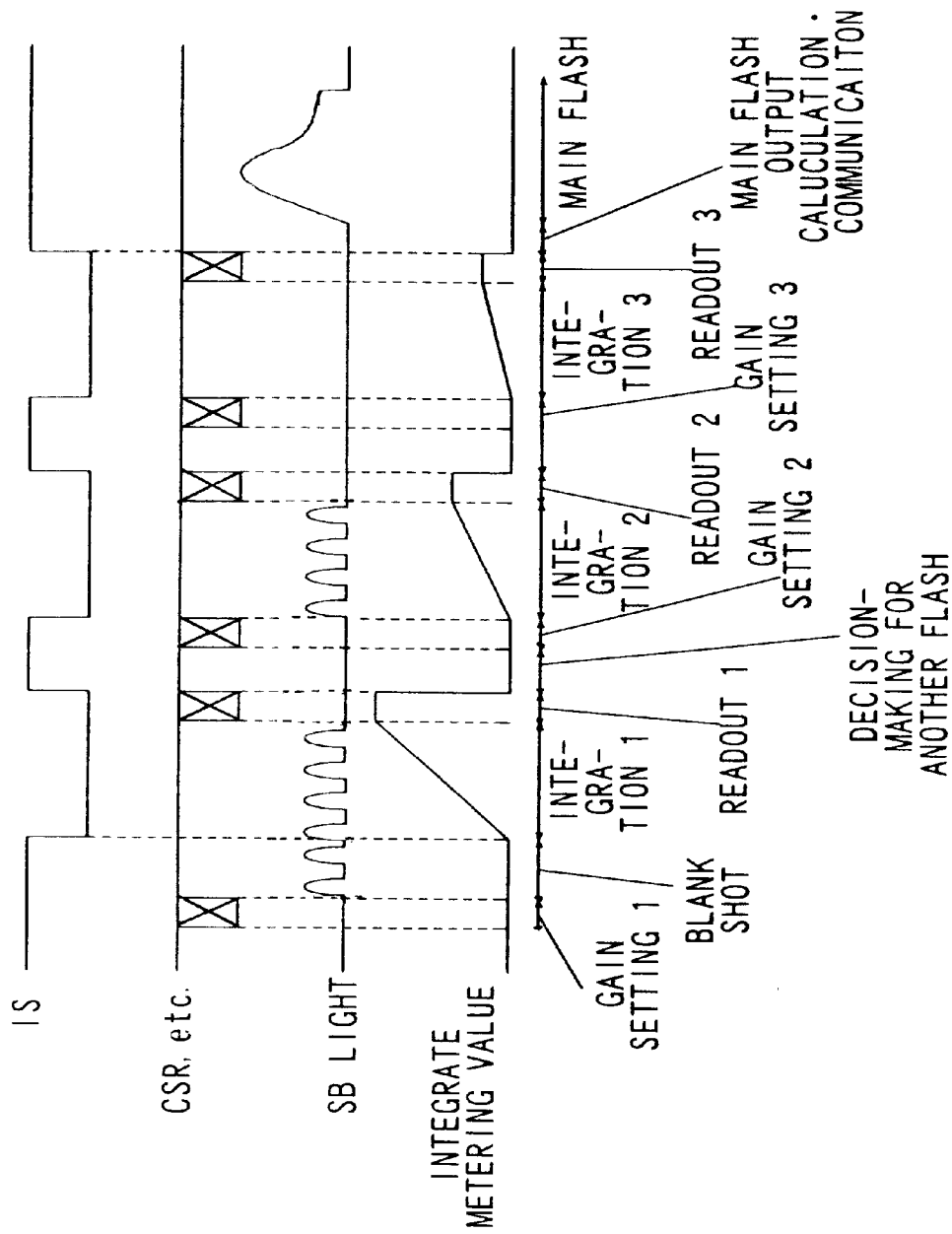
FIG. 15 illustrates the pre-flash operation achieved in a fourth embodiment.

FIG. 15, which illustrates the fourth embodiment of the present invention, corresponds to FIG. 6 illustrating the first embodiment. It differs from the first embodiment in that the second pre-flash is performed with the gain setting lowered if the light quantity achieved through the first pre-flash is excessively large.

In this case, a decision may be made to perform a second pre-flash if even one of IG1(1)~IG1(5) has become saturated (IGth=255). The gains may be set by, for instance, having Goffset in mathematical formula (4) at −3 (EV) and setting the second gains uniformly lower than the first gains by −3EV (sensitivity multiplied by a factor of 1/8).

Variations

The present invention is not limited to the embodiments described above and a number of variations and modifications may be made without departing from the scope of the invention.

(1) While the explanation is given on the embodiments above on a situation in which the light quantity is either insufficient or has saturated (overflowed) in at least one of the divided metering areas during the first pre-flash, it is conceivable that the light quantity is insufficient in one of the plurality of divided metering areas with an overflow occurring in another area. In such a case, the second pre-flash may be performed by lowering the gain, to ascertain the value corresponding to the area with the greatest light quantity.

(2) While the explanation is given above on an example in which two pre-flashes are performed, three or more pre-flashes may be performed by raising the gains and then lowering the gains.

(3) While the gains are set in the gain setting 3 at values that are the same as those set during the integrating operation 2 and the data corrected in proportion to the gains used when subtracting the data obtained through the integration 3 from the data obtained through the integration 1 in the explanation above, the gains may be set in the gain setting 3 at the same values as those in the integrating operation 1 instead to use data corrected in proportion to the gain when subtracting the data obtained through the integration 3 from the data obtained through the integration 2.

Fifth Embodiment

The electronic flash control apparatus for a camera in the fifth embodiment is similar to the camera having the optical system illustrated in FIG. 1 and thus, FIG. 1 will be used for reference as necessary in the explanation below.

Figure 16:
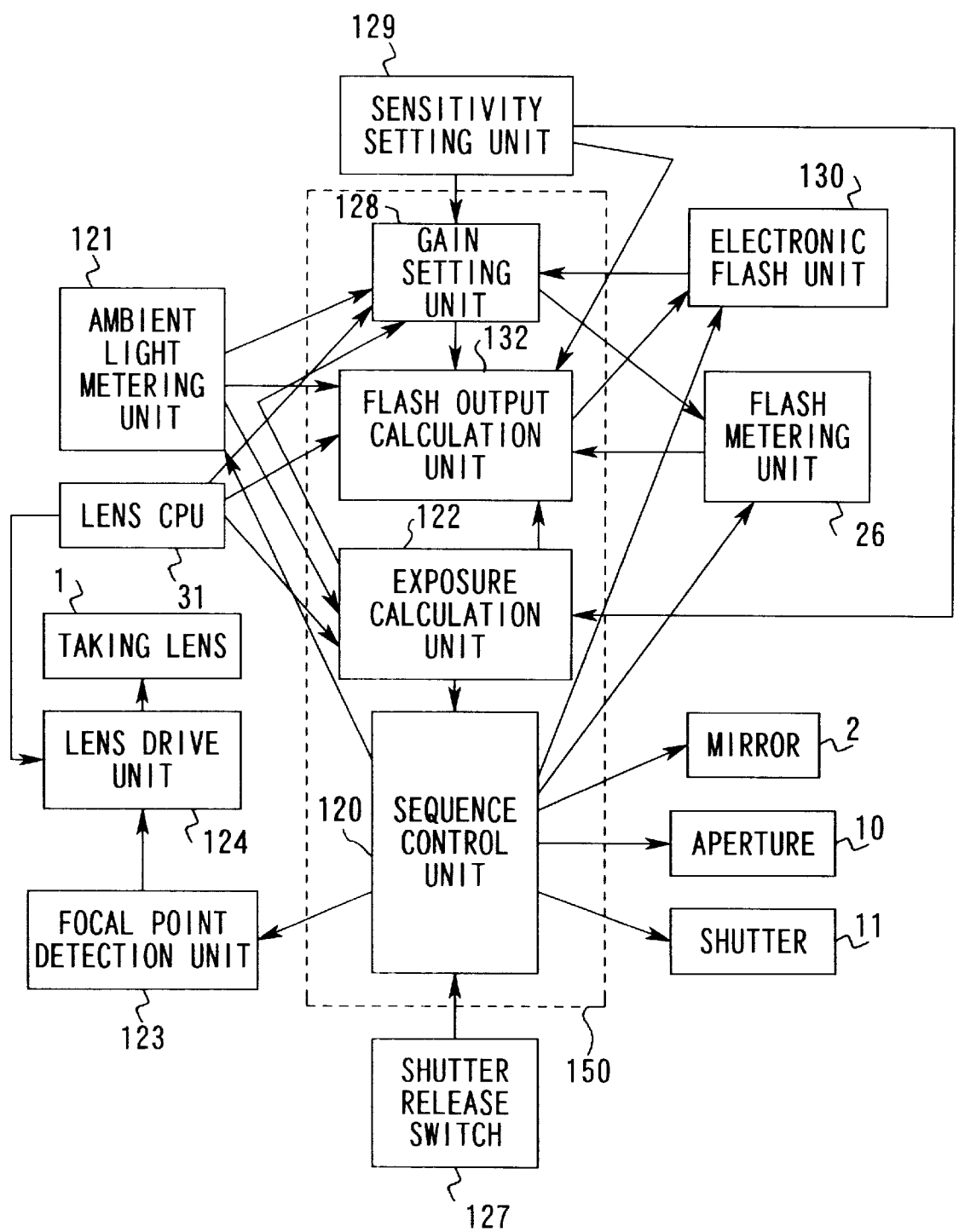
FIG. 16 is a block diagram illustrating the structure of a fifth embodiment.

FIG. 16 is a block diagram schematically illustrating the structure of the fifth embodiment of the present invention.

Figure 17:
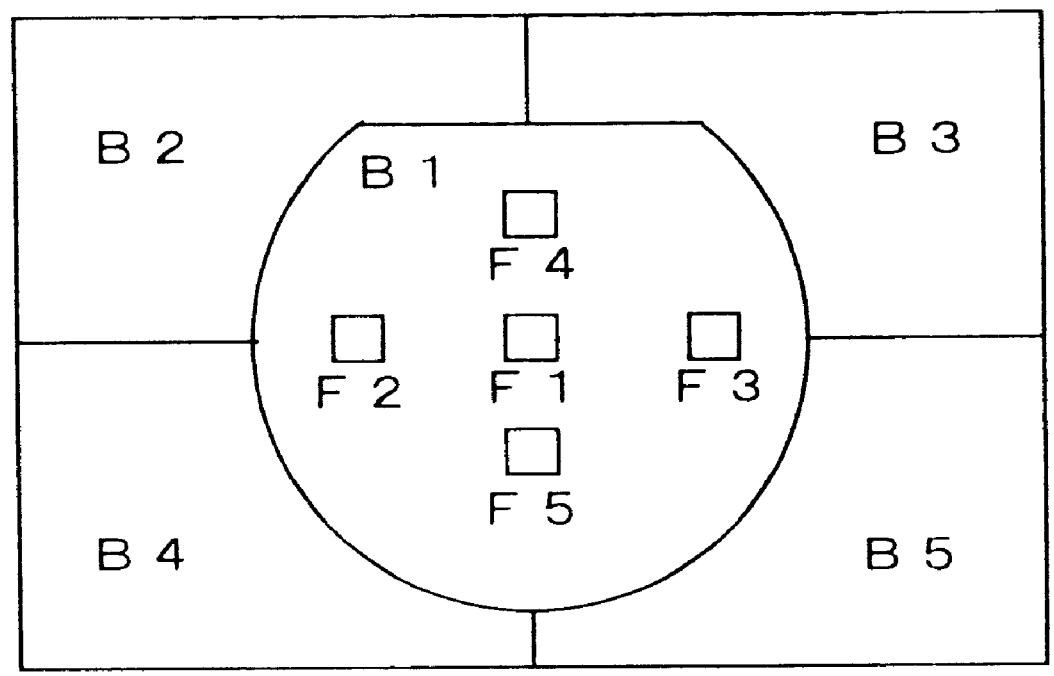
FIG. 17 illustrates the pattern achieved at the ambient light metering unit achieved through division, and the focal point detection unit in the fifth embodiment.

An ambient light metering unit 121 is a circuit that divides a photographic field into five areas and performs metering for the individual areas as illustrated in FIG. 17, and its metering output is output to an exposure calculation unit 122.

The exposure calculation unit 122 calculates a correct exposure value for ambient light exposure based upon the output from the ambient light metering unit 121, lens information such as the open aperture value, the focal length and the exit pupil position of the taking lens stored inside the lens CPU 31 constituted of a microprocessor and provided inside the taking lens 1, sensitivity information with respect to the sensitivity of the imaging device 14 output by a sensitivity setting unit 129 and the like, calculates the aperture value and the shutter speed based upon the correct exposure value and outputs them to a sequence control unit 120.

In response to a release signal from a shutter release switch 127, the sequence control unit 120 implements control on a sequence of operations causing the quick-return mirror 2 shown in FIG. 1 to swing up and recover its initial position, setting the aperture 10 to a predetermined value and recover its initial position, issuing instructions for pre-flash/main flash to an electronic flash unit 130 and control on the shutter 11.

A gain setting unit 128 calculates the amplification gain (e.g., the gain at an amplifier that amplifies the output from the metering element or the like) at the flash metering unit 26 based upon the metering information from the ambient light metering unit 121, the aperture value information from the exposure calculation unit 122 and the sensitivity information from the sensitivity setting unit 129 and sets the gain at the flash metering unit 26. The flash metering unit 26 performs an integrating operation on the reflected subject light during a pre-flash using the gain set by the gain setting unit 128 and outputs the integrated value to a flash output calculation unit 132. The flash output calculation unit 132 calculates a main flash output based upon the integrated pre-flash value output by the flash metering unit 26, the metering values output by the ambient light metering unit 121, the photographing distance value output by the lens CPU 31, the aperture value output by the exposure calculation unit 122, the sensitivity value output by the sensitivity setting unit 129 and the like, and outputs the calculated value to the electronic flash unit 130.

The electronic flash unit 130 performs a pre-flash operation and a main flash operation in response to a timing signal provided by the sequence control unit 120. The pre-flash operation is implemented over the number of shots specified by the sequence control unit 120 at a specific small flash output, whereas the main flash operation is implemented at a flash output corresponding to the information provided by a flash output calculation unit 132.

In response to an instruction signal provided by the sequence control unit 120, a focal point detection unit 123 detects the focusing state of the subject present within a focal point detection area and adjusts the focus to the subject by driving the taking lens 1 with the lens drive unit 24.

The operations performed by the exposure calculation unit 122, the gain setting unit 128, the flash output calculation unit 132 and the sequence control unit 120 are realized by a single-chip MPU 150 executing a program that is to be detailed later.

FIG. 17 illustrates how the photographic field is divided to allow the metering element 9 to meter the individual areas and the positions within the photographic field at which focal point detection is performed by the focal point detection unit 17. The metering element 9 is capable of performing metering by dividing almost the entire plane of the photographic field into five areas and outputting metering values B1~B5 corresponding to the individual divided areas. In addition, the focal point detection unit 17 is capable of detecting the focusing states in five areas F1~F5.

Since the metering areas used by the flash metering unit 26 and the structure and the operation of the flash metering unit 26 are identical to those explained in reference to FIGS. 4 and 5A~5C illustrating the first embodiment, their explanation is omitted.

Figure 18:
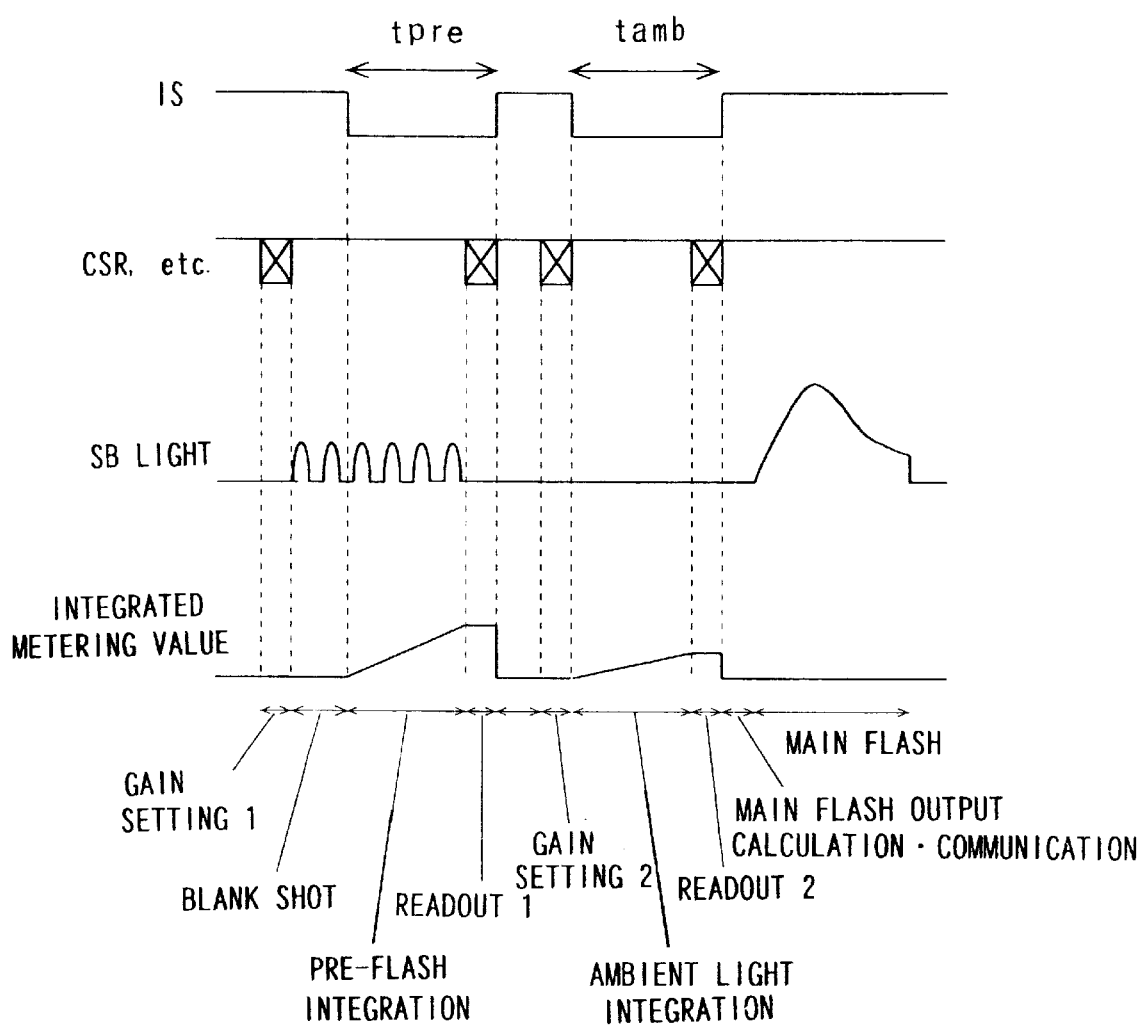
FIG. 18 illustrates the pre-flash operation achieved in the fifth embodiment.

FIG. 18 illustrates the pre-flash operation. When a release signal is input and the aperture is set to a preset value, the gain setting unit 128 sets gains (gain setting 1) for the pre-flash. The method for calculating the gains is to be detailed later. Then, after emitting two blank shots through chopped flash to warm up the electronic flash unit 130 and the flash metering unit 26, a pre-flash integrating operation (integration 1) is started by inputting a negative edge signal to the IS port and, at the same time, a first pre-flash is implemented.

The pre-flash ends when the integrated metering value reaches a correct level or when the number of chopped flashes reaches a specific value. The MPU 150 inputs a positive edge signal to the IS port and resets the integrated value after reading out the integrated value (readout 1). Since the ambient light component is contained as well as the reflected portion of the SB light in the integrated values obtained during the pre-flash, the MPU 150 performs an integrating operation only on the ambient light after the pre-flash is completed, and it performs an arithmetic operation to subtract the ambient light component from the integrated pre-flash values through subsequent arithmetic processing. During gain setting 2, the gains for integrating the ambient light are set, and then, the ambient light is integrated (integration 2) by inputting a negative edge signal to the IS port as in the pre-flash. The gain setting and the length of time of the integrating operation during the ambient light integration are to be explained later.

When the ambient light integration is completed, the MPU 150 inputs a positive edge signal to the IS port after reading out the integrated value and resets the integrated value (readout 2). Then, the MPU 150 uses an algorithm which is to be detailed later to calculate the main flash output, communicates the calculated value to the electronic flash unit 130 and implements main flash control concurrently with the photographing operation to complete the photographing process.

Figure 19:
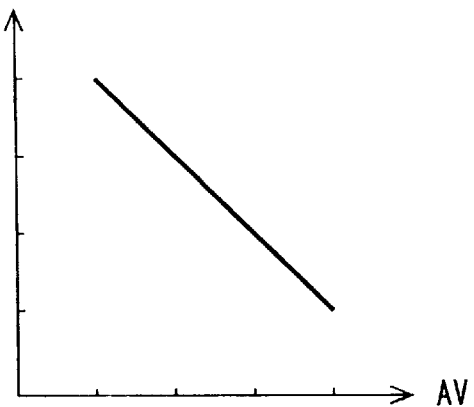
FIG. 19 is a simplified illustration of the relationship between various conditions and the integrated output.

FIG. 19 illustrates the relationship between the lens aperture value (unit: AV) and the output log IC from the flash metering unit 26. log IC is the logarithm of the output IC from the flash metering unit 26. In this example, it is assumed that the gain at the flash metering unit 26 (hereafter simply referred to as the gain) remains unchanged relative to changes in AV. As illustrated in the figure, as the AV value increases, i.e., as the aperture is constricted down, the output becomes reduced, since the quantity of light entering the sensor decreases as the opening diameter at the aperture 10 is reduced.

Figure 20:
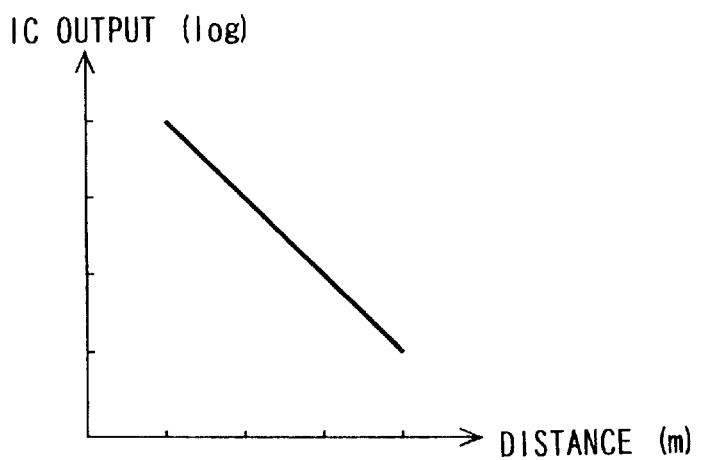
FIG. 20 is a simplified illustration of the relationship between various conditions and the integrated output.

FIG. 20 illustrates the relationship between the photographing distance (unit: m) and the output log IC from the flash metering unit 26. log IC represents a value calculated as explained in reference to FIG. 19. The gain remains unchanged relative to changes in the distance. As illustrated in FIG. 20, the output becomes reduced as the distance increases, since the quantity of reflected light decreases in reverse proportion to the square of the distance.

Figure 21:
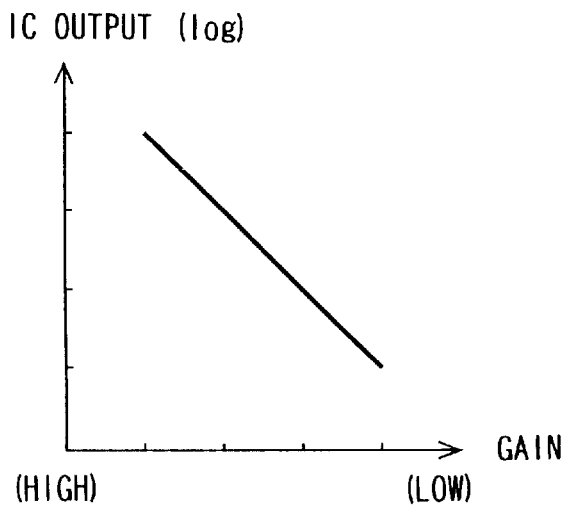
FIG. 21 is a simplified illustration of the relationship between various conditions and the integrated output.

FIG. 21 illustrates the relationship between changes in the gain (unit: ratio against the reference gain) and the output log IC from the flash metering unit 26. The output log IC increases in proportion to the increase in the gain. It is to be noted that the gain is lower further toward the right side along the horizontal axis in FIG. 21, since specifications whereby the gain is increased by setting the value to be input to the port DA at the flash metering unit 26 at a lower value as is to be explained later are adopted.

Figure 22:
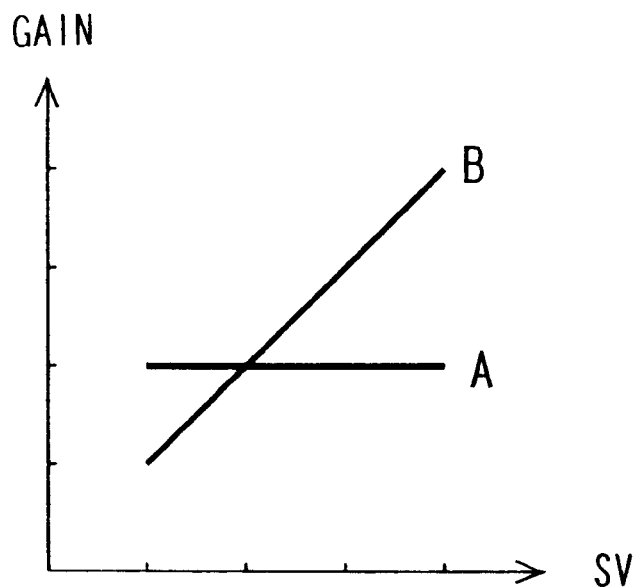
FIG. 22 is a simplified illustration of the relationship between various conditions and the gain.

FIG. 22 illustrates the relationship between the sensitivity setting (unit: SV) at the imaging device 14 and the gain set at the flash metering unit 26. "A" represents the relationship achieved when the gain setting remains constant relative to any changes in SV, whereas B represents the relationship achieved when the gain changes in correspondence to changes in SV.

Figure 23:
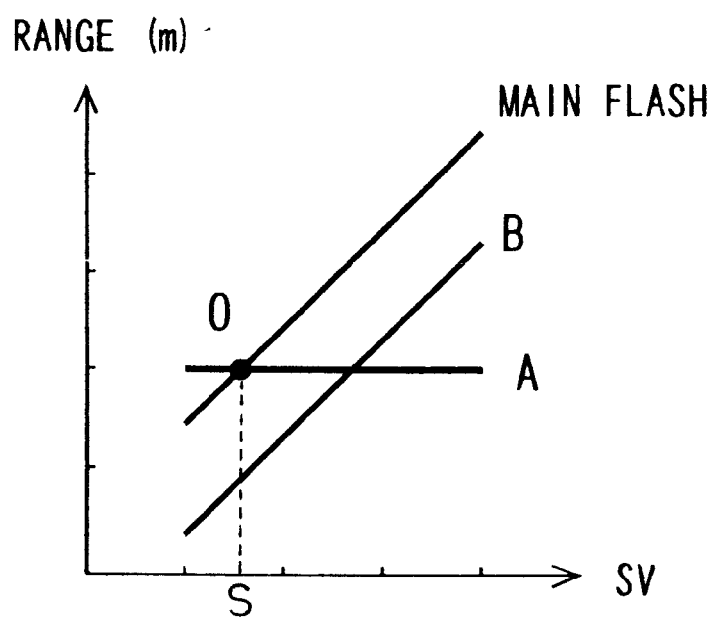
FIG. 23 is a simplified illustration of the relationship between various conditions and the SB light range.

FIG. 23 illustrates the relationship achieved during the main flash between the sensitivity setting (unit: SV) at the imaging device 14 and the range (unit: logarithmic value of the distance) of the SB light. In FIG. 23, the maximum distance (hereafter this is also referred to as the "range") over which the light reflected by the subject can be detected by the flash metering unit 26 is also illustrated in correspondence to the gain set for the pre-flash operation, as in FIG. 22, in addition to the relationship described above. The range of the SB light in this context refers to the maximum distance over which correct exposure can be achieved with a flash of light emitted by the SB 15 and irradiated onto the subject under a given photographing condition (e.g., aperture value) during the main flash.

As illustrated in FIG. 23, the range increases as SV becomes higher, i.e., as the sensitivity is set higher, in the main flash operation and case B, whereas the range remains constant in case A. Assuming that the pre-flash operation is implemented under conditions represented by A, the reflected light resulting from the pre-flash can be measured within the range achieved in the main flash operation if SV is smaller than the sensitivity S which corresponds to the point 0 at which the range during the pre-flash and the range during the main flash are equal to each other. However, when SV is higher than the sensitivity S, the range in the pre-flash becomes smaller than the range in the main flash and, as a result, an integrated pre-flash value achieving a sufficient degree of accuracy cannot be obtained. Consequently, the main flash output cannot be calculated with a high degree of accuracy within this SV range.

Under conditions corresponding to B, since the gain at the flash metering unit 26 is changed in correspondence to the SV value, the range in the pre-flash increases in correspondence to the SV value as in the main flash operation. In FIG. 23, the range in case B is always shorter than the range in the main flash. The reason for this is that while the gain setting at the flash metering unit 26 changes in correspondence to the SV value, the difference in the light quantity between the pre-flash output and the main flash output is not taken into consideration.

Figure 24:
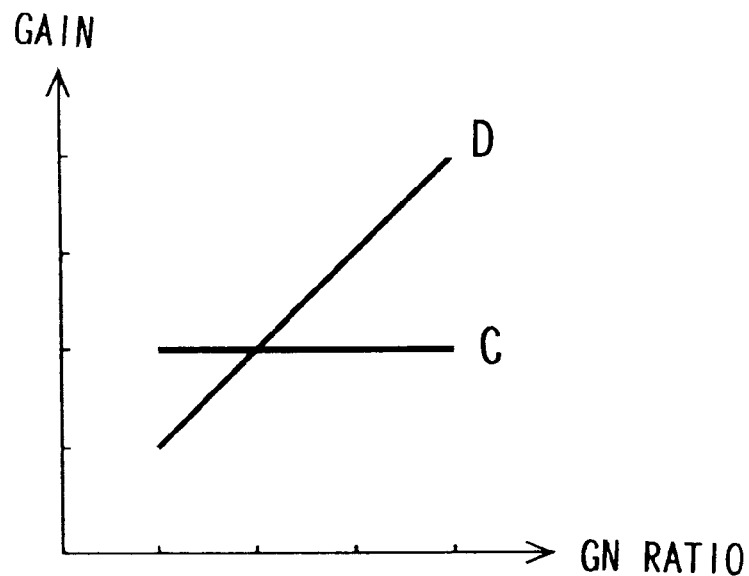
FIG. 24 is a simplified illustration of the relationship between various conditions and the gain.

FIG. 24 illustrates the relationship between the ratio (GN ratio) of the main flash guide number GNmain and the pre-flash guide number GNpre, and the gain set at the flash metering unit 26 for a pre-flash operation. In case C, the gain remains constant relative to any changes in the GN ratio, whereas in case D, the gain is changed in correspondence to changes in the GN ratio. GNmain and GNpre respectively represent the maximum flash outputs that can be achieved in the main flash and the pre-flash. If different types of SBs having varying maximum flash outputs can be mounted and GNpre remains constant regardless of the type of SB that is mounted, the GN ratio changes in correspondence to changes in GNmain.

Figure 25:
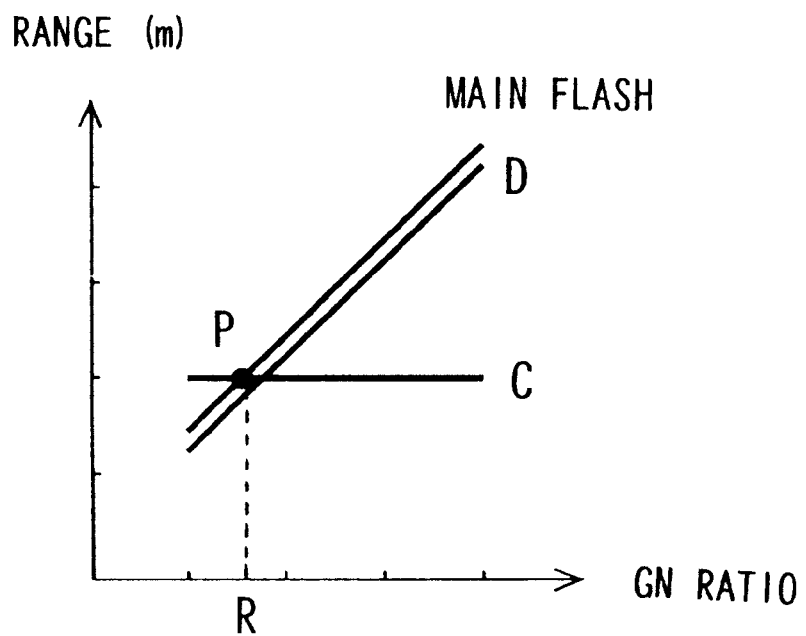
FIG. 25 is a simplified illustration of the relationship between various conditions and the SB light range.

FIG. 25 illustrates the relationship between the main flash guide number (unit: GN) used in the main flash operation and the range (unit: the logarithmic value of the distance) of the SB light. The definition of the range of the SB light has already been explained in reference to FIG. 24. In addition to the relationship described above, FIG. 25 illustrates relationships achieved between the range in the pre-flash operation and the conditions corresponding to cases C and D shown in FIG. 24. As illustrated in the figure, in the main flash operation and case D, the range increases as the GN ratio becomes higher, i.e., as the flash output increases, whereas the range remains constant regardless of changes in the GN ratio in case C.

Assuming that the pre-flash is implemented under the conditions represented by C, the reflected subject light from the pre-flash can be measured within the range achieved in the main flash operation by the flash metering unit 26 if the GN ratio is smaller than the GN ratio R which corresponds to the point P at which the range during the pre-flash and the range during the main flash are equal to each other. However, when the GN ratio is larger than R, the range in the pre-flash becomes smaller than the range in the main flash and, as a result, an integrated pre-flash value achieving a sufficient degree of accuracy cannot be obtained. Consequently, the main flash output cannot be calculated with a high degree of accuracy within this GN range.

Under the conditions corresponding to case D, in which the gain setting at the flash metering unit 26 for the pre-flash operation is changed in correspondence to the GN ratio of the main flash output, the range increases in proportion to the GN ratio as in the main flash even when the pre-flash output remains constant. While the range in case D is somewhat shorter than the range in the main flash to simplify the illustration in FIG. 25, it is possible to logically match them by setting the gain at the correct level relative to the GN ratio.

In the explanation above, cases A and C correspond to the prior art and cases B and D correspond to the present invention.

Figure 26:
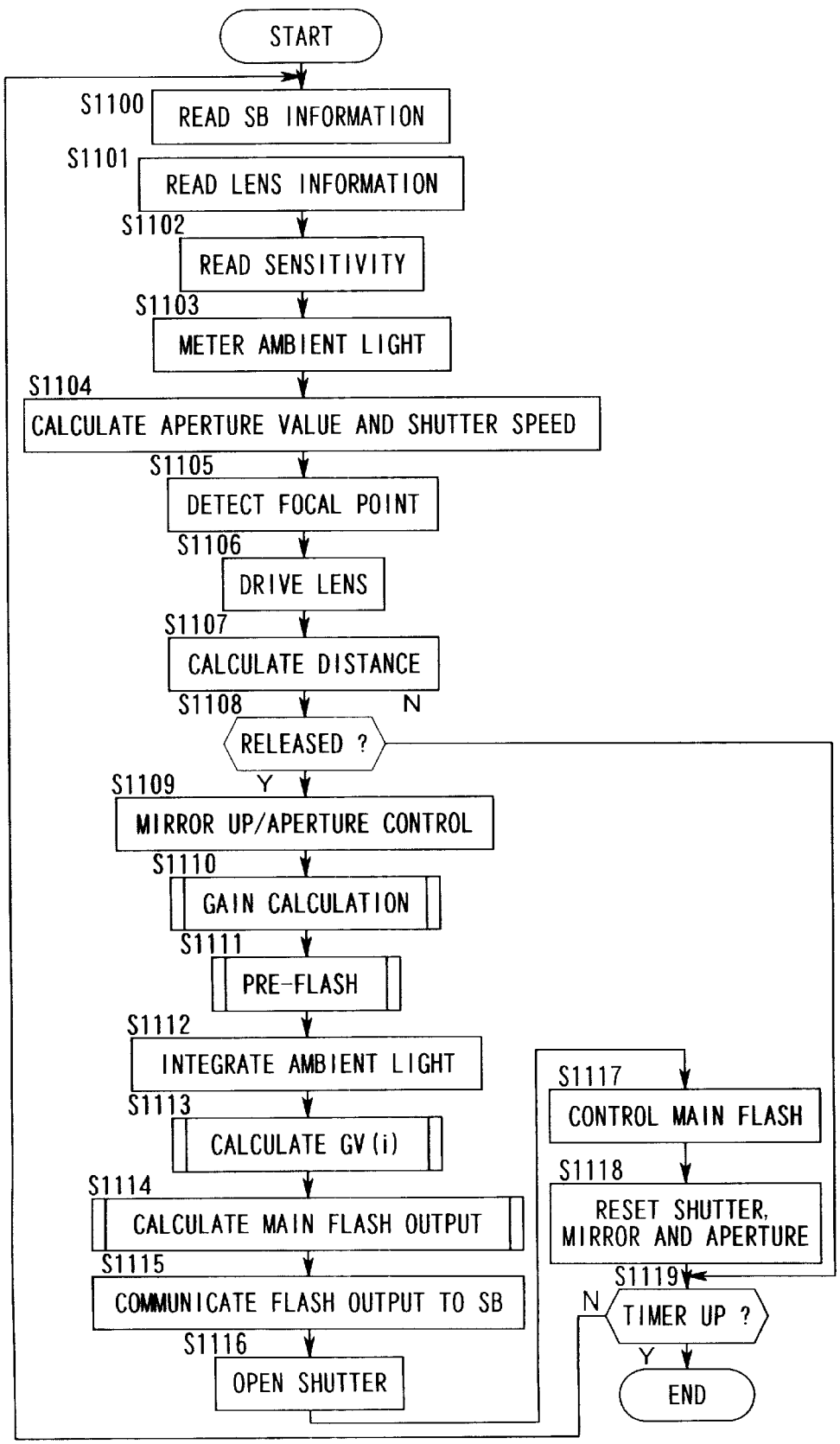
FIG. 26 is a flowchart of an algorithm used in the fifth embodiment.

FIG. 26 is a flowchart of the program executed by the MPU 150. The power at the camera is turned on by pressing a shutter release switch 127 of the camera halfway down and the program is executed. First, in step S1100, the MPU 150 engages in communication with an SB CPU (not shown) provided within the electronic flash unit 130 to read the full flash guide number GN and the guide number GNp1 per pre-flash shot of the SB (both at the sensitivity setting at the CCD 14 equivalent to ISO 100). In step S1101, the MPU 150 engages in communication with the lens CPU 31 provided inside the taking lens to read information such as the release F value, the focal length and the exit pupil position of the taking lens. Next, in step S1102 the MPU 150 reads the sensitivity value of the imaging device 14 either manually or automatically set at the sensitivity setting unit 129. Then, in step S1103 the MPU 150 implements ambient light metering via the metering element 9, obtains brightness information corresponding to the areas B1~B5 by performing correction using the lens information read in step S1101, and performs ambient light exposure calculation through a method of the known art based upon the values thus obtained to determine a correct exposure value BVans. In step S1104, the MPU 150 calculates the aperture value and the shutter speed for the photographing operation in correspondence to BVans and the sensitivity value.

In step S1105, the MPU 150 receives the results of the focal point detection from a focal point detection unit 123 and, in step S1106, it drives the taking lens 1 via the lens drive unit 124 until the defocus quantity becomes 0. In step S1107, the MPU 150 determines the subject distance based upon the photographing distance information at the focused position output by the lens CPU 31. Then, in step S1108, the MPU 150 makes a decision as to whether or not the shutter release switch 127 has been pressed all the way down, and if it is decided that the shutter release switch has been pressed all the way down, the operation proceeds to step S1109, whereas the operation jumps to step S1119 otherwise. In step S1109, the MPU 150 causes the quick-return mirror to swing upward and sets the aperture value at the aperture 10 to the value determined in step S1104.

After setting the gain at the flash metering unit 26 for a pre-flash in step S1110, the MPU 150 implements a pre-flash and reads out the integrated metering values IGpre(1)~IGpre(5) corresponding to the areas S1~S5 from the flash metering unit 26 in step S1111. The specific methods employed to set the gain and to perform the pre-flash are to be explained in detail later. When the pre-flash is completed, the MPU 150 reads out the integrated ambient light values IGamb(1)~IGamb(5) from the flash metering unit 26, in step S1112. For the ambient light integration, the MPU 150 sets the gain and the length of integration time at the same values as those used during the pre-flash. Namely, tpre=tamb in FIG. 18.

In step S1113, the MPU 150 calculates GV(1)~GV(5) corresponding to the individual flash control areas S1~S5 based upon the integrated values obtained through the pre-flash and the like. GV(i) (i=1 . . . 5) represents a variable related to the reflectivity of the subject in a given area and is expressed by using the unit EV. The method for calculating GV(i), too, is to be explained in detail later. In step S1114, the MPU 150 calculates the main flash output for the photographing operation through a method which is to be detailed later based upon the results of the calculation of GV(i), and in step S1115, it communicates the value thus calculated to the electronic flash unit 130 through communication.

In step S1116, the MPU 150 opens the shutter 11, and in step S1117, it issues a main flash control signal to the electronic flash unit 130. In response to this control signal, the electronic flash unit 130 engages in flash output control for the main flash operation. When the main flash operation is completed, the MPU 150 restores the shutter 11, the aperture 10 and the mirror 2 to their respective initial positions in step S1118. In step S1119, the MPU 150 makes a decision as to whether or not a specific length of time has elapsed since a halfway-down position timer startup, and if it is decided that the specific length of time has not elapsed, the operation returns to step S1101 to repeat the processing, whereas if it is decided that the time is up at the timer, the processing ends.

Figure 27:
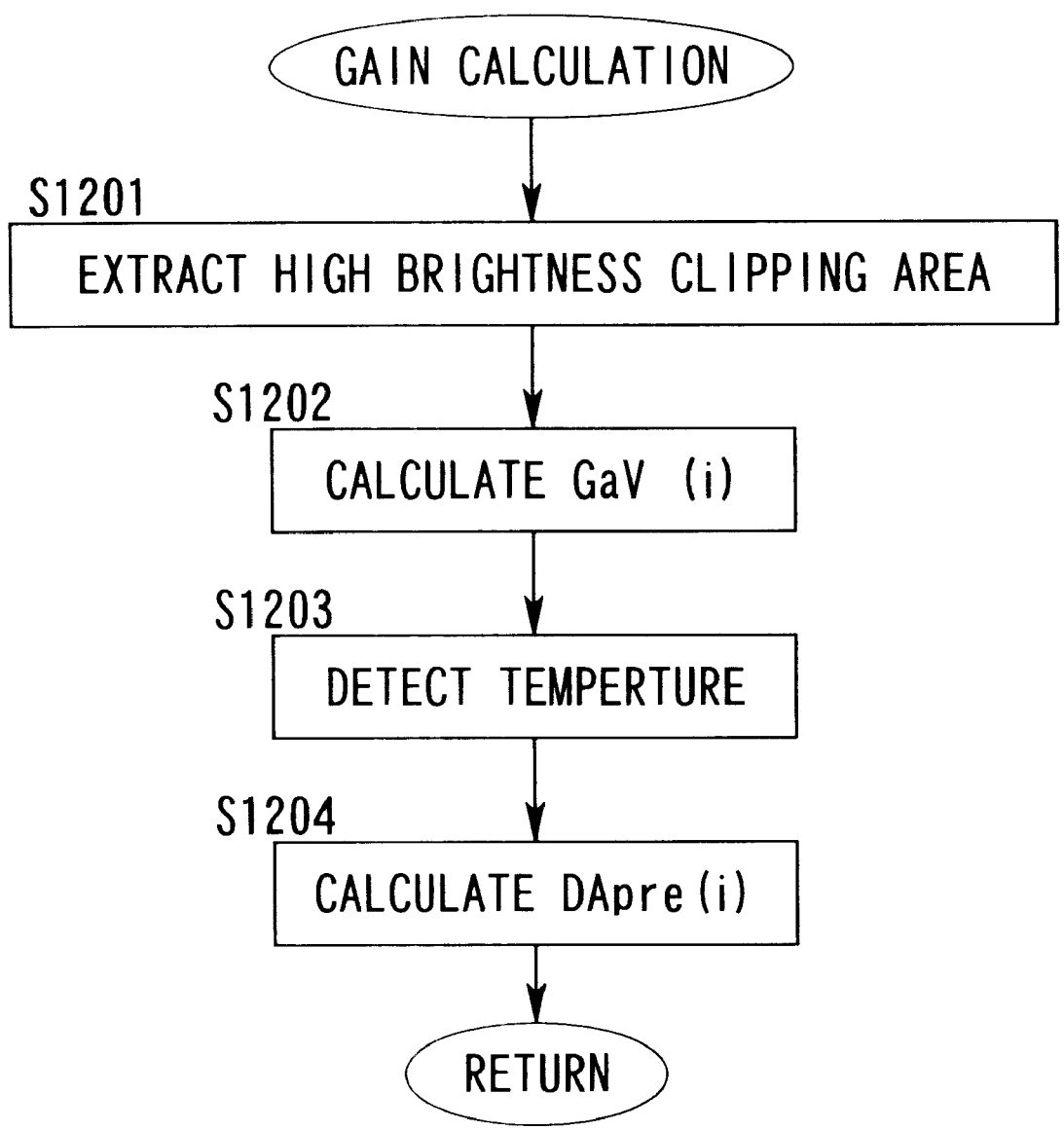
FIG. 27 is a flowchart of an algorithm used in the fifth embodiment.

FIG. 27 is a sub-routine flowchart of the method for calculating the gain to be set by the gain setting unit 128. This sub-routine is called up for execution by executing step S1110 in FIG. 26. First, in step S1201, the MPU 150 detects an area to undergo high brightness clipping processing. In the high brightness clipping processing, an area with a high degree of brightness that would adversely affect the integration of light reflected during the pre-flash operation is eliminated from the flash control area in advance by referencing the ambient light metering values B1~B5. More specifically, any area corresponding to any of the values B1~B5 that exceeds the Bvcut_th, i.e., the threshold value for high brightness clipping, is set as an area to undergo the high brightness clipping processing. However, if there are more than 3 such areas to undergo the clipping processing, the 3 darkest areas are set for flash control.

Next, in step S1202, the MPU 150 calculates Gav(i) (unit: EV, i=1 . . . 5) which is a critical variable for determining the gain to be set at the flash metering unit 26. A Gav(i) is calculated for each of the five flash control areas, with the gain increased by 1 EV each time the value goes up by 1. The specific method for calculating Gav(i) is to be explained in detail later. Next, in step S1203, the MPU 150 reads out a numerical value T which is in proportion to the current temperature output by the flash metering unit 26.

In step S1204, the MPU 150 calculates a gain DApre(i) to be actually set at the flash metering unit 26 through the following mathematical formula (16);

$$Dapre(i)=(pre\_level(i)-GaV(i) \cdot pre\_gamma) \cdot T/Tref, (i=1\sim 5) \quad (16),$$

with pre_level(i): reference value for pre-flash control level
pre_gamma: gamma control value
T: current temperature
Tref: temperature during adjustment Pre_level(i), pre_gamma and Tref are data stored in a non-volatile memory (such as an EEPROM) (not shown) in the camera.

In the formula above, GaV(i) is appended with a − sign, since specification whereby the gain increases as the voltage at the DA port of the flash metering unit 26 illustrated in FIG. 5A is lowered are adopted. It is to be noted that in a normal TTL flash control, GaV is directly substituted with the SV value, which is equivalent to the film sensitivity and the control is implemented to ensure that the gain is raised by one level when the film sensitivity increases by one level to output a stop signal at an image plane exposure quantity that is reduced by half.

The gain DApre(i) of an area having undergone the high brightness clipping processing in step S1201 is set at the lowest level to ensure that in practice, metering is not performed for the area.

Next, the method employed to calculate GaV(i) in step S1202 in FIG. 27 is explained. Gav(i), which is a critical variable for determining the gain to be set for each area at the photo-sensor 13, is determined through the following mathematical formula (17).

$$Gav(i)=SvV+GnV-XmV-BvV+MvV-Sa(i), \text{ with } i=1 \ldots 5 \quad (17)$$

Now, the individual variables in the right hand member are explained.

SvV is a correction value determined in correspondence to the sensitivity setting at the imaging device 14. Since light appears to reach points further away even with the same flash output during the main flash if the sensitivity is higher, SvV is set to increase the range during the pre-flash by raising the gain for the pre-flash and achieving a larger integrated output. In more specific terms, SvV is calculated through the following mathematical formula (18).

$$SvV=SV-5 \quad (18)$$

In the formula, SV indicates the value of the sensitivity setting (unit: SV) at the imaging device 14. SvV is calculated by subtracting 5 from SV to achieve SvV=0 when Sv=5, i.e., when the sensitivity setting is equivalent to ISO 100.

GnV is a correction value for the guide number difference between the main flash GN and the pre-flash GN at the SB that is currently mounted, and is calculated through the following mathematical formula (19).

$$GnV=\log 2(GN/GNp1/\sqrt{(Qpre\_max)})^{\wedge}2, \text{ when } GnV<GnVmax \quad (19)$$

with; GnVmax: GnV upper limit
log2: logarithm with a base of 2
GN: guide number during full main flash at a sensitivity setting equivalent to ISO 100
GNp1: guide number per one shot of pre-flash at sensitivity setting equivalent to ISO 100 and
Qpre-max: maximum number of pre-flashes In addition, $\sqrt{()}$ indicates the square root of the value within the parentheses and ^ is a symbol that indicates an exponential power. GnV is a variable that is used to cancel out the light quantity difference between the maximum GN (full light emission) in the main flash and the maximum GN in the pre-flashes (total amount obtained through chopped flash of Qpre_max shots at a light quantity of GNp1 per shot). The numerical value inside the logarithm is squared since GN changes by 1EV when multiplied by $\sqrt{2}$. However, if the gain is raised too high, the S/N characteristics of the integrated value deteriorate and thus, the upper limit of Gnv is regulated by using GnVmax.

XmV, which is a correction value used to correct the gain with a distance signal, is calculated through the following mathematical formula (20).

$$XmV=kxm \cdot \log 2(GN \cdot 2^{\wedge}\{(SV-5)/2\}/\{X \cdot F\})^{\wedge}2 \quad (20),$$

with kxm: distance correction coefficient
log2: logarithm with a base of 2
GN: guide number for full main flash at a sensitivity setting equivalent to ISO 100
^2: squared
SV−5: ISO sensitivity value (unit:SV) (5 is subtracted since the numerical value of GN corresponds to the ISO 100 standard)
X: current photographing distance (unit: m)
F: current aperture value setting (unit: F number)

While GaV is set by using SvV and GnV at the gain level which corresponds to the ISO sensitivity set at the corresponding time point and the maximum range during the main flash at the specific GN value, the actual photographing distance is normally shorter than the maximum range. Thus, unless modified, the gain level may be too high, resulting in an overflow in the integrated value. Thus, XmV is used to lower the gain in correspondence to the subject distance. kxm is a correction coefficient used to prevent overcorrection and normally a numerical value of approximately 0.5 is set for kxm.

BvV is a correction value used to prevent a stop signal from being generated due to the influence of bright ambient light as in a fill-flash photographing situation. Since the degree of influence of ambient light increases as the brightness becomes higher or as the photographing distance increases, BvV is calculated through the following mathematical formula (21) by using these factors as parameters.

$$BvV=BVave-BVofset+\log 2(X \wedge 2), \text{ when } 0<BvV<BvVmax \quad (21)$$

with; BVave: average brightness value of all flash control areas that have not undergone high brightness clipping processing (unit: BV)
BVofset: offset adjustment value
log2: logarithm with a base of 2
^2: squared
X: current photographing distance (unit: m)
BvVmax: brightness correction upper limit A numerical value of approximately 9 (unit: BV) is used for BVofset, and a numerical value of approximately 2 (unit: EV) is set for BvVmax.

MvV is a gain correction value which corresponds to the number of valid areas among the five areas S1~S5, and is calculated through the following mathematical formula (22).

$$MvV=\log 2(1/mval) \quad (22),$$

with; mval: number of valid areas

Under normal circumstances, the gains are set assuming that all of the five areas S1~S5 are valid areas, and a stop signal is generated when the sum total of the photo-currents output by the sensors metering the five areas has reached a specific value. However, if there is an area that has undergone clipping processing, the photo-current from the area is not input and thus, the gains for the other areas are raised to compensate for the loss of the photo-current to ensure that the stop signal is generated at the same flash output. In addition, the number of valid areas (mval) is the number of areas that have not undergone the high brightness clipping processing, determined through the high brightness clipping area detection processing in step S1201.

Sa(i) is a value used to correct the non-linearity of the ratio of the aperture value against the integration output value, and is expressed as a function of the aperture value. In addition, the value of Sa(i) varies among different areas (mainly difference is observed between the central area and the peripheral area). Since the value of Sa(i) is dependent upon the optical system and the like of the flash metering unit 26, it is desirable to calculate Sa(i) value by ascertaining the relationship between the aperture value and the integration output value through actual measurement.

Figure 28:
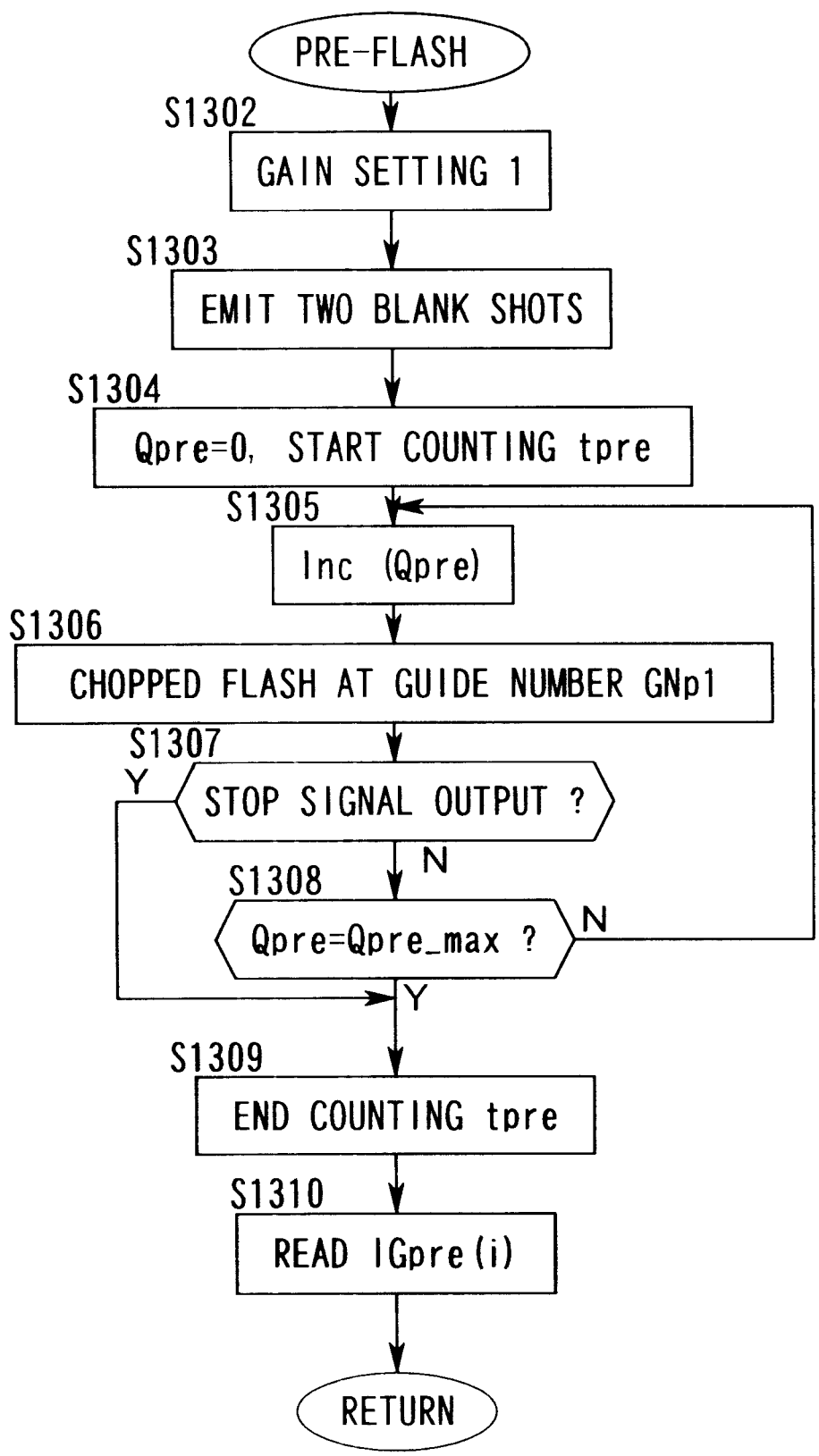
FIG. 28 is a flowchart of an algorithm used in the fifth embodiment.

FIG. 28 is a sub-routine flowchart of the control method implemented during a pre-flash by the MPU 150. This sub-routine is called up for execution by executing step S1111 in FIG.26. First, in step S1302, the MPU 150 sets the amplification gain DAPpre(i) for the pre-flash determined in FIG. 27 at the flash metering unit 26.

Next, in step S1303, the MPU 150 performs two blank shots to warm up the flash tube at the SB 15. In step S1304, the MPU 150 sets the variable Qpre that indicates the number of pre-flashes to 0, starts measuring the length of pre-flash time tpre1 and also starts an integrating operation by setting the level of the IS port at the flash metering unit 26 to L.

In step S1305, the MPU 150 adds 1 to Qpre. In step S1306, the MPU 150 implements a pre-flash at the light quantity corresponding to the guide number GNp1, and then in step S1307, it makes a decision as to whether or not a stop signal has been output. If it is decided that a stop signal has been output, the operation skips the next step S1308 to directly proceed to step S1309, whereas the operation proceeds to step S1308 otherwise to make a decision as to whether or not the number of pre-flashes Qpre has reached the maximum value, i.e., Qpre_max (standard value: 16). If it is decided that the number of pre-flashes Qpre has reached Qpre_max, the MPU 150 ends the pre-flash operation and proceeds to step S1309, whereas the operation returns to step S1305 otherwise to perform another pre-flash. Since an upper limit is provided with respect to the overall total of the pre-flash output, it is possible to assure a sufficient flash output for the main flash with a high degree of reliability.

When the pre-flash is completed, the MPU 150 ends the count of the pre-flash time tpre in step S1309. Then, in step S1310, the MPU 150 reads out the integrated values IG1(1)~IG1(5) indicated by the signals output by the sensors corresponding to the flash control areas S1~S5 from the flash metering unit 26 and ends the processing.

Figure 29:
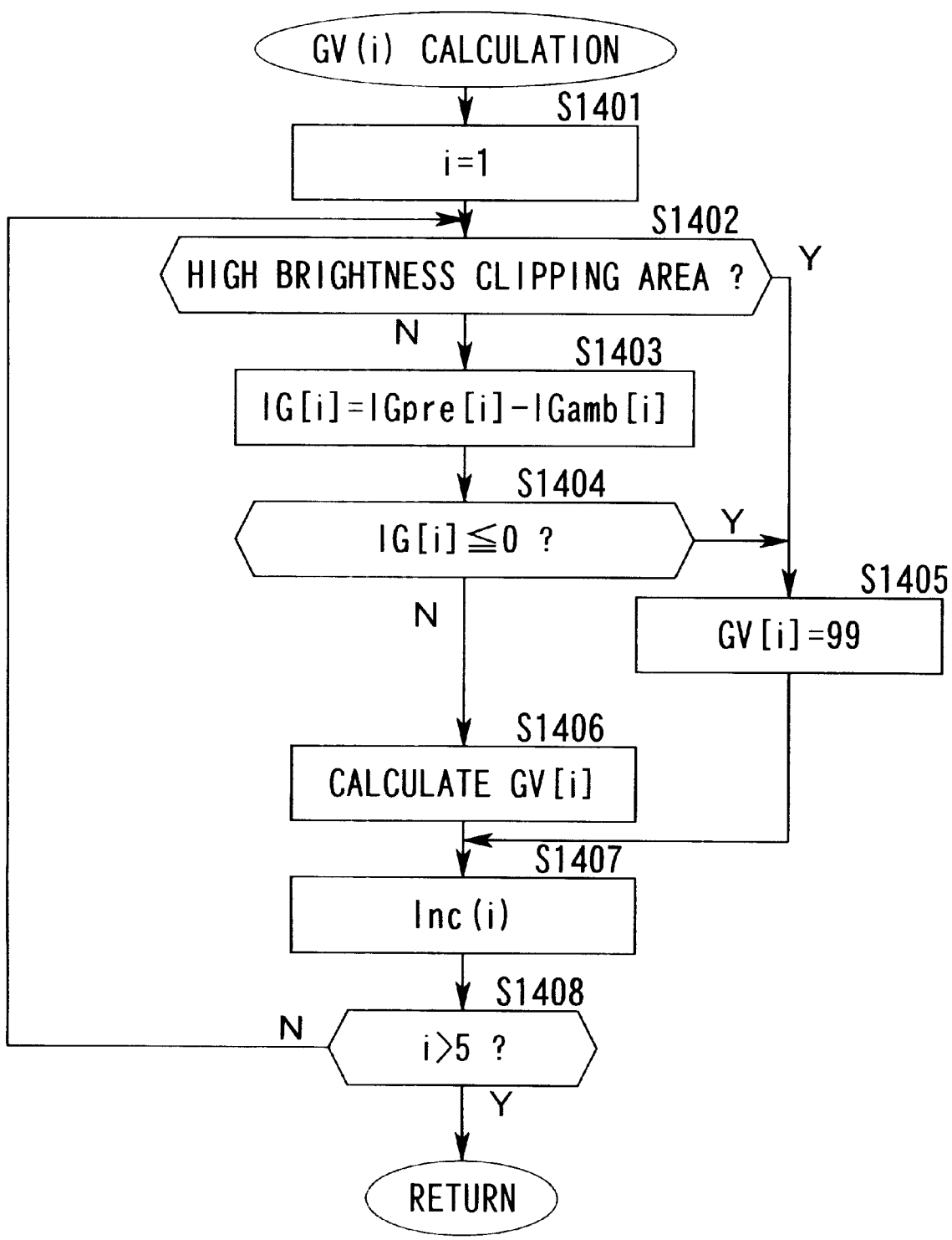
FIG. 29 is a flowchart of an algorithm used in the fifth embodiment.

FIG. 29 is a flowchart of the method employed to calculate GV(i) in step S113 in FIG. 26. GV(i) (i=1 . . . 5) is a variable that is related to the reflectivity of the subject in each area as explained earlier, which indicates the guide number of SB light in units of EV that achieves the correct exposure quantity for a subject with a standard reflectivity (18%).

First, in step S1401, the MPU 150 substitutes the variable i specifying an area with 0. Then, in step S1402, it makes a decision as to whether or not the area i is specified as a high brightness clipping area. If an affirmative decision is made, it means the area is not an object of flash control, and thus, the MPU 150 substitutes GV(i) corresponding to the area with 99 in step S1405.

In step S1403, the MPU 150 calculates the net integrated value IG(i) using mathematical formula (23).

$$IG(i)=IGpre(i)-IGamb(i) \tag{23}$$

Namely, by subtracting the integrated value indicated by the signal that represents only the detected ambient light without a pre-flash from the integrated value indicated by the signal detected during the pre-flash, the MPU 150 determines the integrated value constituted of only the reflected light component in the pre-flash.

In step S1404, the MPU 150 makes a decision as to whether or not IG(i) is equal to or less than 0, and if it is decided that IG(i) is equal to or less than 0, which means that Gv(i) cannot be calculated, the operation proceeds to step S1405. If, on the other hand, GV(i)>0, the MPU 150 calculates GV(i) in step S1406. GV(i) is calculated through the following mathematical formula (24).

$$GV(i)=\log 2\,(GNrtn(i))^2 \tag{24}$$

GNrtn(i) in the above formula is calculated through the following mathematical formula (25).

$$GNrtn(i)=GNp1 \cdot \sqrt{(Qpre)} \cdot \sqrt{(2^{\wedge}(Gav(i)+Sa(i)))} \cdot \sqrt{(IGstop/mval/IG(i))} \tag{25}$$

with GNp1: guide number corresponding to one pre-flash (ISO 100 equivalent)
Qpre: number of pre-flashes
IGstop: sum total of the individual values of IG(i) (i=1 . . . 5) when a stop signal is output
mval: number of valid areas
IG(i): net integrated value indicated by signal output by sensor corresponding to one of the individual areas during pre-flash GNrtn(i) value indicates a specific flash output that achieves a standard exposure quantity (0.1Lx·S in ISO 100 conversion) for the corresponding area i. In other words, when the subject has a standard reflectivity, GNrtn(i) satisfies the following mathematical expression (26) in relation to the distance X and the aperture F.

$$GNrtn(i)=X \cdot F \tag{26}$$

Thus, GV(i) is calculated by converting the guide number that achieves the standard exposure quantity for a subject with a standard reflectivity into units of EV. In addition, based upon mathematical formula (24) and mathematical formula (26), GV(i) can be calculated through the following mathematical formula (27) without having to calculate GNrtn(i).

$$GV(i)=\log 2(GNp1^{\wedge}2 \cdot Qpre)+(Gav(i)+Sa(i))+\log 2(IGstop/mval/IG(i)) \tag{27}$$

Then, after incrementing i in step S1407, the MPU 150 makes a decision in step S1408 as to whether or not i has exceeded 5, and if it is decided that i is equal to or less than 5, the operation returns to step S1402, whereas the processing ends if i>5.

Next, the method of main flash output calculation implemented in step S1114 in FIG. 26 is explained. First, using GV(i) corresponding to the individual areas calculated by using mathematical formula (27), the subject reflectivities RefEV(i) in the individual areas are calculated through mathematical formula (28).

$$\text{RefEV}(i)=2\cdot X+AV-GV(i), (i=1\ldots5) \quad (28),$$

with; X: photographing distance (unit: m)
AV: photographic aperture value (unit: AV)

RefEV(i) is a variable whose value is set to 0 if the reflectivity is the standard value, is set to +1 if the reflectivity is higher than the standard by one level(EV) and is set to −1 if the reflectivity is lower than the standard by one level (EV). Next, using RefEV(i), the weighting value RefG(i) for each area that corresponds to the reflectivity is calculated through mathematical formula (29).

$$\text{RefG}(i)=1/(2^{(Abs(\text{RefEV}(i)))}), (i=1\ldots5) \quad (29)$$

Figure 30:
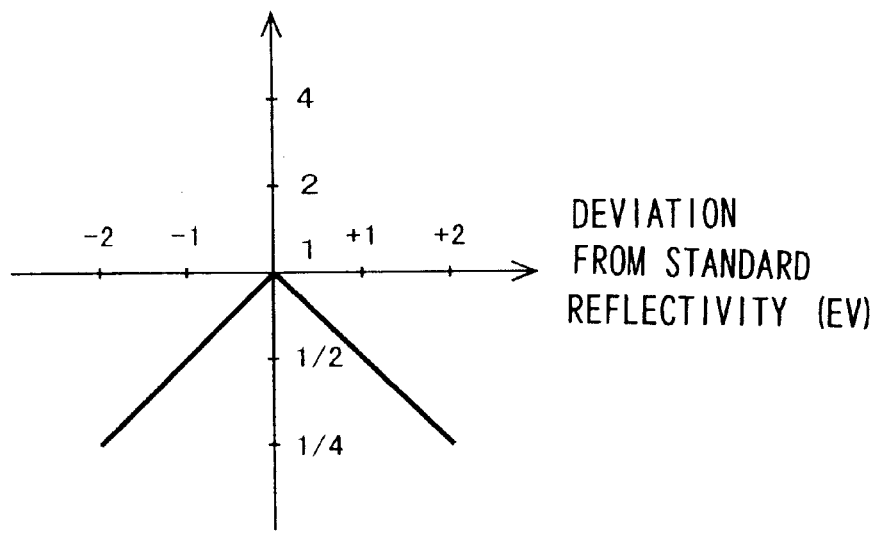
FIG. 30 is a simplified illustration of the relationship between the reflectivity and variables.

Abs( ) is a function used to determine the absolute value in the parentheses. As indicated in FIG. 30, RefG(i) is a variable that is set to 1 if the reflectivity of the subject is the standard value and decreases as the reflectivity deviates from the standard value.

Next, weight wt(i) for each area is calculated by normalizing RefG(i) through mathematical formula (30).

$$wt(i)=\text{RefG}(i)/f(\text{RefG}(i)), (i=1\ldots5) \quad (30)$$

f( ) is a function used to calculate the sum total of the variable RefG(i) (i=1 . . . 5) inside the parentheses. Then, using RefEV(i) determined through mathematical formula (28) again, a reflectivity correction value RefMain over the entire photographic field is calculated through mathematical formula (31).

$$\text{RefMain}=\log2(g(wt(i)^*2^{\text{RefEV}(i)})), (i=1\ldots5) \quad (31)$$

g( ) is a function similar to that in mathematical formula (30) and log2 is a function indicating a logarithm of 2. Using RefMain, the main flash output correction value deltaY is calculated through mathematical formula (32).

$$deltaY=krm\cdot \text{RefMain} \quad (32)$$

Figure 31:
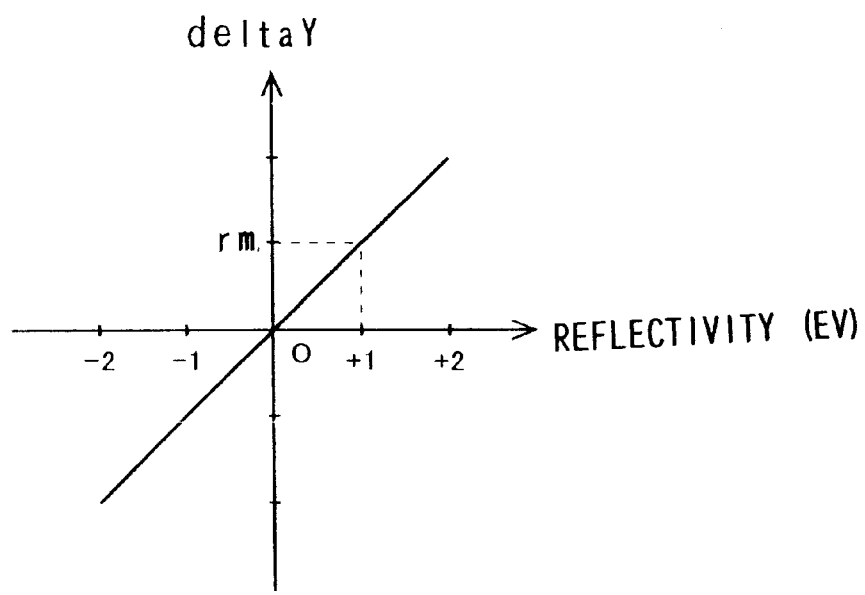
FIG. 31 is a simplified illustration of the relationship between the reflectivity and a variable.

FIG. 31 illustrates the relationship between the reflectivity and deltay. In the relationship, krm is a constant that adjusts the degree to which the reflectivity is to be corrected, and a numerical value of approximately 0.5 is used for this constant. However, krm may be varied as necessary.

When wt(i) and deltaY are determined through mathematical formulae (30) and (32), the main flash output multiple Kgn is calculated through mathematical formula (33).

$$Kgn=IGstop/mval/(\text{IG}(i)\cdot wt(i)\cdot GH\cdot DY) \quad (33)$$

IGstop is the variable that is used in mathematical formula (25) and GH an DY are calculated through the following mathematical formulae (34) and (35).

$$GH=2^{(Gav(i)+Sa(i))} \quad (34)$$

$$DY=2^{(deltaY-SV+5)} \quad (35)$$

The symbol ^ is a function that indicates an exponential power, and SV, Gnv, XmV and BvV are values that have been used in mathematical formula (25).

As mathematical formula (36) indicates, Kgn is a variable that indicates the main flash output as a multiple of the pre-flash output.

$$GNmain=Gnpre\cdot\sqrt{(Kgn)} \quad (36),$$

with: GNmain: Main flash GN
GNpre: pre-flash GN $\sqrt{}$ is placed over Kgn due to the nature of GN whereby GN changes by 1 EV when multiplied by $\sqrt{2}$.

As explained above, the following advantages are achieved through this embodiment.

(1) Instead of setting the gain using the aperture value as a parameter, as in the prior art, the gain setting unit 128 sets the gain at the flash metering unit 26 by using at least one type of information among the sensitivity value SvV, the ratio GnV of the first flash output upper limit and the second flash output upper limit, the photographing distance XmV, the subject brightness MvV and the like as expressed in mathematical formula (17). As a result, the main flash output can be calculated with a high degree of accuracy to achieve an improvement in the accuracy of exposure during a flash photographing operation.

(2) When emitting light at the second flash output upper limit, the gain setting unit 128 determines the longest range SvV over which light can reach while achieving the correct exposure by using the sensitivity value SV as expressed in mathematical formula (18) and sets the gain by using a gain correction value that roughly equalizes the maximum distance over which the metering output from the flash metering unit can be detected when light is emitted at the first flash output upper limit to the range over which the light can reach. Thus, the gain correction value can be determined through a simple calculation.

(3) The gain setting unit 128 sets the gain by using the gain correction value (GnV) that corresponds to the ratio of the first flash output upper limit (GNp1) and the second flash output upper limit (GN) as expressed in mathematical formula (19). For instance, as shown in FIG. 24, the gain is adjusted in correspondence to the ratio of the main flash guide number and the pre-flash guide number. As a result, as shown in FIG. 25, a correction can be made to ensure that the range is increased as the ratio (flash output) becomes higher.

(4) The gain setting unit sets the gain by using the gain correction value that corresponds to the ratio of the longest range (GN/F) over which light can reach while achieving the correct exposure when light is emitted at the second flash output upper limit and the photographing distance (X) as expressed in mathematical formula (20). In other words, correction is achieved to ensure that the gain is lowered as the ratio increases. Consequently, accurate correction can be implemented even if the photographing distance changes.

(5) Since the gain setting unit 128 sets the gain by ensuring that the gain is reduced when the subject brightness increases as expressed in mathematical formula (21), the degree to which ambient light affects a photographing operation can be minimized even when the photographing operation is performed accompanied by flash under conditions in which the ambient light is bright, as in fill-flash photographing.

The present invention is not limited to the embodiment and a number of variations and modifications can be realized without departing from the scope of the present invention.

For instance, the second flash output upper limit is used as the upper limit achieved by subtracting the flash output (the first flash output upper limit) used for the pre-flash from the maximum flash output currently available at the flash tube (e.g., when the charge at the main condenser is at 90%, the flash output corresponds to 90% of the maximum charge quantity) in the relationship between the first flash output upper limit and the second flash output upper limit. However, the second flash output upper limit may be considered as a value achieved by subtracting the flash output used for the pre-flash operation from the inherent maximum flash output of the flash tube in correspondence to, for instance, the maximum guide number.

While the explanation is given above on an example in which the first and second flash output upper limits are used, if only either one of them can be obtained, the other value may be handled as a constant (representative value such as the value achieved at a full charge).

In addition, while the ratio of the second flash output upper limit against the first flash output upper limit is used, the ratio of the first flash output upper limit against the second flash output upper limit may be used instead.

As explained in detail above, according to the present invention, the main flash output can be calculated with a high degree of accuracy by assuring sufficient metering accuracy even when the flash output during the pre-flash operation is low, to achieve an improvement in the accuracy of exposure during a flash photographing operation.

Sixth embodiment

The electronic flash control apparatus for a camera in the sixth embodiment is similar to the camera having the optical system illustrated in FIG. 1 and thus, FIG. 1 will be used for reference as necessary in the explanation below.

Figure 32:
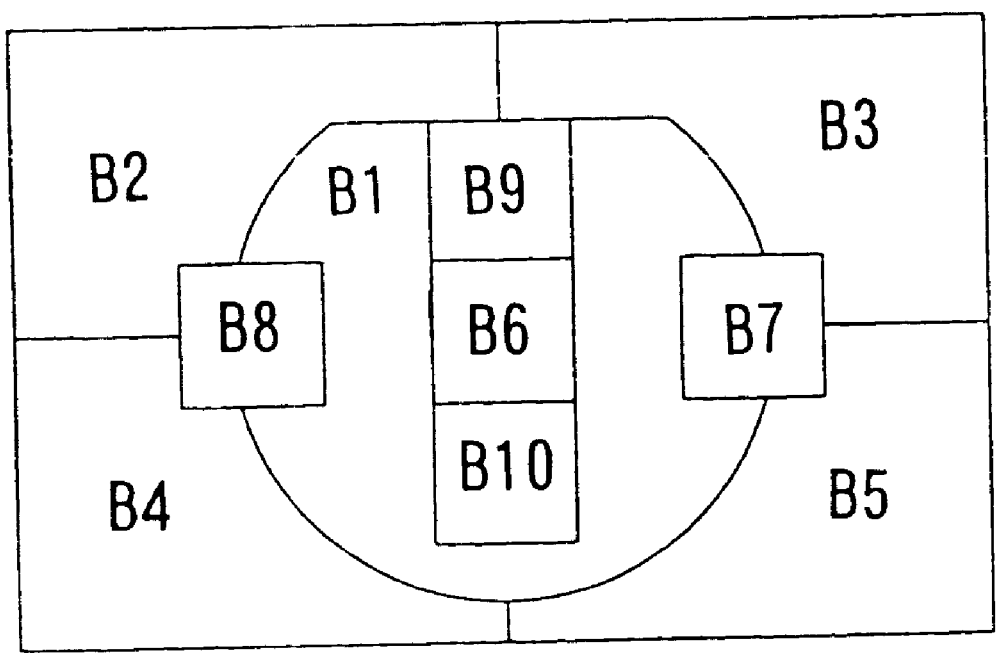
FIG. 32 illustrates the pattern achieved through division at the ambient light metering unit in a sixth embodiment.

In the sixth embodiment, the metering element 9 is capable of metering ten areas B1~B10 achieved by dividing the photographic field into ten areas and outputting the individual metering values as illustrated in FIG. 32. The small areas B6~B10 correspond to the areas where focal point detection is performed for AF (autofocus), and the brightness levels in the areas corresponding to the range-finding areas at a plurality of points are metered.

The flash metering unit 26 has structural features identical to those explained in reference to the first through fifth embodiments, and the metering areas achieved through division are as shown in FIG. 4.

The focusing states in the focal point detection areas B6~B10 in the photographic field in FIG. 32 are detected by the focal point detection unit 17, and the taking lens 1 is driven until a focused state is detected in one of the areas.

Figure 33:
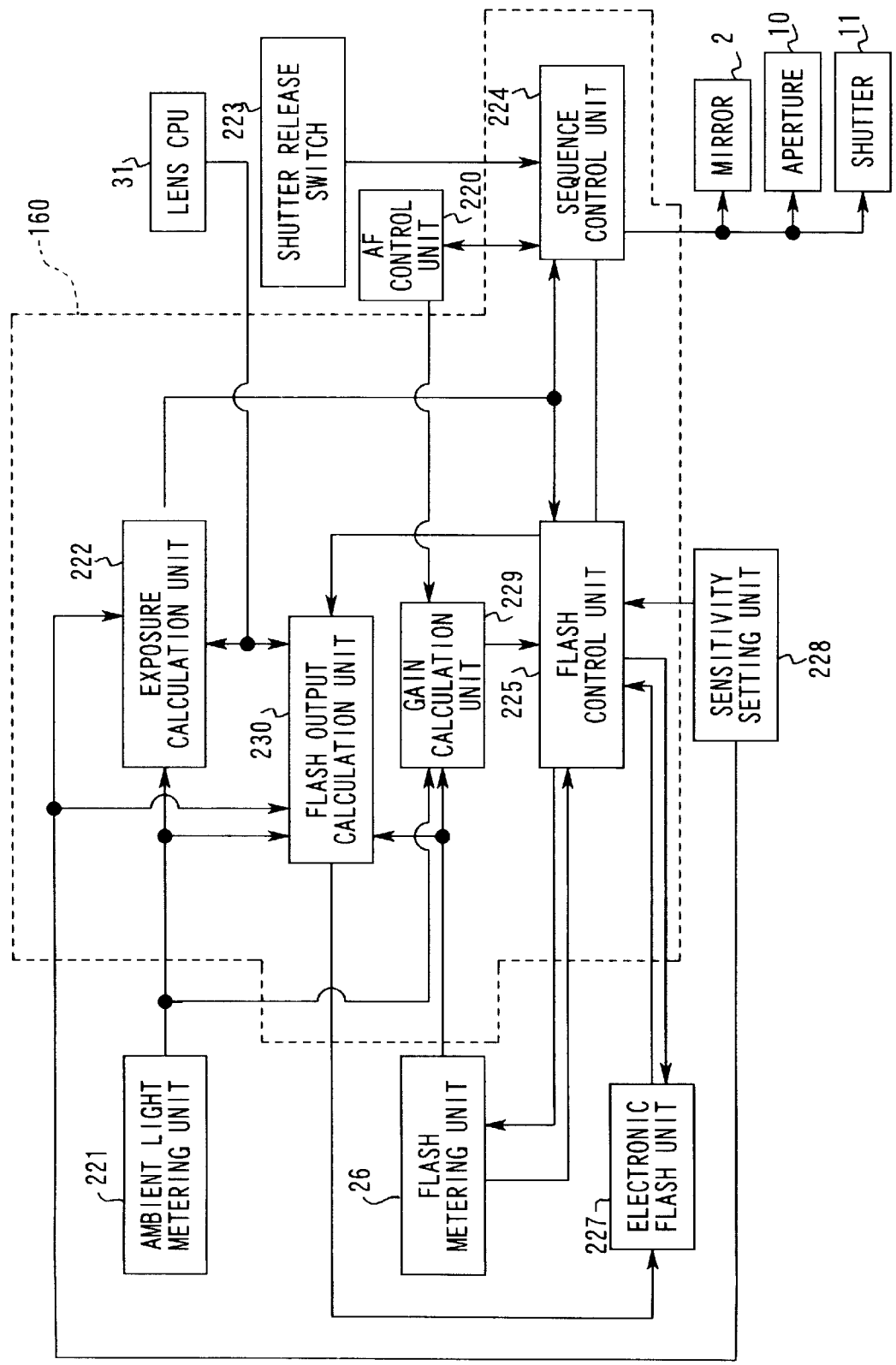
FIG. 33 is a block diagram illustrating the structure of the sixth embodiment of the present invention.

FIG. 33 is a block diagram schematically illustrating the structure of the electronic flash control apparatus in the sixth embodiment. An ambient light metering unit 221 is a circuit that divides a photographic field into ten areas and performs metering for the individual areas as illustrated in FIG. 32, and its metering output is output to an exposure calculation unit 222.

The exposure calculation unit 222 is a circuit that calculates a correct exposure value for ambient light exposure based upon the output from the ambient light metering unit 221, lens information such as the open aperture value, the focal length and the exit pupil position of the taking lens stored inside the lens CPU 31 constituted of a microprocessor and provided inside the taking lens 1, sensitivity information set at the imaging device 14 output by a sensitivity setting unit 228 and the like, calculates the aperture value and the shutter speed based upon the correct exposure value and outputs them to a sequence control unit 224 and the like.

The sequence control unit 224 is a circuit that implements control on a sequence of operations by swinging the quick-return mirror 2 shown in FIG. 1 upward when a release signal is input through a release switch 223, issuing an instruction for a pre-flash to a flash control unit 225 after the aperture 10 is set to a predetermined value, then implementing control to cause the shutter 11 to operate at a specific shutter speed and, at the same time, issuing an instruction for a main flash to the flash control unit 225.

The flash control unit 225 is a circuit that implements control on the flash metering unit 26, an electronic flash unit 227 and the like based upon signals output by the exposure calculation unit 222, the sequence control unit 224, a gain calculation unit 229 and the sensitivity setting unit 228. The gain calculation unit 229, which is a circuit that calculates gains (hereafter referred to as the "gains corresponding to the individual areas) that are used to amplify signals output by the sensors corresponding to the individual flash metering areas based upon the outputs from the ambient light metering unit 221 and the flash metering unit 26 and information output by the exposure calculation unit 222 (of an AF control unit 220 in some cases), and its output is connected to the flash control unit 225.

In other words, when an instruction for a pre-flash is input from the sequence control unit 224, the flash control unit 225 sets the gains for the individual areas at the flash metering unit 26 in correspondence to the gain values for the individual areas calculated by the gain calculation unit 229 based upon the aperture value information output by the exposure calculation unit 222, and the brightness information indicating the brightness levels of the subject in the individual areas output by the ambient light metering unit 221 and then causes the electronic flash unit 227 (SB 15 in FIG. 1) to perform chopped pre-flash light emission at a light quantity corresponding to a specific guide number. The chopped flash by the electronic flash unit 227 is sustained until a stop signal indicating that the value of the quantity of received light has reached a specific value is generated by the flash metering unit 26 or the number of the chopped flashes reaches a specific value.

A flash output calculation unit 230 is a circuit that calculates a main flash output based upon the integrated pre-flash values output by the flash metering unit 26, the metering values output by the ambient light metering unit 221, the photographic distance value output by the lens CPU 31, the aperture value output by the exposure calculation unit 222, the sensitivity value of the imaging device 14 output by the sensitivity setting unit 228 and the like and outputs the calculated value to the electronic flash unit 227. When the pre-flash operation is completed, the shutter 11 becomes fully open and an instruction for a main flash is output to the electronic flash unit 227 by the flash control unit 225, the electronic flash unit 227 performs a main flash at the main flash output calculated by the flash output calculation unit 230, and thus, exposure at the imaging device 14 is achieved. The operations by the exposure calculation unit 222, the flash output calculation unit 230, the gain calculation unit 229, the flash control unit 225 and the sequence control unit 224 achieved during this process are realized through the operation of a microprocessor 160 (hereafter referred to as an MPU).

Figure 34:
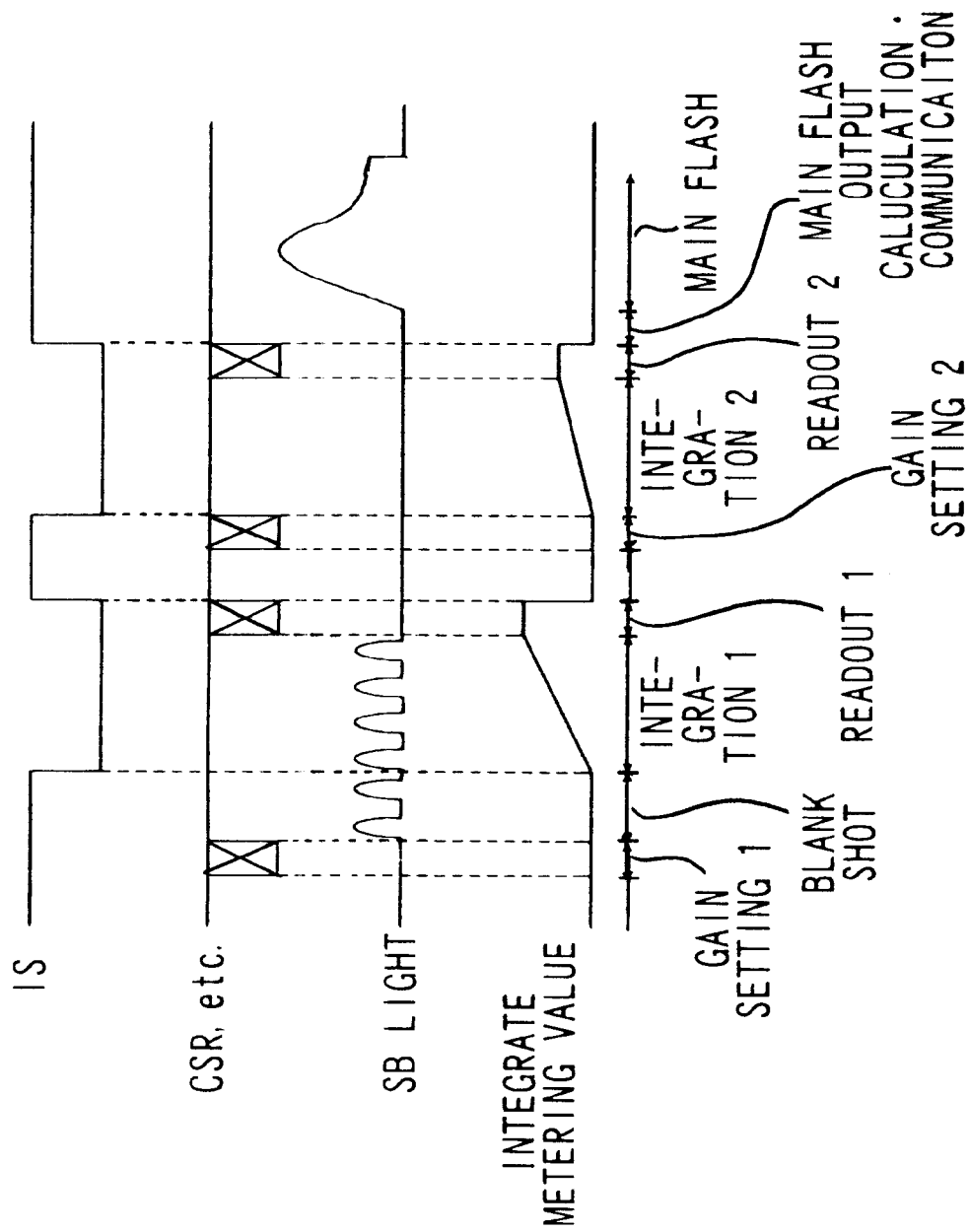
FIG. 34 illustrates the pre-flash operation achieved in the sixth embodiment.

FIG. 34 illustrates the pre-flash operation. When a release signal is input and aperture setting is completed, the flash control unit 225 sets the gains for a pre-flash (gain setting 1: the specific setting method is to be detailed later). After emitting two blank shots through chopped flash to warm up the electronic flash unit 227 and the flash metering unit 26, the flash control unit 225 starts an integrating operation on signals output by the photo sensor 13 by inputting a negative edge signal to the IS port and, at the same time, performs a pre-flash.

The MPU 160 ends the pre-flash when the integrated metering value reaches a correct level or when the number of chopped flashes reaches a specific value. The MPU 160 inputs a positive edge signal to the IS port after reading out (readout 1) the integrated values (integration 1) and resets the integrated values.

Since the ambient light component is contained as well as the reflected portion of the SB light in the integrated value resulting from the pre-flash, the MPU 160 performs an integrating operation on the ambient light alone after the pre-flash is completed, and it performs an arithmetic operation to subtract the ambient light component from the integrated pre-flash values through subsequent arithmetic processing.

During gain setting 2, the gains for the ambient light integration are set, and then, the ambient light is integrated (integration 2) by inputting a negative edge signal to the IS port as in the pre-flash. The gain setting and the length of time of the integrating operation during an ambient light integration are set at the same values as those in the pre-flash.

When the ambient light integration is completed, the MPU 160 inputs a positive edge signal to the IS port and resets the integrated values after reading out the integrated values (readout 2). Then, the MPU 160 uses an algorithm which is to be detailed later to calculate the main flash output, sets the calculated value at the electronic flash unit 227 and implements main flash control concurrently with a photographing operation to complete the photographing process.

Figure 35:
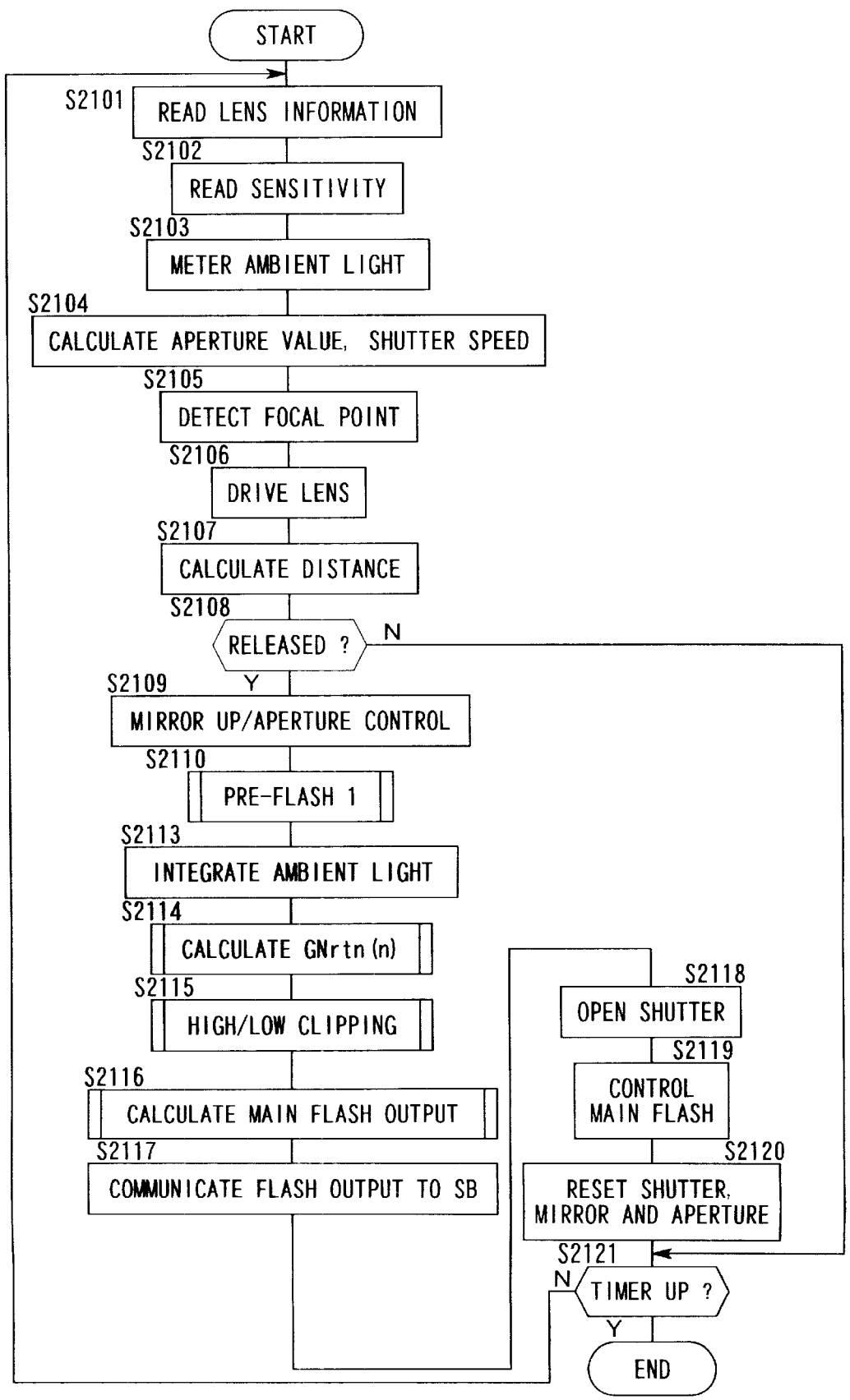
FIG. 35 is a flowchart of an algorithm used in the sixth embodiment.

FIG. 35 is a flowchart of the camera sequence. When the power is turned on at the camera by pressing a release switch 23 of the camera halfway down, this program is executed by the MPU 160. First, in step S2101, the MPU 160 communicates with the lens CPU 31 provided inside the taking lens 1 to read information such as the open aperture value, the focal length and the exit pupil position of the taking lens 1. Then, in step S2102, the MPU 160 reads the sensitivity value at the imaging device 14 set either manually or automatically by the sensitivity setting unit 228. In step S2103, the MPU 160 performs ambient light metering via the metering element 9, makes a correction based upon the lens information read in step S2101 to obtain the brightness information corresponding to the areas B1~B5, and performs an ambient light exposure calculation to determine a correct exposure value BVans through a method of the known art using the brightness values. In step S2104, the MPU 160 calculates the aperture value and the shutter speed for the photographing operation in correspondence to the correct exposure value BVans and the sensitivity value.

In step S2105, the MPU 160 receives the results of focal point detection performed by the focal point detection unit 17, and the MPU 160 drives the taking lens 1 until the defocus quantity becomes 0 in step S2106. In step S2107, the MPU 160 determines the subject distance based upon the photographing distance information output by the lens CPU 31 at the focused position. Then, in step S2108, the MPU 160 makes a decision as to whether or not the shutter release switch 223 has been pressed all the way down, and if it is decided that the shutter release switch 223 has been pressed all the way down, the operation proceeds to step S2109. Otherwise, the operation jumps to step S2121. In step S2109, the MPU 160 causes the quick-return mirror 2 to swing upward and sets the aperture 10 to the value obtained in step S2104.

In step S2110, the MPU 160 performs a pre-flash, and calculates the integrated metering values IG1(1)~IG1(5) corresponding to the areas S1~S5. The specific method adopted to achieve this pre-flash is to be explained in detail later.

When the pre-flash is completed, the MPU 160 reads out the integrated ambient light values Ipst(1)~Ipst(5) in step S2113 from the flash metering unit 26. For the ambient light integration, the MPU 160 sets the gains and the length of integration time at the same values as those for the pre-flash.

In step S2114, the MPU 160 calculates GNrtn(n) in each of the flash control areas S1~S5 in correspondence to the integrated values obtained through the pre-flash and the like. GNrtn is the SB guide number required to achieve a standard exposure quantity for a subject in each area having a standard reflectivity when the sensitivity setting at the imaging device 14 is equivalent to ISO 100. In step S2115, the MPU 160 performs a Hi/Lo clipping calculation to detect any area of abnormal reflectivity that would adversely affect the calculation of the main flash output. In step S2116, the MPU 160 calculates the main flash output for a photographing operation based upon GNrtn, the results of the decision made with respect to Hi/Lo clipping and the like, and in step S2117, it transmits the value thus calculated to the electronic flash unit 227 through communication or the like.

Then, in step S2118, the MPU 160 opens the shutter 11, and in step S2119, it implements SB control of the main flash operation. When the main flash operation is completed, the MPU 160 restores the shutter 11, the aperture 10 and the mirror 2 to their respective initial positions in step S2120. In step S2121, the MPU 160 makes a decision as to whether or not a specific length of time has elapsed since the halfway-down position timer startup, and if the specific length of time has not elapsed, the operation returns to step S2101 to repeat the processing, whereas if the time is up on the timer, the processing ends.

Figure 36:
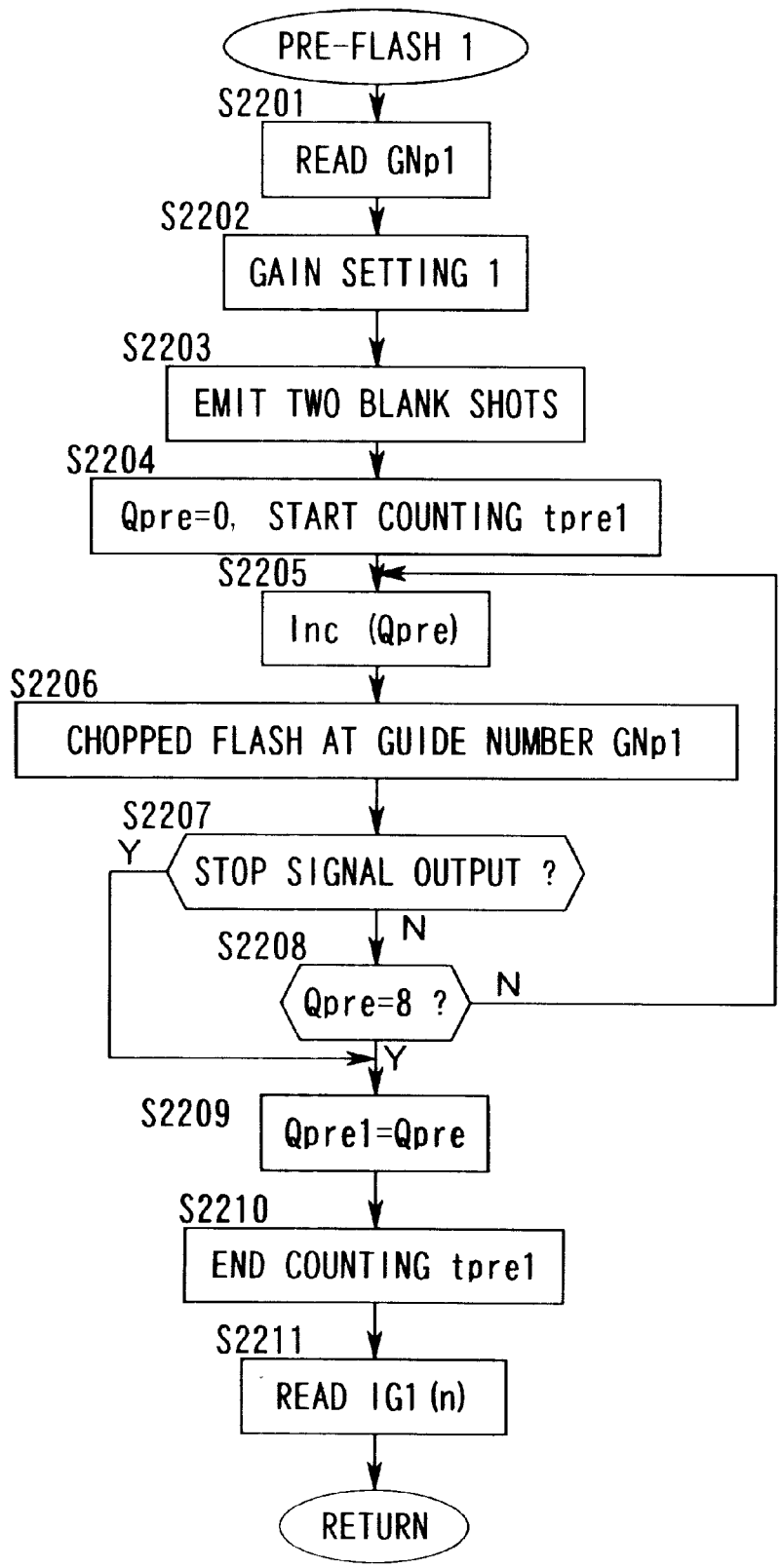
FIG. 36 is a flowchart of an algorithm (the control method adopted for pre-flash) used in the sixth embodiment.

FIG. 36 is a sub-routine flowchart of the control method implemented by the MPU 160 during a pre-flash. This sub-routine is called up for execution by executing step S110 in FIG. 35. First, in step S2201, the MPU 160 reads the guide number GNp1 corresponding to a single light emission from the electronic flash unit 227. It is assumed that this guide number indicates a value corresponding to a sensitivity setting equivalent to ISO 100. Next, in step S2202, the MPU 160 sets the amplification gain Gpre(n) for the pre-flash. The gain setting sub-routine is to be explained later.

Next, in step S2203, the MPU 160 emits two blank shots to warm up the flash tube at the SB 15. In step S2204, the MPU 160 sets the variable Qpre that indicates the number of pre-flashes to 0, starts measuring the length of pre-flash time tpre1 and also starts an integrating operation by setting the level of the IS port at the flash metering unit 26 to L.

In step S2205, the MPU 160 adds 1 to Qpre. In step S2206, the MPU 160 ensures that a pre-flash is performed at the light quantity corresponding to the guide number GNp1, and then in step S2207 it makes a decision as to whether or not a stop signal has been output. If it is decided that a stop signal has been output, the operation skips the next step S2208 to directly proceed to step S2209, whereas the operation proceeds to step S2208 otherwise to make a decision as to whether or not the number of pre-flashes Qpre has reached the maximum value of 8. If it is decided that the number of pre-flashes has reached 8, the MPU 160 ends the pre-flash and the operation proceeds to step S2209, whereas the operation returns to step S2205 otherwise to perform another pre-flash. Since an upper limit is provided with respect to the overall total of the pre-flash output, it is possible to assure a sufficient flash output for the main flash with a high degree of reliability.

When the pre-flash operation is completed, the MPU 160 substitutes the variable Qpre1 indicating the number of pre-flashes with Qpre in step S2209. Then, in step S2210, the count of the length of pre-flash time tpre1 ends. In step S2211, the MPU 160 reads out integrated metering values IG1(1)~IG1(5) corresponding to the individual flash control areas S1~S5 before ending the processing.

Figure 37:
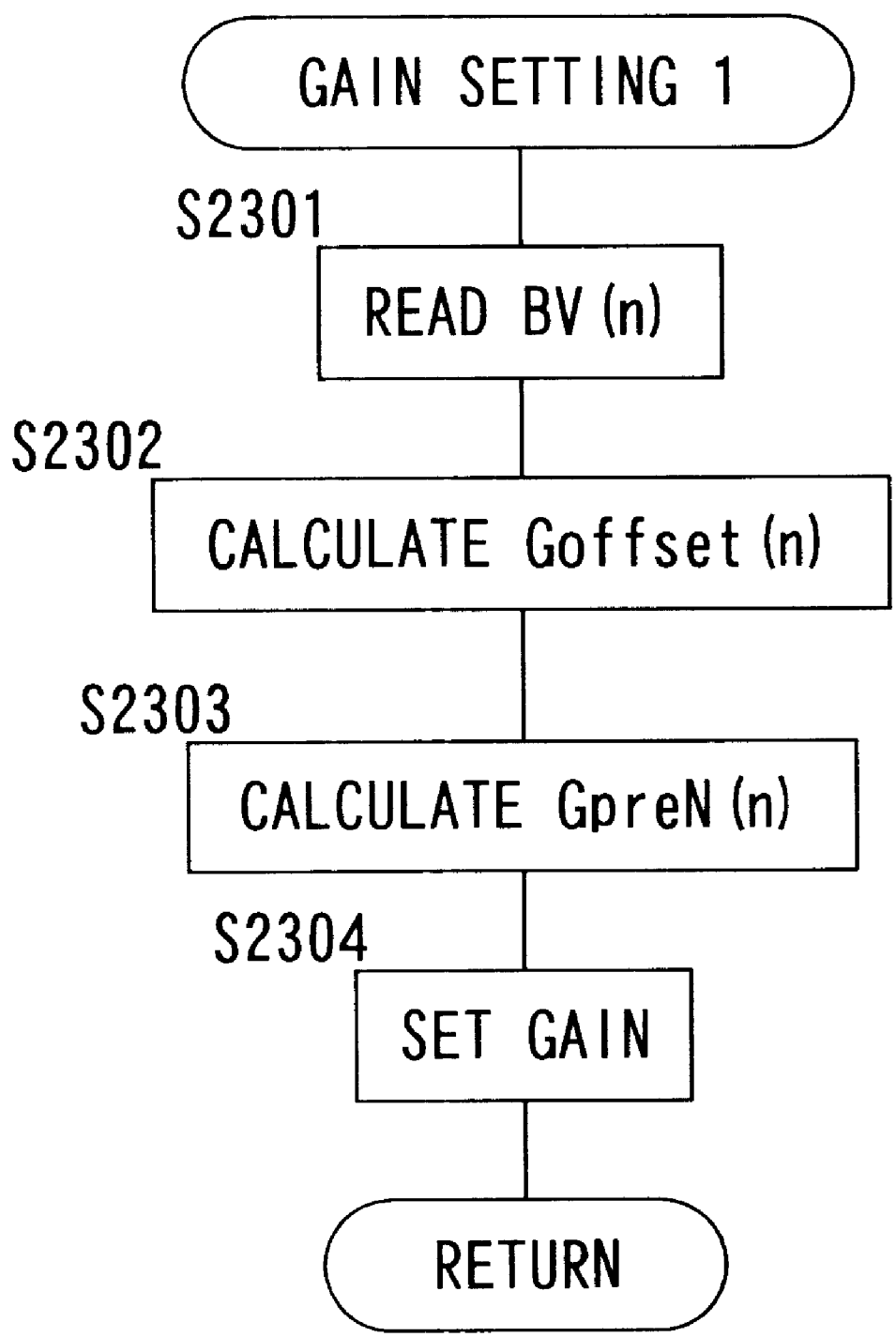
FIG. 37 is a flowchart of an algorithm (gain setting #1) used in the sixth embodiment.

FIG. 37 is a flowchart of the contents of the processing performed in the sub-routine "gain setting 1" in step S2202 in the flowchart in FIG. 36.

The amplification gains to be set in step S2202 to the amplify signals corresponding to the individual areas (gain setting 1) for a pre-flash may be uniform as long as the reflectivities of the subjects in the individual areas are all close to the standard reflectivity and there are no great differences among the reflectivities of the subjects in the individual areas. Thus, it may be determined, for instance, through the following mathematical formula (37) as has been explained in reference to the first embodiment.

$$\text{Gpre}(n)=Lev\gamma\{AV+3+\log2(1/5)-S\alpha(n)\} \quad (37)$$

n in Gpre1(n) is a value within the range of 1 through 5, and the individual numbers in this range correspond to the numbers assigned to the areas S1~S5 in FIG. 4. In addition, AV indicates the APEX value (unit: EV) of the aperture value setting, Sα(n) is a correction value used to achieve consistency in the outputs from the individual areas and Lev and γ are coefficients used to ensure that a stop signal is output when the correct quantity of light has been received. In addition, the term log2(1/5) is a correction term provided to achieve a correct value for the sum total of the integrated values of the signals corresponding to the five areas.

Since the gain Gpre at the amplifier is designed to become higher as the value is reduced, a higher gain is set as the AV value increases, i.e., as the aperture is further closed in order to compensate for the reduced quantity of light entering the photo-sensor 13, which becomes reduced as the aperture value is reduced.

In this situation, if the reflectivities of the subjects in the individual areas are expected to deviate from the standard reflectivity to a considerable degree, the gains set for the individual areas are changed in advance in correspondence to the reflectivities of the subjects in the areas to ensure that the metering outputs do not become saturated or that the metering outputs are insufficient. While the reflectivity distribution of the subjects can be ascertained with a fairly high degree of accuracy based upon the metering results of a pre-flash, approximate distribution can be predicted from the outputs of the ambient light metering unit even before a pre-flash.

In many cases, subjects are assumed to be illuminated by ambient light having an even luminance. Thus, a subject achieving a higher reflectivity is expected to produce a higher ambient light metering output, whereas a subject having a lower reflectivity is expected to produce a lower output. Consequently, based upon the distribution of the ambient light metering outputs, gains can be set roughly corresponding to the reflectivities of the subjects.

First, in step S2301, the MPU 160 receives an ambient metering output BV(n) from the ambient light metering unit 221. Then, in step S2302, the MPU 160 calculates Goffset (n).

Amplification gains for a pre-flash may be set for the individual areas based upon the ambient light metering outputs in the following manner, for instance.

When BV(n) (n=1 . . . 10) indicates the ambient light metering output corresponding to one of the areas and BV(c) indicates the ambient light metering output corresponding to the central area that includes the area B1 and the areas B6~B10 in FIG. 32, BV(c) may be expressed as follows.

$$BV(c)=\log2\{(2^{Bv(1)}+N\cdot2^{BV(6)}+N\cdot2^{BV(7)}+N\cdot2^{BV(8)}+N\cdot2^{Bv(9)}+N\cdot2^{BV(10)})/(1+5\cdot N)\} \quad (38),$$

with; N: areal ratio between light-receiving area B1 and each of the light-receiving areas B6~B10, e.g., B1=N·B6, B6=B7=. . . =B10.

When BVmax represents the maximum value and BVmin indicates the minimum value among the ambient light metering outputs BV(n) corresponding to the individual areas (the influence of a high brightness subject or a low brightness subject can be reduced by performing high brightness clipping processing and low brightness clipping processing, in a which high brightness limit value BVmax and a low brightness limit value Bvmin are determined in advance and any specific value in an ambient light metering output BV(n) exceeding either of the limits is substituted by Bvmax or Bvmin), correction quantities Goffset(n) to be used to correct the gains set for the individual areas can be calculated through the following formula.

$$\text{Goffset}(n)=(BV(n)-BVave)\cdot H/(BVmax-BVmin) \quad (39),$$

with; BVave: average value of the brightness values corresponding to all the areas (the average value after the high brightness/low brightness clipping processing).
H: maximum width over which the gain may be varied (Unit:EV)

H=log2(maximum gain/minimum gain) Goffset(n)=0 when BVmax=Bvmin

Next, by adding Goffset(n) calculated through formula (39) to the gain calculated through formula (37), a gain Gpre N(n) corresponding to each area can be set. In other words, a corrected gain may be calculated through the following mathematical formula.

$$\text{Gpre } N(n)=Lev-\gamma\{AV+3+\text{Log2}(1/5)-S\alpha(n)-\text{Goffset}(n)\} \quad (40)$$

Lastly, in step S2304, the MPU 160 sets the gain at the flash metering unit 26. Through this operation, a gain close to a standard value is set in an area where the ambient light metering output is close to the average brightness value BVave where Goffset(n) is almost 0, Gpre N(n) is set at the maximum value (the minimum gain) in a area with the ambient light metering output at BVmax where Goffset(n) is the largest and Gpre N(n) is set at the lowest value (maximum gain) in an area with the ambient light metering output at BVmin where Goffset(n) is the lowest. Thus, gains can be set in correspondence to the brightness levels of the subjects present in the individual areas, i.e., roughly in correspondence with the distribution of the reflectivities of the subjects.

As explained above, the sixth embodiment, through which problems of the prior art such as a sufficient degree of metering accuracy not being achieved in some areas due to inconsistency among the integrated pre-flash values corresponding to the individual metering areas output by the flash metering unit 26 can be minimized to achieve satisfactory metering accuracy in all the metering areas.

In addition, since the correct gains are set for the individual areas in advance, accurate metering results can be obtained from all the metering areas through a single pre-flash. Consequently, the accuracy in the flash metering outputs can be assured without having to set a large release time lag.

Seventh Embodiment

Figure 38:
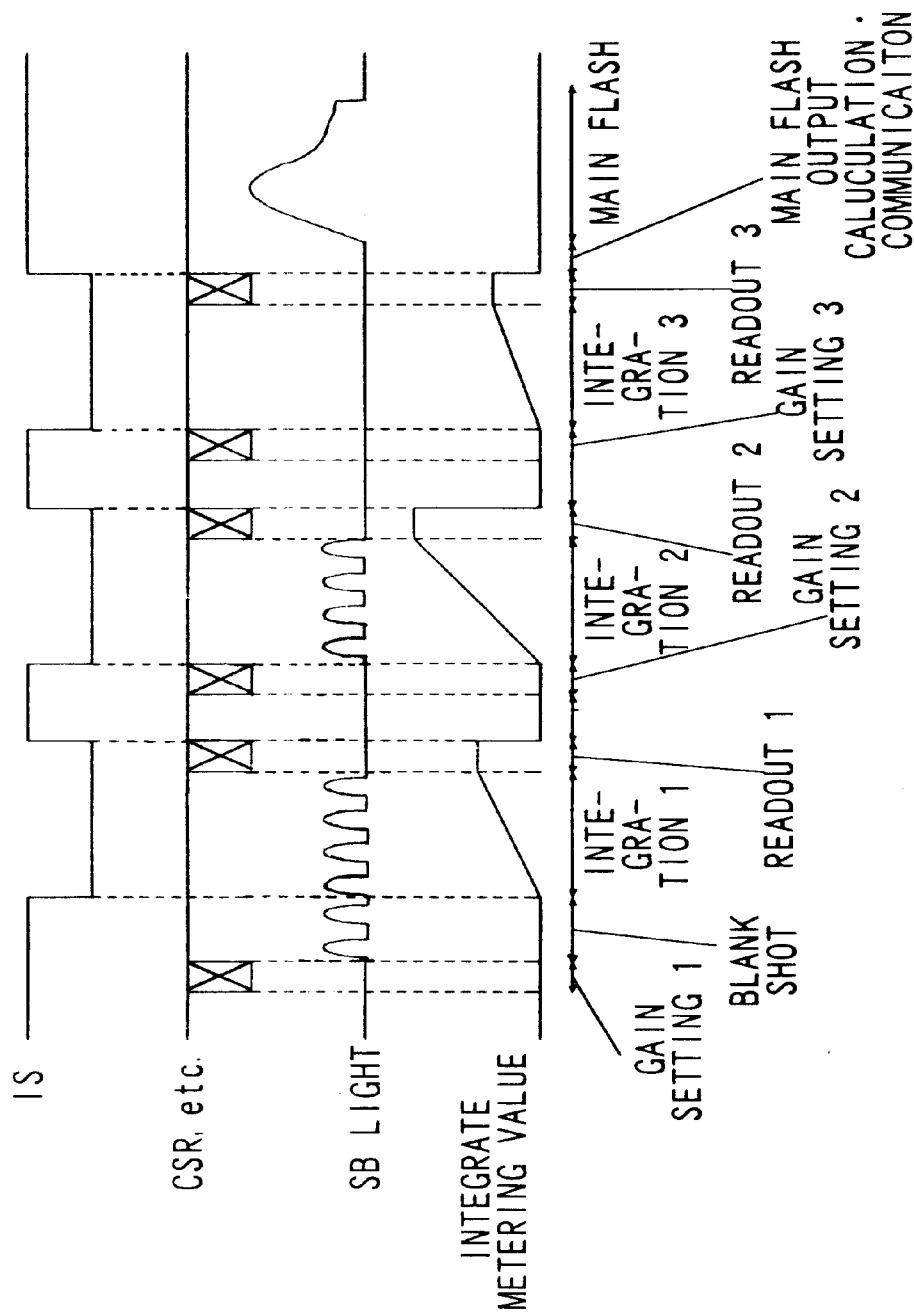
FIG. 38 illustrates the pre-flash operation achieved in a seventh embodiment.
Figure 39:
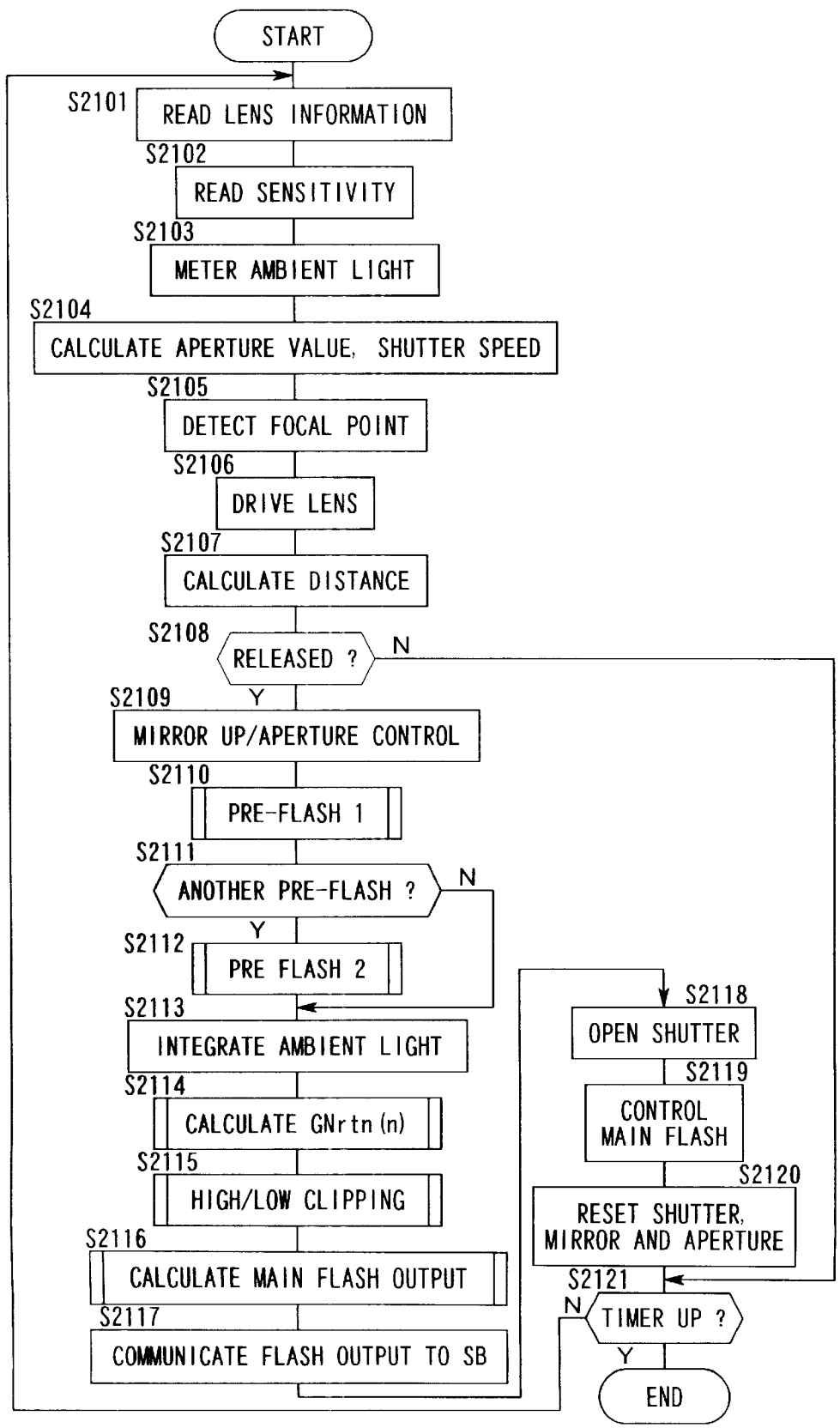
FIG. 39 is a flowchart of an algorithm used in the seventh embodiment.
Figure 40:
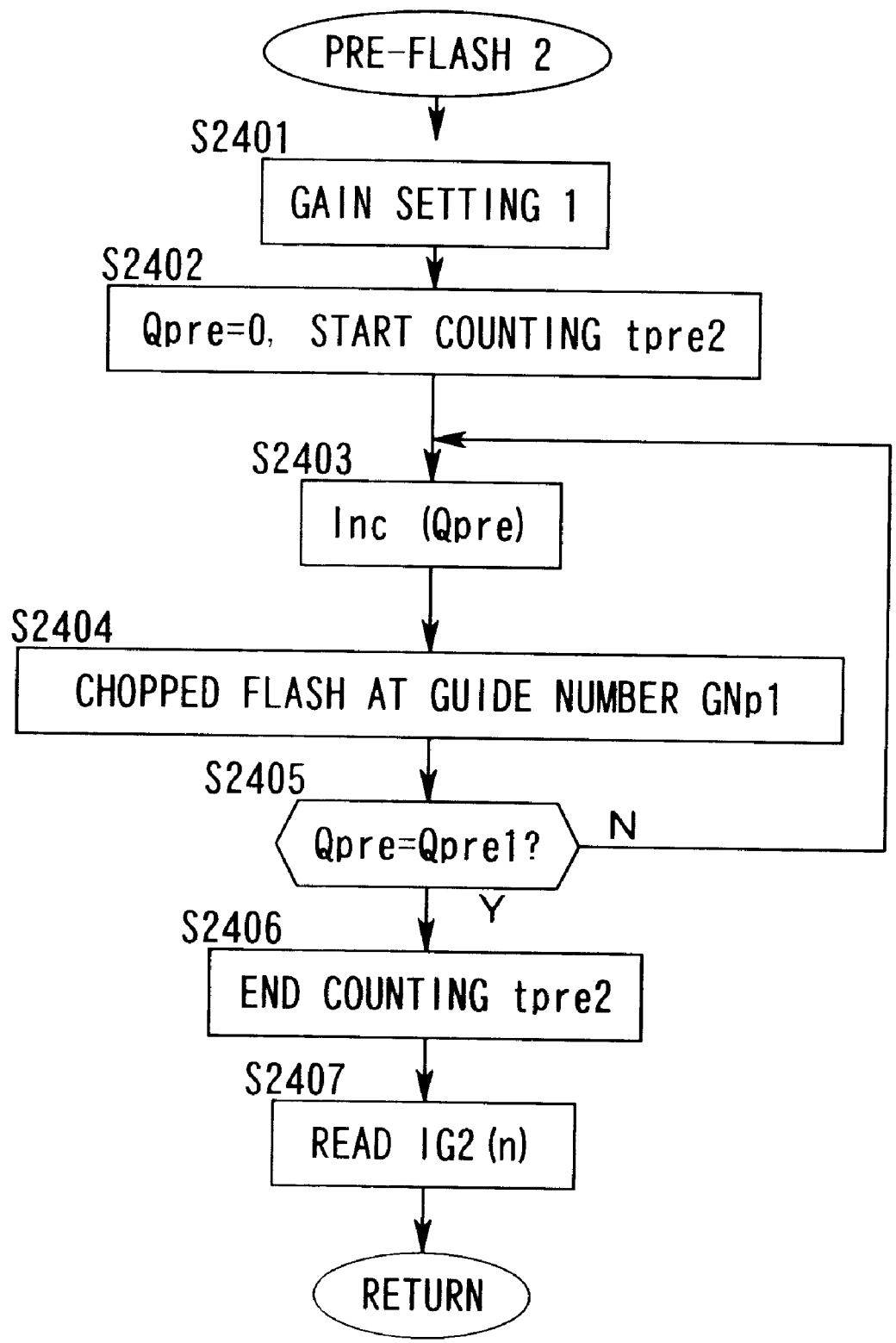
FIG. 40 is a flowchart of an algorithm (pre-flash #2) used in the seventh embodiment.

FIG. 38 illustrates the seventh embodiment of the electronic flash control apparatus according to the present invention. FIG. 39 is a flowchart of the operation performed in the electronic flash control apparatus in the seventh embodiment and FIG. 40 is a flowchart of the sub-routine implemented in step S2112 in the flowchart in FIG. 39 to perform a pre-flash 2.

In the flowchart in FIG. 39, the processing in steps S2111 and S2112 is added to the processing in the flowchart in FIG. 35 illustrating the sixth embodiment.

Namely, in step S2111, a decision is made as to whether or not a second pre-flash is required based upon the values IG1(1)~IG1(5). While any of several different decision-making criteria may be used, the decision is made based upon whether or not the relational expression (41) below is satisfied in this example.

$$IGI(n) < IGth, n = 1 \ldots 5 \tag{41}$$

IGth in the expression above is the smallest value at which the integrated value IG1(n) can retain a sufficiently high degree of accuracy to be used in a subsequent arithmetic operations, and its value is known through testing to be approximately 20 when an output at the AD port undergoes A/D conversion at an 8-bit resolution (0~255, expressed in decimal). In addition, also through testing, it has been confirmed that the value of IGth remains almost constant, regardless of the gain setting and the length of the integrating operation time at the flash metering unit 26 or the luminance at the light-receiving surface of the photo-sensor 13. The MPU 160 decides that a second flash is not needed if all the values of IG1(n) are equal to or greater than IGth to skip step S2113, whereas the operation proceeds to step S2112 otherwise to implement a second flash and read out integrated values IG2(1)~IG2(5) from the flash metering unit 26.

FIG. 40 is a sub-routine flowchart of the method of control implemented during the second pre-flash. This sub-routine is called up for execution by executing step S2112 in FIG. 39. In step S2401, the MPU 160 sets the amplification gain Gpre2(n) for the pre-flash calculated through the following formula (42).

$$Gpre2(n) = Lev - \gamma Y \{AV + 3 + Log2(1/5) - S\alpha((n) - Goffset2\} \tag{42}$$

In the formula above, the variables except for Goffset are the same as those used for the first pre-flash. Goffset is a variable that specifies the degree to which the gain setting for the second pre-flash are to be changed relative to those in the first pre-flash. While Goffset=3(EV) and the gains for the second pre-flash are uniformly set higher than the gains in the first pre-flash by 3EV (sensitivity multiplied by a factor of 8) in this example, Goffset may be a variable that can be changed in correspondence to the results of the first pre-flash, instead.

In step S2402, the MPU 160 sets the variable Qpre that represents the number of pre-flashes to 0 and starts counting the length of pre-flash time tpre2 and, at the same time, it sets the level of the IS port of the flash metering unit 26 to L to start an integrating operation. Next, in step S2403, the MPU 160 adds 1 to Qpre, and in step S2404, it performs the pre-flash at the light quantities corresponding to the guide number GNp1. In step S2405, it makes a decision as to whether or not the number of pre-flashes Qpre has reached a specific value Qpre1. If it is decided that the number of pre-flashes has reached Qpre1, the MPU 160 ends the pre-flash and proceeds to step S2406, whereas the operation returns to step S2403 otherwise to perform another pre-flash.

When the pre-flash is completed, the MPU 160 finishes counting the length of the pre-flash time tpre2 in step S2406.

Then, in step S2407, the MPU 160 reads out integrated values IG2(1)~IG2(5) from the flash metering unit 26 and ends the processing.

As illustrated in FIG. 38, the MPU 160 performs two pre-flash operations, and performs metering by setting a uniform gain for all the areas for the first pre-flash (gain setting 1) in the seventh embodiment. Since the subject reflectivity distribution can be ascertained with a higher degree of accuracy based upon the metering results IG1(n) thus acquired, the correction quantities Goffset2 used to correct the gain values for the individual areas that are set for the second pre-flash (step S2112) are calculated using IG1(n) instead of BV(n) through a calculation process similar to that expressed in formula (39) and gains corrected using these correction quantities are set (gain setting 2).

In addition, gain settings for the ambient light integration (gain setting 3) are at the same values as those of the gain settings for the second pre-flash.

As explained above, the seventh embodiment, in which gains are set for the individual areas based upon the metering outputs resulting from the first pre-flash, achieves an advantage in that gains for the second pre-flash can be set with an even higher degree of accuracy.

Eighth Embodiment

Figure 41:
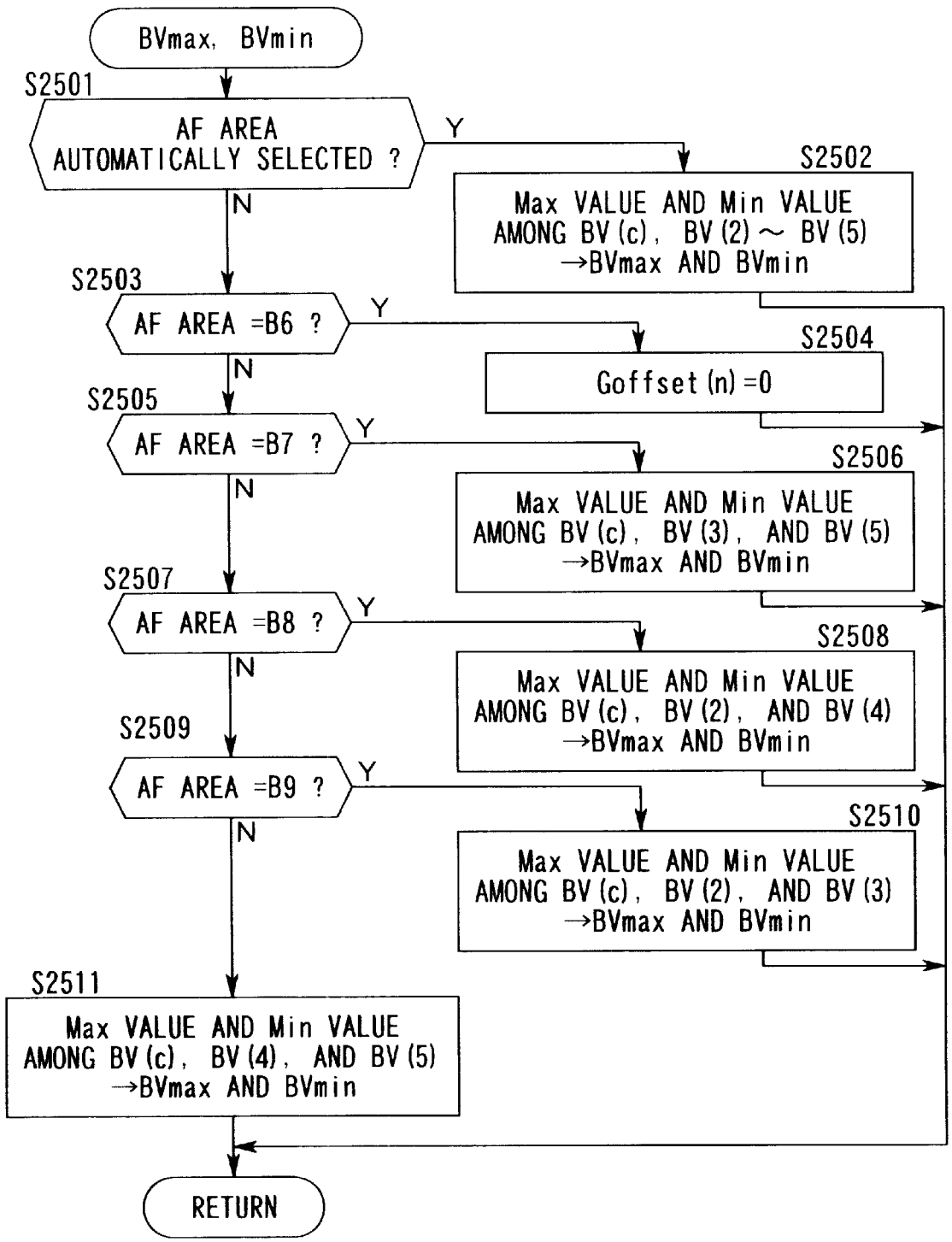
FIG. 41 is a flowchart of an algorithm used in an eighth embodiment.
Figure 42:
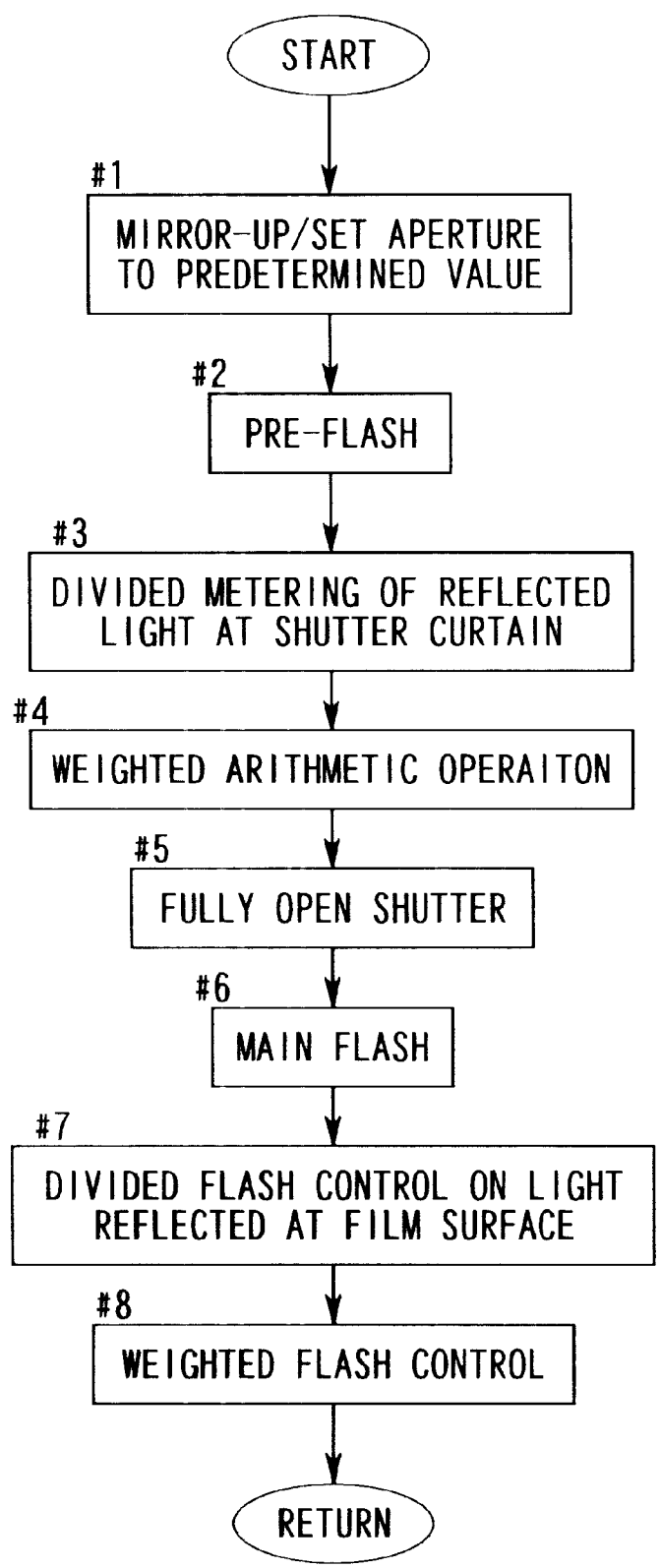
FIG. 42 illustrates the prior art technology.

FIG. 41 is a flowchart of the operation performed in the eighth embodiment of the electronic flash control apparatus according to the present invention. In the eighth embodiment, focal point detection information in addition to the ambient light metering output is utilized when calculating the gains to be set at the flash metering unit 26 for a pre-flash. The processing in FIG. 41 may be executed between steps S2301 and S2302 in FIG. 37, for instance.

Since the area in which focus is achieved on a subject can be ascertained when focal point detection is implemented in a plurality of areas (B6~B10) within the image plane as shown in FIG. 32, gains can be set by placing more importance on the subject that the photographer wishes to photograph by integrating the focal point detection information during the calculation of the gain settings performed based upon the ambient light metering outputs as explained in reference to the sixth embodiment.

In step S2501, the MPU 160 makes a decision as to whether or not a mode for automatically selecting a focus area has been set, and if an affirmative decision is made, the operation proceeds to step S2502 to return the Max value and the Min value among BV(c) and BV(2)~BV(5) as BVmax and BVmin, whereas the operation proceeds to step S2503 if a negative decision is made.

In step S2503, the MPU 160 makes a decision as to whether or not the selected AF area is B6, and if an affirmative decision is made, the operation proceeds to step S2502 to return Goffset(n)=0, whereas the operation proceeds to step S2505 if a negative decision is made. In this embodiment, Goffset(n) is not calculated in step S2302 if an affirmative decision is made in step S2503.

In step S2505, the MPU 160 makes a decision as to whether or not the selected AF area is B7, and if an affirmative decision is made, the operation proceeds to step S2506 to return the Max value and the Min value among BV(c), BV(3) and BV(5) as BVmax and BVmin, whereas the operation proceeds to step S2507 if a negative decision is made.

In step S2507, the MPU 160 makes a decision as to whether or not the selected AF area is B8, and if an affirmative decision is made, the operation proceeds to step S2508 to return the Max value and the Min value among BV(c), BV(2) and BV(4) as BVmax and BVmin, whereas the operation proceeds to step S2509 if a negative decision is made.

In step S2509, the MPU 160 makes a decision as to whether or not the selected AF area is B9, and if an affirmative decision is made, the operation proceeds to step S2510 to return the Max value and the Min value among BV(c), BV(2) and BV(3) as BVmax and BVmin, whereas the operation proceeds to step S2511 if a negative decision is made.

In step S2511, the MPU 160 returns the Max value and the Min value among BV(c), BV(4) and BV(5) as BVmax and BVmin.

The brightness values in the areas set as illustrated in FIG. 32 based upon the metering values corresponding to the area where the main subject upon which focus is achieved and the surrounding area, for instance, may be used as BVmax and BVmin to be utilized to calculate the correction values Goffset(n) for the gain settings through formula (39) during the gain setting processing (see FIG. 37) performed in the sixth embodiment.

Since this procedure ensures that the value corresponding to the area where the main subject is present is taken into account when setting gains at the flash metering unit 26, more accurate gains can be set.

As explained above, since the ambient light metering outputs in the area where the focus is achieved and in the area surrounding it are used to calculate the gain settings in the eighth embodiment, even more accurate gains can be set for a pre-flash. Thus, the flash output for the main flash operation can be obtained with a higher degree of accuracy.

Variations

The present invention is not limited to the embodiments explained above, and a number of variations and modifications may be made without departing from the scope of the present invention.

(1) In the eighth embodiment, the brightness value corresponding to the area achieving the second highest brightness level may be set as BVmax used to calculate the correction values for gain settings through formula (39) if the area where the main subject is present and focus is achieved does not coincide with the area achieving the highest brightness level BVmax during the gain setting processing (see FIG. 37) explained earlier in reference to FIG. 6.

While this will result in a correct gain not being set in an area where the brightness level is the highest and the main subject is not present during the gain setting processing, gains can be set for the other areas with a considerable margin. Thus, when a brightness value exceeds the upper limit, the brightness information corresponding to the area with the high brightness level can be clipped more effectively than by simply clamping at a specific value so that the degree to which the gain setting values are affected by the presence of a high brightness subject can be minimized. It goes without saying that when focus is achieved in an area with a subject having a high brightness level and the main subject is present in the area, the brightness levels in all the areas are used to calculate the gain correction quantities through formula (39). The processing that is performed when focus is not achieved in low brightness areas is implemented in a similar manner. Consequently, since the ambient light metering output corresponding to an area where focus is not achieved is not used in the gain setting processing, flash control can be achieved with gains set with a considerable margin. Thus, it is possible to diminish the bad influence of the bright object such as the sun existing in the area where the main subject is not present on the flash output for the main flash operation.

(2) While the explanation is given on an example in which the gains at the flash metering unit are set, the flash output may be changed for a pre-flash.

(3) It is to be noted that according to the present invention, the sixth embodiment and the seventh embodiment may be implemented in combination. Namely, when implementing a plurality of pre-flashes, gains for a pre-flash can be set using a criterion different from that used for the previous pre-flash, based upon the results of the previous pre-flash.

As has been explained, according to the present invention, which allows different gains to be set for individual areas that correspond to metering areas used for divided metering when setting the gains at the flash metering unit for a pre-flash, the gains are set for the individual areas at the flash metering unit in correspondence to the subject reflectivity distribution ascertained in advance, based upon the ambient light metering output obtained before a shutter release or based upon the metering results obtained through the first pre-flash, and thus, correct values are achieved for the metering outputs in a pre-flash.

While the explanation has been given in reference to the embodiments of the invention on an example in which the invention is adopted in a camera employing an imaging device, it may be adopted in a camera that uses silver halide film (photographic film).

The electronic flash unit may be either internally provided in the camera or may be mounted detachably or may be operated apart from the camera.

While the invention has been described in detail by specific reference to preferred embodiments thereof, it is understood that variations and modifications may be made without departing from the spirit and scope of the invention.

What is claimed is:

1. An electronic flash control apparatus comprising:
    a flash metering unit that measures a light quantity of light reflected by a subject during a pre-flash performed immediately before a photographing operation;
    a decision-making unit that makes a decision as to whether or not another pre-flash is to be implemented based upon a signal output by said flash metering unit;
    a flash control unit that causes another pre-flash to be implemented based upon results of a decision made at said decision-making unit; and
    a flash output calculation unit that calculates an electronic flash output for the photographing operation based upon a signal output by said flash metering unit.

2. An electronic flash control apparatus according to claim 1, further comprising:
    an electronic flash unit that performs a flash at a flash output corresponding to results of calculation performed by said flash output calculation unit.

3. An electronic flash control apparatus according to claim 1, wherein:
    said flash metering unit includes a photo-current storage portion that stores a photo-current generated by receiving light, and said flash metering unit performs a new storage after discharging an electrical charge stored during a first pre-flash when another pre-flash is to be implemented.

4. An electronic flash control apparatus according to claim 1, wherein:

said flash metering unit includes a photo-current storage portion that stores a photo-current generated by receiving light, and said flash metering unit performs a new storage by leaving an electrical charge stored during a first pre-flash undischarged when another pre-flash is to be implemented.

5. An electronic flash control apparatus according to claim 1, wherein:

when another pre-flash is to be performed, said flash metering unit changes a gain used to amplify photo-current generated by receiving light.

6. An electronic flash control apparatus according to claim 1, wherein:

said flash metering unit meters ambient light once after said pre-flash is completed regardless of the number of times said pre-flash has been performed.

7. An electronic flash control apparatus according to claim 1, wherein:

said flash control unit sets an upper limit to a total light quantity of flash light emitted by said electronic flash unit when a pre-flash is performed by said electronic flash unit.

8. An electronic flash control apparatus according to claim 1, wherein:

said flash metering unit is capable of performing metering for individual areas within a photographic field achieved by dividing the photographic field into a plurality of areas; and said flash output calculation unit selects a set of signals among a plurality of sets of signals obtained as outputs from said flash metering unit resulting from a plurality of pre-flashes that achieves a higher degree of metering accuracy and calculates a flash output for the photographing operation based upon the signals thus selected.

9. An electronic flash control apparatus comprising:

a flash metering unit that measures a light quantity of light reflected by a subject during a pre-flash performed immediately before a photographing operation;

a gain setting unit that sets a gain to be used to amplify a signal obtained from said flash metering unit metering the quantity of reflected light;

a flash control unit that outputs a plurality of pre-flash commands to an electronic flash unit immediately before the photographing operation;

a gain resetting unit that changes the gain set by said gain setting unit when a plurality of pre-flashes are implemented in response to said plurality of pre-flash commands output by said flash control unit; and a flash output calculation unit that calculates a flash output for the photographing operation based upon a signal output by said flash metering unit.

10. An electronic flash control apparatus according to claim 9, further comprising:

an electronic flash unit that performs a flash operation at a flash output corresponding to an output from said flash output calculation unit.

* * * * *